US010498744B2

(12) United States Patent
Hunt et al.

(10) Patent No.: US 10,498,744 B2
(45) Date of Patent: Dec. 3, 2019

(54) INTEGRITY MONITORING IN A LOCAL NETWORK

(71) Applicant: Tanium Inc., Emeryville, CA (US)

(72) Inventors: Christian L. Hunt, Chapel Hill, NC (US); Thomas R. Gissel, Apex, NC (US); Aaron Tarter, Chapel Hill, NC (US); Daniel Floyd, Raleigh, NC (US); Benjamin Hobbs, Vacaville, CA (US); Michael Smith, Raleigh, NC (US)

(73) Assignee: TANIUM INC., Emeryville, CA (US)

( * ) Notice: Subject to any disclaimer, the term of this patent is extended or adjusted under 35 U.S.C. 154(b) by 10 days.

(21) Appl. No.: 15/713,518

(22) Filed: Sep. 22, 2017

(65) Prior Publication Data

US 2018/0013768 A1 Jan. 11, 2018

Related U.S. Application Data

(63) Continuation-in-part of application No. 15/215,474, filed on Jul. 20, 2016, and a continuation-in-part of (Continued)

(51) Int. Cl.
*G06F 21/00* (2013.01)
*H04L 29/06* (2006.01)

(Continued)

(52) U.S. Cl.
CPC ............ *H04L 63/14* (2013.01); *G06F 21/552* (2013.01); *G06F 21/577* (2013.01); *H04L 43/10* (2013.01);

(Continued)

(58) Field of Classification Search
CPC .......... H02S 10/00; G05B 15/02; H02J 3/385; H04L 63/0823

(Continued)

(56) References Cited

U.S. PATENT DOCUMENTS 5,220,596 A 6/1993 Patel
5,842,202 A 11/1998 Kon (Continued)

FOREIGN PATENT DOCUMENTS

EP 1553747 A1 7/2005
EP 2493118 A1 8/2012

OTHER PUBLICATIONS

Abdalkarim Awad et al., Virtual Cord Protocol (VCP): A Flexible DHT-like Routing Service for Sensor Networks, In Proceedings of the 5th IEEE International Conference on Mobile Ad Hoc and Sensor Systems, 2008, 10 pgs. 133-142.

(Continued)

*Primary Examiner* — Haresh N Patel
(74) *Attorney, Agent, or Firm* — Morgan, Lewis & Bockius LLP

(57) ABSTRACT

This application is directed to an integrity monitoring method performed at a computational machine in a linear communication orbit. The computational machine receives a watch list through the linear communication orbit. The watch list identifies objects for which events are to be monitored at the computational machine. While a plurality of events are occurring locally at the computational machine, the computational machine identifies the plurality of events in real-time. The identified events include events for the objects identified by the watch list, and event information for these identified events is stored in a local database of the computational machine. In response to an integrity reporting request received through the linear communication orbit, the computational machine identifies event information for at least some of the objects identified by the watch list in the local database, and returns the identified event information to a server system through the linear communication orbit.

58 Claims, 27 Drawing Sheets

Related U.S. Application Data application No. 15/215,483, filed on Jul. 20, 2016, now Pat. No. 10,095,864.

(60) Provisional application No. 62/333,768, filed on May 9, 2016, provisional application No. 62/305,482, filed on Mar. 8, 2016.

(51) Int. Cl.

| | |
|---|---|
| ***H04L 12/26*** | (2006.01) |
| ***H04L 29/08*** | (2006.01) |
| ***G06F 21/55*** | (2013.01) |
| ***G06F 21/57*** | (2013.01) |
| *G06F 15/177* | (2006.01) |

(52) U.S. Cl.

CPC ...... *H04L 63/0442* (2013.01); *H04L 63/1408* (2013.01); *H04L 63/1441* (2013.01); *H04L 67/141* (2013.01); *G06F 2221/034* (2013.01)

(58) Field of Classification Search

USPC ........................................................ 726/23

See application file for complete search history.

(56) References Cited

U.S. PATENT DOCUMENTS

| | | | |
|---|---|---|---|
| 6,049,828 | A | 4/2000 | Dev et al. |
| 6,879,979 | B2 | 4/2005 | Hindawi et al. |
| 7,240,044 | B2 | 7/2007 | Chaudhuri et al. |
| 7,299,047 | B2 | 11/2007 | Dolan et al. |
| 7,555,545 | B2 | 6/2009 | McCasland |
| 7,600,018 | B2 | 10/2009 | Maekawa et al. |
| 7,698,453 | B2 | 4/2010 | Samuels et al. |
| 7,720,641 | B2 | 5/2010 | Alagappan et al. |
| 7,761,557 | B2 | 7/2010 | Fellenstein et al. |
| 7,844,687 | B1 | 11/2010 | Gelvin et al. |
| 8,078,668 | B2 | 12/2011 | Moreau |
| 8,139,508 | B1 | 3/2012 | Roskind |
| 8,185,612 | B1 | 5/2012 | Arolovitch et al. |
| 8,185,615 | B1 | 5/2012 | McDysan et al. |
| 8,271,522 | B2 | 9/2012 | Mehul et al. |
| 8,392,530 | B1 | 3/2013 | Manapragada et al. |
| 8,477,660 | B2 | 7/2013 | Lee et al. |
| 8,504,879 | B2 | 8/2013 | Poletto et al. |
| 8,510,562 | B2 | 8/2013 | Ramakrishnan et al. |
| 8,813,228 | B2 * | 8/2014 | Magee .................. G06F 21/577 713/187 |
| 8,885,521 | B2 | 11/2014 | Wang et al. |
| 8,903,973 | B1 | 12/2014 | Hindawi et al. |
| 8,904,039 | B1 | 12/2014 | Hindawi et al. |
| 9,009,827 | B1 * | 4/2015 | Albertson ............... H04L 63/14 726/22 |
| 9,059,961 | B2 | 6/2015 | Hindawi et al. |
| 9,609,007 | B1 * | 3/2017 | Rivlin ................. H04L 63/1416 713/187 |
| 9,667,738 | B2 | 5/2017 | Hindawi et al. |
| 9,769,037 | B2 | 9/2017 | Hindawi et al. |
| 9,985,982 | B1 * | 5/2018 | Bartos ................. H04L 63/1425 713/187 |
| 10,095,864 | B2 | 10/2018 | Hunt et al. |
| 2001/0056461 | A1 | 12/2001 | Kampe et al. |
| 2002/0007404 | A1 | 1/2002 | Vange et al. |
| 2002/0042693 | A1 | 4/2002 | Kampe et al. |
| 2002/0073086 | A1 | 6/2002 | Thompson et al. |
| 2002/0198867 | A1 | 12/2002 | Lohman et al. |
| 2003/0101253 | A1 | 5/2003 | Saito et al. |
| 2003/0131044 | A1 * | 7/2003 | Nagendra ............... H04L 29/06 709/201 |
| 2003/0212676 | A1 | 11/2003 | Bruce et al. |
| 2003/0212821 | A1 | 11/2003 | Gillies et al. |
| 2004/0076164 | A1 | 4/2004 | Vanderveen et al. |
| 2004/0190085 | A1 | 9/2004 | Silverbrook et al. |
| 2005/0004907 | A1 | 1/2005 | Bruno et al. |
| 2005/0108356 | A1 | 5/2005 | Rosu et al. |
| 2005/0108389 | A1 | 5/2005 | Kempin et al. |
| 2005/0195755 | A1 | 9/2005 | Senta et al. |
| 2006/0039371 | A1 | 2/2006 | Castro et al. |
| 2006/0128406 | A1 * | 6/2006 | Macartney .......... H04L 63/1416 455/466 |
| 2007/0005738 | A1 | 1/2007 | Alexion-Tiernan et al. |
| 2007/0211651 | A1 | 9/2007 | Ahmed et al. |
| 2007/0230482 | A1 | 10/2007 | Shim et al. |
| 2008/0082628 | A1 | 4/2008 | Rowstron et al. |
| 2008/0133582 | A1 | 6/2008 | Andersch et al. |
| 2008/0258880 | A1 * | 10/2008 | Smith .................... G08B 21/10 340/286.02 |
| 2008/0263031 | A1 | 10/2008 | George et al. |
| 2008/0288646 | A1 | 11/2008 | Hasha et al. |
| 2009/0125639 | A1 | 5/2009 | Dam et al. |
| 2009/0271360 | A1 | 10/2009 | Bestgen et al. |
| 2009/0319503 | A1 | 12/2009 | Mehul et al. |
| 2009/0328115 | A1 | 12/2009 | Malik |
| 2010/0070570 | A1 | 3/2010 | Lepeska |
| 2010/0085948 | A1 | 4/2010 | Yu et al. |
| 2010/0094862 | A1 | 4/2010 | Bent et al. |
| 2010/0296416 | A1 | 11/2010 | Lee et al. |
| 2010/0306252 | A1 | 12/2010 | Jarvis et al. |
| 2011/0271319 | A1 | 11/2011 | Venable, Sr. |
| 2012/0269096 | A1 | 10/2012 | Roskind |
| 2013/0110931 | A1 | 5/2013 | Kim et al. |
| 2013/0170336 | A1 | 7/2013 | Chen et al. |
| 2013/0276053 | A1 | 10/2013 | Hugard, IV et al. |
| 2014/0075505 | A1 | 3/2014 | Subramanian |
| 2014/0101133 | A1 | 4/2014 | Carston et al. |
| 2014/0149557 | A1 | 5/2014 | Lohmar et al. |
| 2014/0164552 | A1 | 6/2014 | Kim et al. |
| 2014/0181295 | A1 | 6/2014 | Hindawi et al. |
| 2014/0244727 | A1 | 8/2014 | Kang et al. |
| 2014/0280280 | A1 | 9/2014 | Singh |
| 2014/0375528 | A1 * | 12/2014 | Ling ...................... H01Q 15/02 343/912 |
| 2015/0080039 | A1 * | 3/2015 | Ling ..................... H04W 52/02 455/500 |
| 2015/0149624 | A1 | 5/2015 | Hindawi et al. |
| 2015/0163121 | A1 * | 6/2015 | Mahaffey ............ G06F 11/0766 707/687 |
| 2015/0172228 | A1 | 6/2015 | Zalepa et al. |
| 2015/0256575 | A1 | 9/2015 | Scott |
| 2015/0373043 | A1 * | 12/2015 | Wang .................... G06F 21/552 706/12 |
| 2016/0080408 | A1 * | 3/2016 | Coleman ............. H04L 63/1433 726/22 |
| 2016/0119251 | A1 * | 4/2016 | Solis ................... H04L 43/0876 709/224 |
| 2016/0269434 | A1 * | 9/2016 | DiValentin .......... H04L 63/1408 713/187 |
| 2016/0286540 | A1 | 9/2016 | Hindawi et al. |
| 2016/0352588 | A1 | 12/2016 | Subbarayan et al. |
| 2018/0191747 | A1 * | 7/2018 | Nachenberg ........ H04L 63/1416 713/187 |

OTHER PUBLICATIONS

Jae Woo Lee et al., 0 to 10k in 20 seconds: Bootstrapping Large-Scale DHT networks, 2011 IEEE International Conference on Communications, Jun. 9, 2011, pp. 1-6.

Hood, Proactive Network-Fault Detection, Sep. 1997, 9 pages.

Hindawi, Office Action, U.S. Appl. No. 15/702,617, filed Jun. 1, 2018, 37 pgs.

Hindawi, Final Office Action, U.S. Appl. No. 15/702,617, filed Dec. 27, 2018, 54 pgs.

Hunt, Office Action dated Oct. 4, 2018, U.S. Pat. No. 215,468, 13 pgs.

Hunt, Notice of Allowance dated Jan. 24, 2019, U.S. Pat. No. 215,468, 8 pgs.

Hunt, Notice of Allowance dated Apr. 1, 2019, U.S. Pat. No. 215,468, 8 pgs.

Hunt, Office Action dated Sep. 10,2018, U.S. Pat. No. 215,474, 10 pgs.

Hunt, Final Office Action dated Apr. 1, 2019, U.S. Pat. No. 215,474, 7 pgs.

(56) References Cited

OTHER PUBLICATIONS

Mongeau, D., et al., "Ensuring integrity of network inventory and configuration data," Telecommunications Network Strategy and Planning Symposium, Networks 2004, 11th International Vienna, Austria, Jun. 13-16, 2004, 6 pgs.
Rao et al., "Optimal Resource Placement in Structured Peer-to-Peer Networks," Jul. 2010, IEEE Transactions on Parallel and Distributed Systems, vol. 21, No. 7, 16 pgs.
Stoica, I., et al., "Chord: A Scalable Peer-to-Peer Lookup Service for Internet Applications," SIGCOMM '01, Aug. 27-31, 2001, San Diego, California, 12 pages.
Tanium Inc, International Search Report and Written Opinion, PCT/US2013/076971, dated Apr. 4, 2014, 19 pgs.
Tanium Inc, International Preliminary Report on Patentability, PCT/US2013/076971, dated Jun. 23, 2015, 14 pgs.
Tanium Inc, International Search Report and Written Opinion, PCT/US2014/067607, dated Feb. 18, 2015, 15 pgs.
Tanium Inc, International Preliminary Report on Patentability, PCT/US2014/067607, dated May 31, 2016, 11 pgs.
Tanium Inc, International Search Report and Written Opinion, PCT/US2015/020780, dated Jul. 2, 2015, 14 pgs.
Tanium Inc, International Preliminary Report on Patentability, PCT/US2015/0020780, dated Sep. 27, 2016, 9 pgs.
Weixiong Rao et al, "Optimal Resource Placement in Structured Peer-to-Peer Networks," IEEE Transactions on Parallel and Distributed Systems, vol. 21, No. 7, Jul. 2010, 16 pgs.
Lippincott, Notice of Allowance, U.S. Appl. No. 15/878,286, filed Apr. 25, 2019, 9 pgs.

* cited by examiner

200

202

204

206-1

206-2

208

```xml
This XML file does not appear to have any style information associated with it. The document tree is shown below.
<ioc xmlns:xsi="http://www.w3.org/2001/XMLSchema-instance" xmlns:xsd="http://www.w3.org/2001/XMLSchema" xmlns="http://schemas.
mandiant.com/2010/ioc" id="fc2d3e44-80a6-4add-ad94-de9f289e62ff" last-modified="2011-10-28T21:00:13">
        <short_description>CCAPP.EXE</short_description>
        <description>Custom Reverse shell.</description>
        <keywords/>
        <authored_by>Mandiant</authored_by>
        <authored_date>2010-12-13T12:49:53</authored_date>
        <links>
                <link rel="grade">Alpha</link>
        </links>
        <definition>
                <Indicator operator="OR" id="d610019c-379f-4d3e-b299-f0b0e5c3313a">
                        <IndicatorItem id="86d0e6fc-ff41-4743-8a9a-c323ef8ad8cb" condition="is">
                                <Context document="FileItem" search="FileItem/Md5sum" type="mir"/>
                                <Content type="md5">9855C23BE2B6F38630756A277B52CDD2</Content>
                        </IndicatorItem>
                        <IndicatorItem id="78c1c4c9-500f-40b3-be62-4c16b5058da9" condition="is">
                                <Context document="FileItem" search="FileItem/Md5sum" type="mir"/>
                                <Content type="md5">ACB81BEE009B09B2A0688F05EA45851F</Content>
                        </IndicatorItem>
                </Indicator>
        </definition>
</ioc>
```

```
This XML file does not appear to have any style information associated with it. The document tree is shown below.
<ioc xmlns:xsi="http://www.w3.org/2001/XMLSchema-instance" xmlns:xsd="http://www.w3.org/2001/XMLSchema" xmlns="http://schemas.
mandiant.com/2010/ioc" id="fc2d3e44-80a6-4add-ad94-de9f289e62ff" last-modified="2011-10-28T21:00:13">
        <short_description>CBAPP.EXE</short_description>
        <description>Custom Reverse shell.</description>
        <keywords/>
        <authored_by>Mandiant</authored_by>
        <authored_date>2010-12-13T12:49:53</authored_date>
        <links>
                <link rel="grade">Alpha</link>
        </links>
        <definition>
                <Indicator operator="AND" id="d610019c-379f-4d3e-b299-f0b0e5c3313a">
                        <IndicatorItem id="86d0e6fc-ff41-4743-8a9a-c323ef8ad8cb" condition="is">
                                <Context document="FileItem" search="FileItem/Md5sum" type="mir"/>
                                <Content type="md5">9855C23BE2B6F38630756A277B52CDD2</Content>
                        </IndicatorItem>
                        <IndicatorItem id="78c1c4c9-500f-40b3-be62-4c16b5058da9" condition="is">
                                <Context document="FileItem" search="FileItem/Name" type="mir"/>
                                <Content type="string">CBAPP.EXE</Content>
                        </IndicatorItem>
                </Indicator>
        </definition>
</ioc>
```

Figure 2B

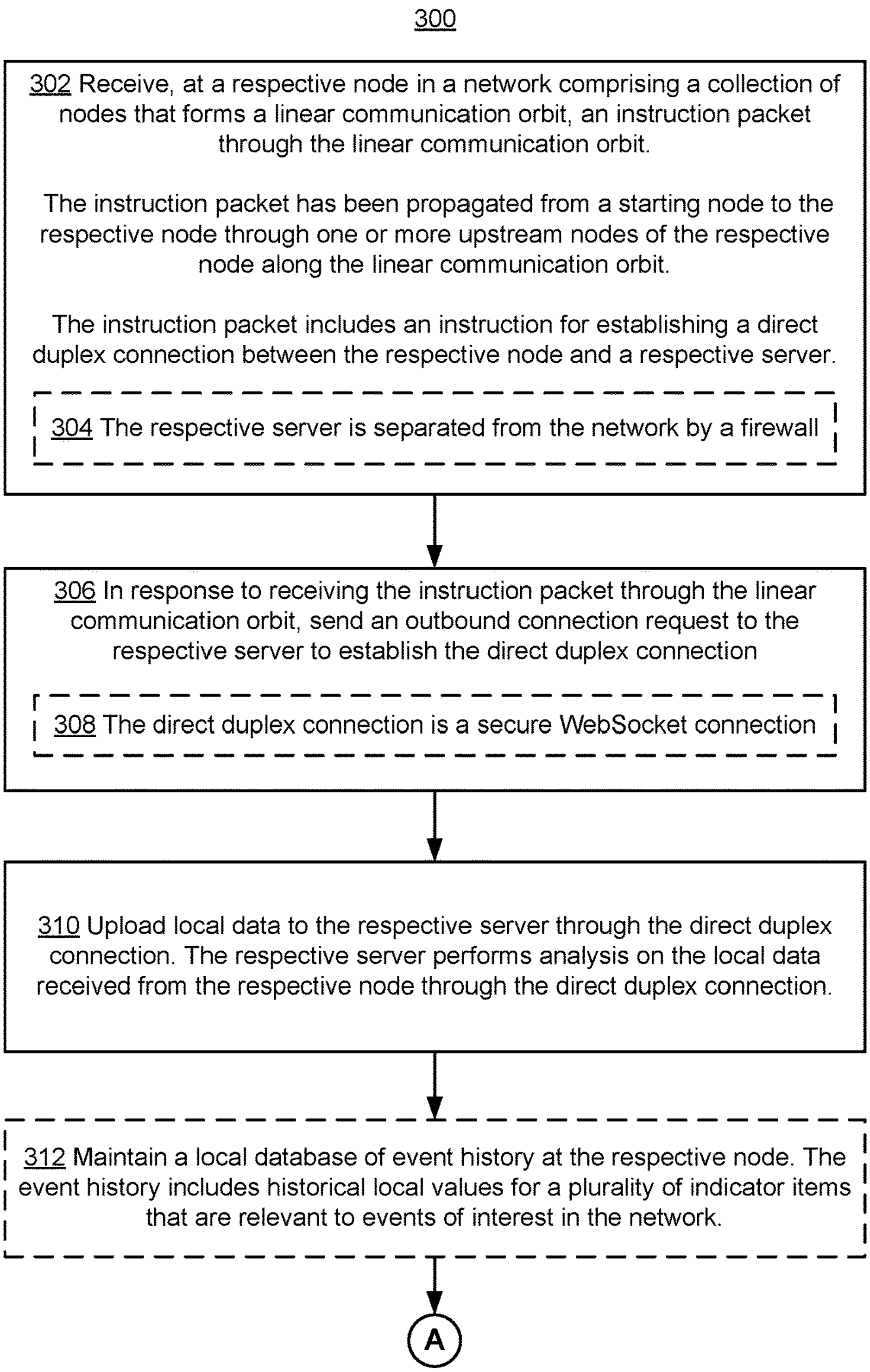

302 Receive, at a respective node in a network comprising a collection of nodes that forms a linear communication orbit, an instruction packet through the linear communication orbit.

The instruction packet has been propagated from a starting node to the respective node through one or more upstream nodes of the respective node along the linear communication orbit.

The instruction packet includes an instruction for establishing a direct duplex connection between the respective node and a respective server.

304 The respective server is separated from the network by a firewall

306 In response to receiving the instruction packet through the linear communication orbit, send an outbound connection request to the respective server to establish the direct duplex connection

308 The direct duplex connection is a secure WebSocket connection

310 Upload local data to the respective server through the direct duplex connection. The respective server performs analysis on the local data received from the respective node through the direct duplex connection.

312 Maintain a local database of event history at the respective node. The event history includes historical local values for a plurality of indicator items that are relevant to events of interest in the network.

(A)

400

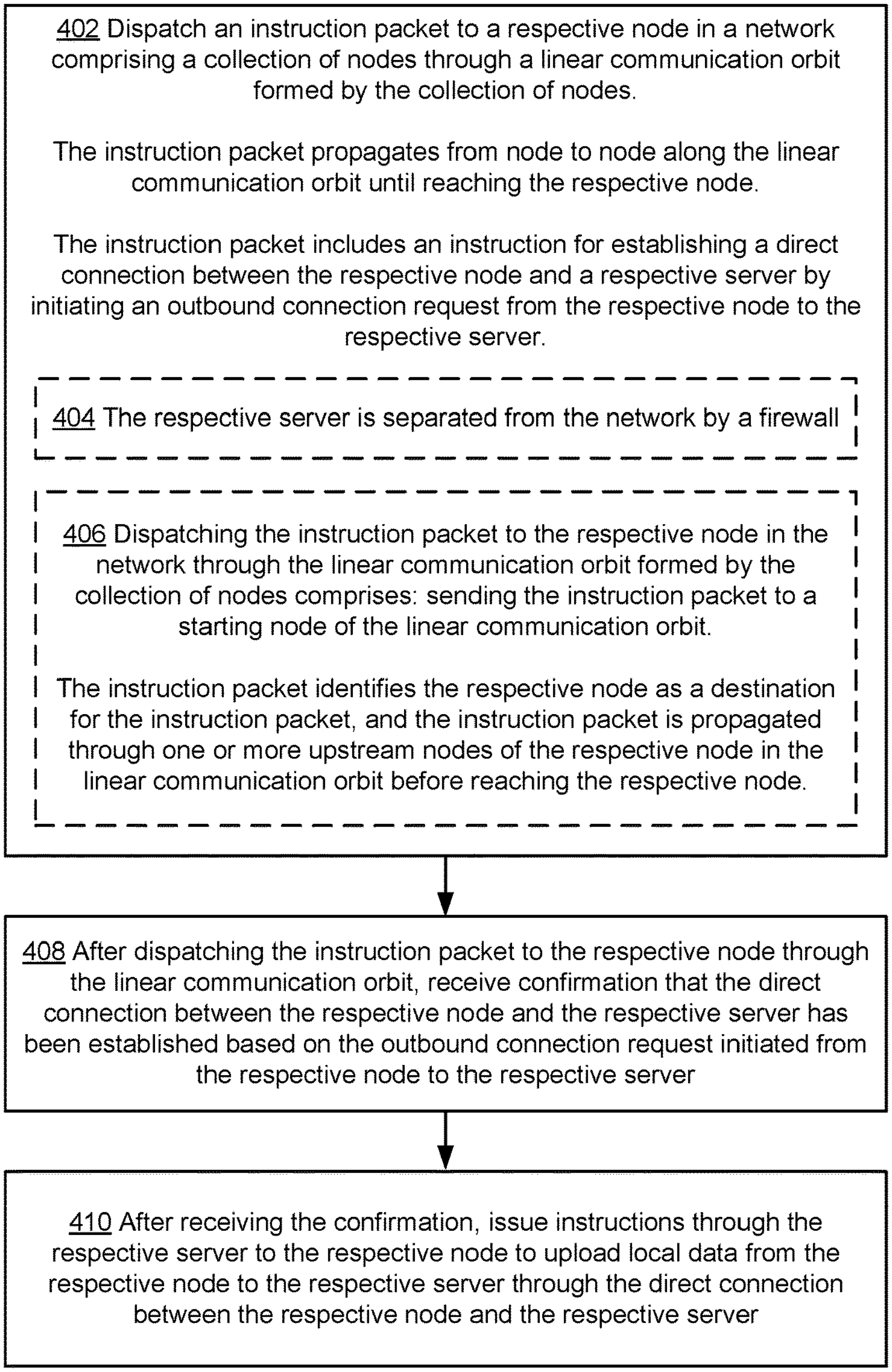

402 Dispatch an instruction packet to a respective node in a network comprising a collection of nodes through a linear communication orbit formed by the collection of nodes.

The instruction packet propagates from node to node along the linear communication orbit until reaching the respective node.

The instruction packet includes an instruction for establishing a direct connection between the respective node and a respective server by initiating an outbound connection request from the respective node to the respective server.

404 The respective server is separated from the network by a firewall

406 Dispatching the instruction packet to the respective node in the network through the linear communication orbit formed by the collection of nodes comprises: sending the instruction packet to a starting node of the linear communication orbit.

The instruction packet identifies the respective node as a destination for the instruction packet, and the instruction packet is propagated through one or more upstream nodes of the respective node in the linear communication orbit before reaching the respective node.

408 After dispatching the instruction packet to the respective node through the linear communication orbit, receive confirmation that the direct connection between the respective node and the respective server has been established based on the outbound connection request initiated from the respective node to the respective server

410 After receiving the confirmation, issue instructions through the respective server to the respective node to upload local data from the respective node to the respective server through the direct connection between the respective node and the respective server

500

502 Dispatch an instruction packet to a respective node in a network comprising a collection of nodes through a linear communication orbit formed by the collection of nodes.

The instruction packet propagates from node-to-node along the linear communication orbit until reaching the respective node. The instruction packet includes an instruction for establishing a direct duplex connection between the respective node and the respective server by initiating an outbound connection request from the respective node to the respective server.

> 504 Dispatching the instruction packet to the respective node in the network through the linear communication orbit formed by the collection of nodes comprises: sending the instruction packet to a starting node of the linear communication orbit.
>
> The instruction packet identifies the respective node as a destination for the instruction packet, and the instruction packet is propagated through one or more upstream nodes of the respective node in the linear communication orbit before reaching the respective node.

> 506 The direct duplex connection is a secure WebSocket connection

> 508 The respective server is separated from the network by a firewall

510 After dispatching the instruction packet to the respective node through the linear communication orbit, receive, from the respective node, a request for establishing the direct duplex connection between the respective node and the respective server

512 In response to receiving the request from the respective node, establish the direct duplex connection between the respective node and the respective server (A)

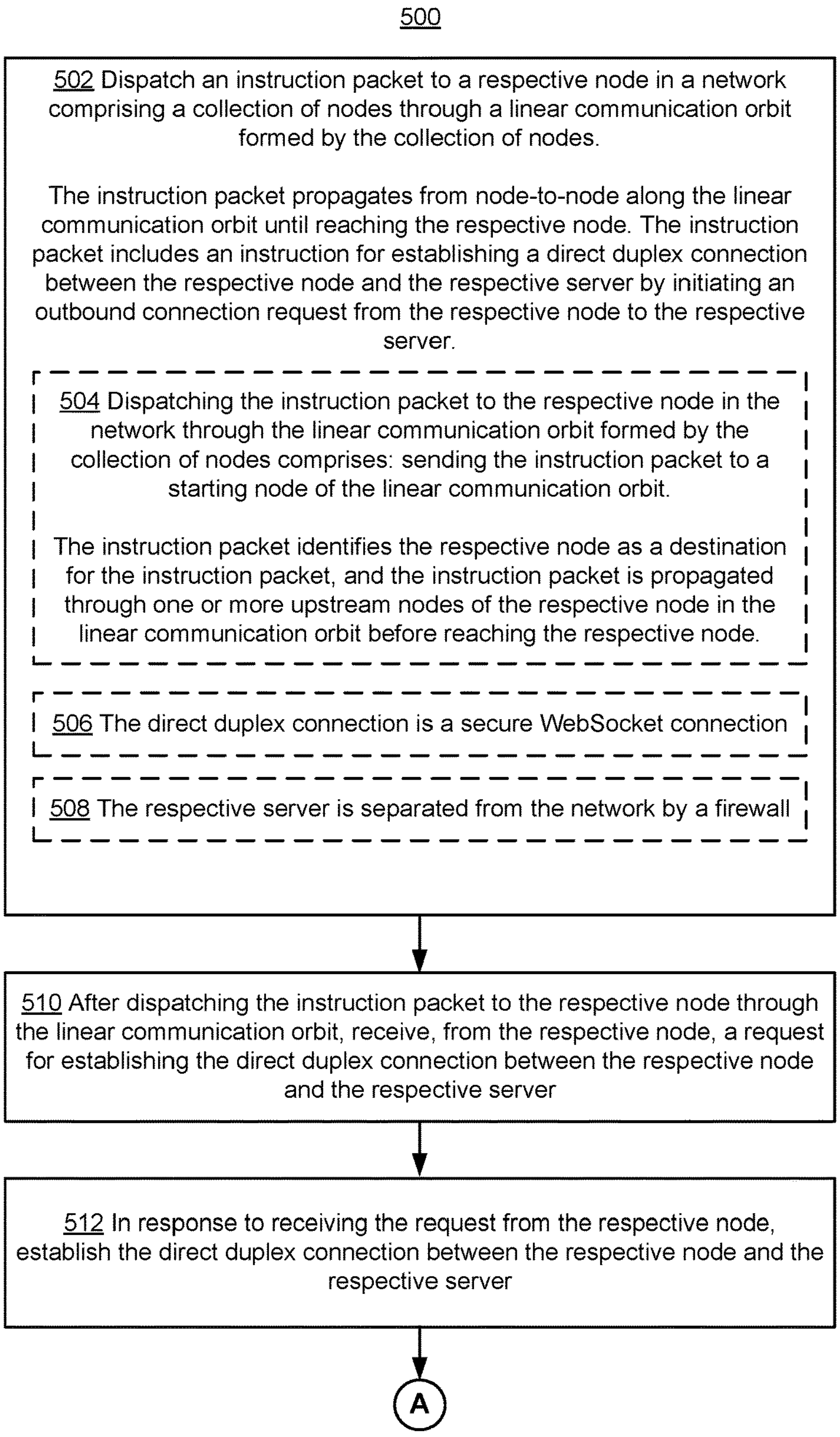

Figure 5D:
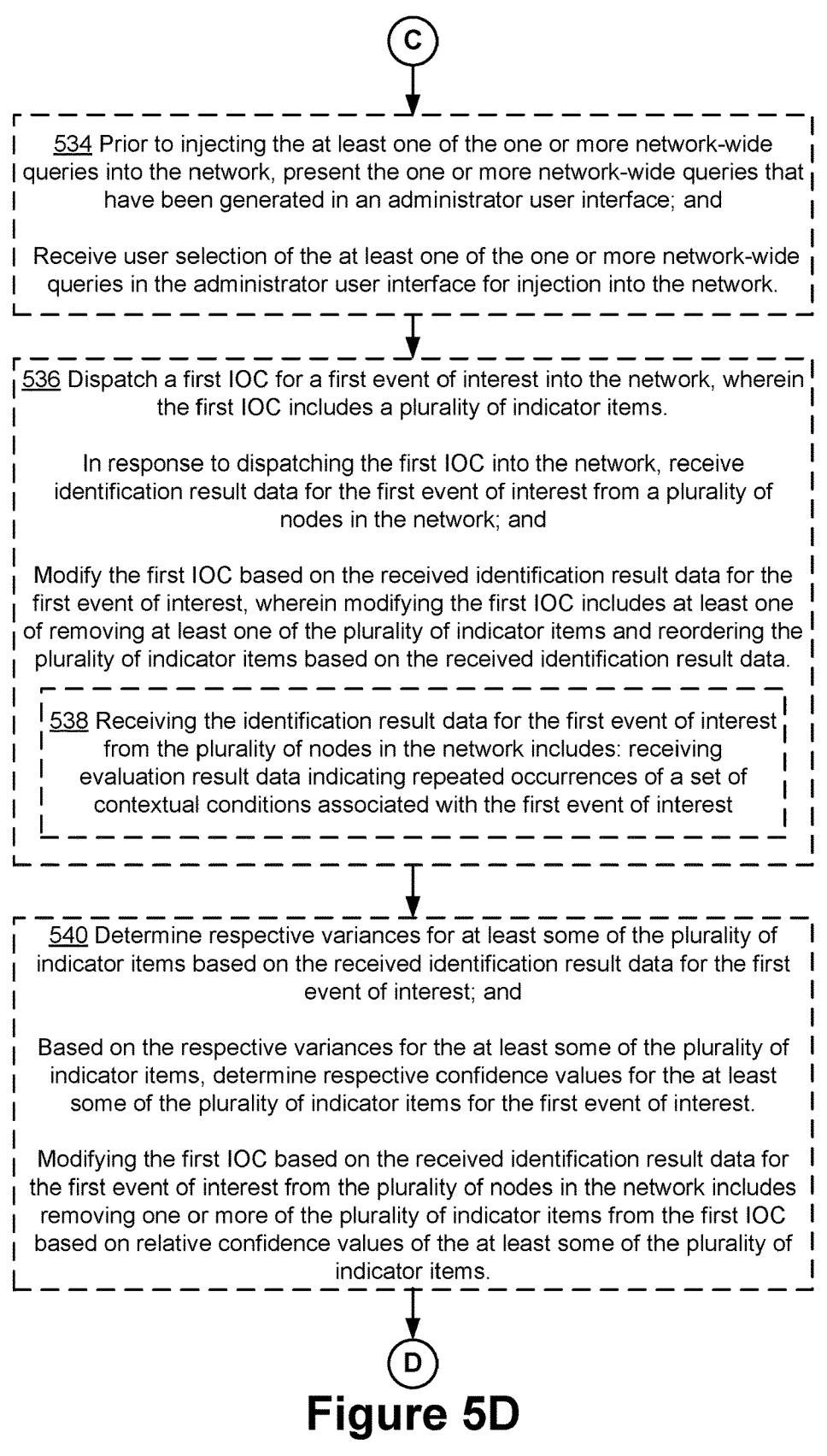

534 Prior to injecting the at least one of the one or more network-wide queries into the network, present the one or more network-wide queries that have been generated in an administrator user interface; and Receive user selection of the at least one of the one or more network-wide queries in the administrator user interface for injection into the network.

536 Dispatch a first IOC for a first event of interest into the network, wherein the first IOC includes a plurality of indicator items.

In response to dispatching the first IOC into the network, receive identification result data for the first event of interest from a plurality of nodes in the network; and Modify the first IOC based on the received identification result data for the first event of interest, wherein modifying the first IOC includes at least one of removing at least one of the plurality of indicator items and reordering the plurality of indicator items based on the received identification result data.

538 Receiving the identification result data for the first event of interest from the plurality of nodes in the network includes: receiving evaluation result data indicating repeated occurrences of a set of contextual conditions associated with the first event of interest 540 Determine respective variances for at least some of the plurality of indicator items based on the received identification result data for the first event of interest; and Based on the respective variances for the at least some of the plurality of indicator items, determine respective confidence values for the at least some of the plurality of indicator items for the first event of interest.

Modifying the first IOC based on the received identification result data for the first event of interest from the plurality of nodes in the network includes removing one or more of the plurality of indicator items from the first IOC based on relative confidence values of the at least some of the plurality of indicator items.

INTEGRITY MONITORING IN A LOCAL NETWORK

RELATED APPLICATIONS

This application is a continuation-in-part of U.S. patent application Ser. No. 15/215,483, now U.S. Pat. No. 10,095,864, filed Jul. 20, 2016, titled "System and Method for Performing Event Inquiries in a Network," and U.S. patent application Ser. No. 15/215,474, now co-pending, filed Jul. 20, 2016, titled "System and Method for Performing Event Inquiries in a Network," both of which claim the benefit of U.S. Provisional Application Ser. No. 62/333,768, filed May 9, 2016, titled "System and Method for Performing Event Inquiries in a Network"; and U.S. Provisional Patent Application Ser. No. 62/305,482, filed Mar. 8, 2016, titled "Cost Prioritized Evaluations of Indicators of Compromise." The content of each of the above applications is hereby incorporated by reference in its entirety.

This application is related to U.S. patent application Ser. No. 13/797,946, filed Mar. 12, 2013, now U.S. Pat. No. 9,246,977, titled "System and Network Management Using Self-Organizing Communication Orbits in Distributed Networks"; U.S. patent application Ser. No. 12/412,623, filed Mar. 27, 2009, now U.S. Pat. No. 8,086,729, titled "Distributed Statistical Detection of Network Problems and Cause"; U.S. patent application Ser. No. 13/084,923, filed Apr. 12, 2011, now U.S. Pat. No. 8,904,039, titled "Large-Scale Network Querying and Reporting"; U.S. patent application Ser. No. 13/107,625, filed May 13, 2011 now U.S. Pat. No. 8,903,973, titled "Parallel Distributed Network Management"; U.S. patent application Ser. No. 14/553,769, filed Nov. 25, 2014, now U.S. Pat. No. 9,769,037, titled "Fast Detection and Remediation of Unmanaged Assets"; U.S. patent application Ser. No. 14/554,739, filed Nov. 26, 2014, now U.S. Pat. No. 9,769,275, titled "Data Caching and Distribution in a Local Network"; and U.S. patent application Ser. No. 15/136,790, now co-pending, filed Apr. 22, 2016, titled "Reliable Map-Reduce Communications in a Decentralized, Self-Organizing Communication Orbit of a Distributed Network," Content of each of the above applications is hereby incorporated by reference in its entirety. The above applications are also referred to hereafter as "the Related Applications" or "the Incorporated Disclosure.

TECHNICAL FIELD

The present disclosure relates to threat detection and management in computers and computer networks.

BACKGROUND

Network administrators (e.g., administrators of enterprise-level networks, such as banking networks, e-Commerce networks, etc.) often hire third-party cybersecurity companies to monitor and respond to threats. Thus, those responding to security incidents are often located remotely from the network rather than within it. Nevertheless, when a possible threat is detected, security incident responders need to be able to perform forensic investigations on nodes within the network, e.g., by inquiring into events at the nodes. But because network nodes are often isolated from (e.g., remote from) the servers used by security incident responders (e.g., isolated by a firewall), it is difficult for these remote servers to communicate directly with nodes within the network. Network administrators simply do not want to allow direct communication of remote computers with nodes within their networks if the channels of communication cannot be trusted.

SUMMARY

Accordingly, there is a need within the realm of threat detection and management for trusted connections between a node in a network and a remote server (e.g., a third-party investigating server). To that end, a method is provided for monitoring a network (e.g., establishing trusted communication channels, performing event inquiries and forensic investigation for security threats, etc.), where the network comprises a collection of nodes that forms a linear communication orbit. The method is performed at a respective node in the linear communication orbit. The respective node receives an instruction packet through the linear communication orbit, where the instruction packet has been propagated from a starting node to the respective node through one or more upstream nodes of the respective node along the linear communication orbit, and the instruction packet includes an instruction for establishing a direct duplex connection (e.g., a direct full-duplex connection, or direct by-directional connection) between the respective node and a respective server (e.g., the remote investigating server). In response to receiving the instruction packet through the linear communication orbit, the respective node sends an outbound connection request to the respective server to establish the direct duplex connection. The respective node then uploads local data (e.g., answers to queries regarding current and historical local states, evaluation results for indicators of compromises, and data from local event logs, etc.) to the respective server through the direct duplex connection (e.g., in response to one or more queries, instructions, and requests received from the respective server through the direct duplex connection), where the respective server performs analysis on the local data received from the respective node through the direct duplex connection.

In some embodiments, a method is provided for monitoring a network comprising a collection of nodes that forms a linear communication orbit. The method is performed at an administrator's device (e.g., a network administrator or security incident responder's workstation) that is in communication with a server of the network and the remote investigating server. The administrator's device dispatches an instruction packet to a respective node in the network through the linear communication orbit formed by the collection of nodes (e.g., by sending the instruction packet to a starting node of the linear communication orbit (e.g., the server of the network)), where the instruction packet propagates from node to node along the linear communication orbit until reaching the respective node, and where the instruction packet includes an instruction for establishing a direct connection between the respective node and a respective server (e.g., the remote investigating server) by initiating an outbound connection request from the respective node to the respective server. After dispatching the instruction packet to the respective node through the linear communication orbit, the administrator's device receives confirmation (e.g., from the remote investigating server) that the direct connection between the respective node and the respective server has been established based on the outbound connection request initiated from the respective node to the respective server. After receiving the confirmation, the administrator's device issues instructions through the respective server to the respective node to upload local data from the respective node to the respective server through the direct connection between the respective node and the respective server.

In some embodiments, a method is provided for monitoring a network comprising a collection of nodes. The method is performed at a respective server (e.g., a remote investigating server) for monitoring the network. The respective server dispatches an instruction packet to a respective node in the network through a linear communication orbit formed by the collection of nodes (e.g., by sending the instruction packet to a starting node of the linear communication orbit (e.g., the server of the network)), where the instruction packet propagates from node to node along the linear communication orbit until reaching the respective node, and where the instruction packet includes an instruction for establishing a direct duplex connection between the respective node and the respective server by initiating an outbound connection request from the respective node to the respective server. After dispatching the instruction packet to the respective node through the linear communication orbit, the respective server receives, from the respective node, a request for establishing the direct duplex connection between the respective node and the respective server. In response to receiving the request from the respective node, the respective server establishes the direct duplex connection between the respective node and the respective server and, after establishing the direct duplex connection, the respective server issues instructions to the respective node to upload local data from the respective node to the respective server through the direct duplex connection between the respective node and the respective server.

In some embodiments, a computer system (e.g., node 102, administrator's device 116, server 108 and/or server 110, FIGS. 1A-1B, FIGS. 6-9) includes one or more processors and memory storing one or more programs for execution by the one or more processors, the one or more programs include instructions for performing, or controlling performance of, the operations of any of the methods described herein.

In some embodiments, a non-transitory computer readable storage medium stores one or more programs, the one or more programs comprising instructions, which, when executed by a computer system (e.g., node 102, administrator's device 116, server 108 and/or server 110, FIGS. 1A-1B, FIGS. 6-9) with one or more processors, cause the computer system to perform, or control performance of, the operations of any of the methods described herein.

In some embodiments, a computer system (e.g., node 102, administrator device 116, server 108 and/or server 110, FIGS. 1A-1B, FIGS. 6-9) includes means for performing, or controlling performance of, the operations of any of the methods described herein.

In one aspect, a method is performed to monitor a network including a plurality of machines located at a non-static collection of nodes that form a linear communication orbit. The method is performed at a respective node in the linear communication orbit. Each machine of the plurality of machines has a respective machine identifier, and the plurality of machines have self-organized into an ordered sequence in accordance with a predefined order of the respective machine identifiers of the plurality of machines. The method includes performing a set of integrity monitoring operations. The integrity monitoring operations include receiving a watch list through the linear communication orbit. The watch list is sent by a server system coupled to the linear communication orbit, and propagates from node to node along the linear communication orbit until reaching the respective node. The watch list identifies one or more objects for which events are to be monitored. The integrity monitoring operations further include identifying a plurality of events that occur locally at the respective node, including events for the one or more objects identified by the received watch list, in real-time while the plurality of events are occurring. The integrity monitoring operations further include storing in a local database event information for the identified plurality of events at the respective node, and receiving an integrity reporting request through the linear communication orbit. The integrity reporting request is sent by the server system, and propagates from node to node along the linear communication orbit until reaching the respective node. In some embodiments, the integrity reporting request is received periodically from the server system according to a predetermined schedule. The integrity monitoring operations further include in response to the integrity reporting request, identifying a subset of the event information for the identified plurality of events in the local database, and returning the identified subset of the event information to the server system through the linear communication orbit. The subset of the event information corresponds to event information for at least some of the one or more objects identified by the received watch list.

In some embodiments, the method for monitoring the network further includes at the server system coupled to the linear communication orbit, sending the watch list through the linear communication orbit to two or more machines of the plurality of machines in the linear communication orbit, and performing the set of integrity monitoring operations at each of the two or more machines. The two or more machines are located at a first subset of nodes of the linear communication orbit. Specifically, in some embodiments, the server system is configured to divide the watch list into a plurality of file shards from which the watch list is restorable, and send the plurality of file shards to the two or more machines of the plurality of machines in the linear communication orbit. One or more copies of each file shard of the plurality of file shards are propagated from node to node along the linear communication orbit while the watch list is being distributed to the two or more machines of the plurality of machines. Each of the two or more machines assembles the plurality of file shards into the watch list after receiving each of the plurality of file shards through the linear communication orbit.

In some embodiments, the watch list defines one or more event types to be monitored locally at the respective node for each of the one or more objects identified in the watch list. Optionally, for each of the one or more objects, the one or more event types include at least one of creation, deletion, modification, renaming, and changing access permissions of the respective object. In some embodiments, the one or more objects identified by the watch list include one of a file and a directory. In some embodiments, the watch list excludes a directory path or a directory path type.

In some embodiments, the server system is coupled to an administrator machine. The method for monitoring the network further includes at the server system, receiving from the administrator machine an integrity monitoring instruction to deploy the watch list to a first subset of nodes (e.g., a group of nodes identified based on specified criteria) in the linear communication orbit. The integrity monitor instruction includes the watch list and identifiers of the first subset of nodes including the respective node. Further, in some embodiments, the operation of receiving the integrity monitoring instruction further includes receiving a user selection of a target operating system, and receiving a selection of the one or more objects identified by the watch list from a watch list template including a predefined list of files and directories to be monitored at the first subset of nodes in the linear communication orbit. Two or more machines are located at the first subset of nodes and are configured to execute the target operating system. Alternatively, in some implementations, the operation of receiving the integrity monitoring instruction further includes receiving at the server system a user input to exclude a directory path or a directory path type from the watch list.

In some embodiments, the operation of storing in the local database event information for the identified plurality of events at the respective node further includes creating a plurality of integrity warning tags to identify a subset of the events for the one or more objects identified by the received watch list, and storing in the local database each of the plurality of integrity warning tags in association with a respective one of the subset of events. Each integrity warning tag indicates that the respective one of the subset of events has been identified as an event for the one or more objects according to the watch list. Additionally, in some embodiments, the integrity reporting request includes a command to return to the server system event information for any event that is stored in the local database with an integrity warning tag. The operation of identifying and returning the subset of the event information further includes in response to the integrity reporting request, identifying in the database the subset of the events for the one or more objects identified by the received watch list, and returning to the server system event information for the identified subset of the events for the one or more objects identified by the received watch list. The identified subset of the events have been stored with the plurality of integrity warning tags.

In some embodiments, the integrity reporting request includes an encryption key for encrypting the identified subset of the event information at the respective node before uploading the identified subset of the event information to the server system, and the server system possesses a decryption key corresponding to the encryption key.

In some embodiments, the method for monitoring the network further includes at the server system, after receiving the subset of the event information for the identified plurality of events, labeling respective events in the events for the one or more objects identified by the received watch list with predefined labels that correspond to predefined event evaluations.

In some embodiments, the integrity reporting request includes an integrity reporting criterion, and the subset of the event information for the identified plurality of events corresponds to event information in the local database that satisfies the integrity reporting criterion. For example, in some embodiments, the integrity reporting criterion defines a time window. The operation of returning the identified subset of the event information to the server system includes in accordance with the integrity reporting criterion, returning event information in the local database for at least some events that occurred within the time window for the one or more objects identified by the received watch list. In some embodiments, the integrity reporting criterion defines at least one of: a time window within which one or more events of interest corresponding to the subset of the event information occurred, one or more users who initiate the one or more events of interest corresponding to the subset of the event information, and a list of authorized applications that are permitted to make changes to the one or more objects identified by the watch list.

Alternatively, in some embodiments, the method for monitoring the network further includes after receiving the subset of the event information for the identified plurality of events, identifying by the server system one or more events of interest by filtering the subset of the event information for the identified plurality of events according to an integrity monitoring criterion. Further, in some embodiments, the integrity monitoring criterion defines at least one of: a time window within which the one or more events of interest corresponding to the subset of the event information occurred, one or more users who initiate the one or more events of interest corresponding to the subset of the event information, and a list of authorized applications that are permitted to make changes to the one or more objects identified by the watch list.

In some embodiments, the method for monitoring the network further includes receiving from the server system a direct communication instruction for establishing a direct duplex connection between the respective node and the server system. The method for monitoring the network further includes, in response to receiving the direct communication instruction through the linear communication orbit, sending by the respective node an outbound connection request to the server system to establish a direct duplex connection between the respective node and the server system. The method for monitoring the network further includes uploading local context data related to an event of interest to the server system through the direct duplex connection. The server system performs analysis on the local context data received from the respective node through the direct duplex connection to investigate integrity of a respective object corresponding to the event of interest that has occurred at the respective node. Further, in some embodiments, the direct duplex connection is a secure websocket connection. Under some circumstances, the server system is separated from the network by a firewall.

In some embodiments, the subset of the event information for the identified plurality of events that is identified in the local database includes a first subset of the event information for the identified plurality of events. The method for monitoring the network further includes at the respective node, in response to the integrity reporting request, receiving a second subset of event information for a second plurality of events that are identified at a second node in the linear communication orbit. The second node is distinct from the respective node, and the second subset corresponds to at least some of the one or more objects identified by the watch list received at the second node. The method for monitoring the network further includes aggregating the first subset of the event information for the plurality of events identified at the respective node and the second subset of the event information for the second plurality of events identified at the second node. The aggregated first and second subsets of event information is returned to the server system via the linear communication orbit.

In another aspect of the invention, a computational machine of a computer network includes one or more processors, and memory having instructions stored thereon, which when executed by the one or more processors cause the computational machine to perform a set of integrity monitoring operations. The network includes a plurality of machines located at a non-static collection of nodes that form the linear communication orbit. The computational machine is located at a respective node in the linear communication orbit. Each machine of the plurality of machines has a respective machine identifier, and the plurality of machines have self-organized into an ordered sequence in accordance with a predefined order of the respective machine identifiers of the plurality of machines. The integrity monitoring operations performed by the computational machine include receiving a watch list through a linear communication orbit. The watch list is sent by a server system coupled to the linear communication orbit, and propagates from node to node along the linear communication orbit until reaching the respective node. The watch list identifies one or more objects for which events are to be monitored. The integrity monitoring operations further include identifying a plurality of events that occur locally at the respective node, including events for the one or more objects identified by the received watch list, in real-time while the plurality of events are occurring. The integrity monitoring operations further include storing in a local database event information for the identified plurality of events at the respective node, and receiving an integrity reporting request through the linear communication orbit. The integrity reporting request is sent by the server system, and propagates from node to node along the linear communication orbit until reaching the respective node. The integrity monitoring operations further include in response to the integrity reporting request, identifying a subset of the event information for the identified plurality of events in the local database, and returning the identified subset of the event information to the server system through the linear communication orbit. The subset of the event information corresponds to event information for at least some of the one or more objects identified by the received watch list.

In some embodiments, the instructions stored in the memory of the computational device of the computer network include instructions for causing the computational device to perform the method of any of the methods described above.

In yet another aspect of the invention, another method is performed to monitor a network including a plurality of machines located at a non-static collection of nodes that form a linear communication orbit. The method is performed at a server system coupled to the linear communication orbit. Each machine of the plurality of machines has a respective machine identifier, and the plurality of machines have self-organized into an ordered sequence in accordance with a predefined order of the respective machine identifiers of the plurality of machines. The method includes performing a set of integrity monitoring operations. The integrity monitoring operations include sending a watch list through the linear communication orbit to two or more machines of the plurality of machines in the linear communication orbit. The watch list propagates from node to node along the linear communication orbit until reaching each of the two or more machines, and identifies one or more objects for which events are to be monitored at the two or more machines. The integrity monitoring operations further include sending an integrity reporting request through the linear communication orbit to the two or more machines. The integrity reporting request propagates from node to node along the linear communication orbit until reaching each of the two or more machines. The integrity monitoring operations further include in response to the integrity reporting request, receiving from each of the two or more machines a subset of event information for a plurality of events. The plurality of events are identified locally in real-time at the respective node, and the event information of the plurality of events is stored in the local database of the respective node. The subset of the event information returned to the server system corresponds to event information for at least some of the one or more objects identified by the received watch list.

In some embodiments, the method further includes identifying an event of interest based on the subset of the event information for the plurality of events received from a first machine, and sending a direct communication instruction for establishing a direct duplex connection between the first node and the server system. The method further includes in response to sending the direct communication instruction through the linear communication orbit, receiving an outbound connection request from the first machine to establish a direct duplex connection between the first machine and the server system. The method further includes receiving local context data related to the event of interest from the first machine through the direct duplex connection. The server system performs analysis on the local context data received from the first machine to investigate integrity of a respective object corresponding to the event of interest that has occurred at the first machine.

Other embodiments and advantages may be apparent to those skilled in the art in light of the descriptions and drawings in this specification.

BRIEF DESCRIPTION OF THE DRAWINGS

FIGS. 2A-2B illustrate examples of specifications of indicators of compromise (IOCs), in accordance with some embodiments.

FIGS. 3A-3B are a flow chart of a method for establishing a direct duplex connection between a node and a remote server (e.g., server 110, FIG. 1B), e.g., for forensic investigation by the remote server, in accordance with some embodiments. In some embodiments, the method illustrated in 3A-3B is performed by a node in a network.

FIG. 4 is a flow chart of a method for establishing a direct duplex connection between a node and a remote server (e.g., server 110, FIG. 1B), e.g., for forensic investigation by the remote server, in accordance with some embodiments. In some embodiments, the method illustrated in FIG. 4 is performed by an administrator's device.

FIGS. 5A-5E are a flow chart of a method for establishing a direct duplex connection between a node and a remote server (e.g., server 110, FIG. 1B), e.g., for forensic investigation by the remote server, in accordance with some embodiments. In some embodiments, the method illustrated in FIGS. 5A-5E is performed by the remote server.

Like reference numerals refer to corresponding parts throughout the drawings.

DESCRIPTION OF EMBODIMENTS

Figure 1A:
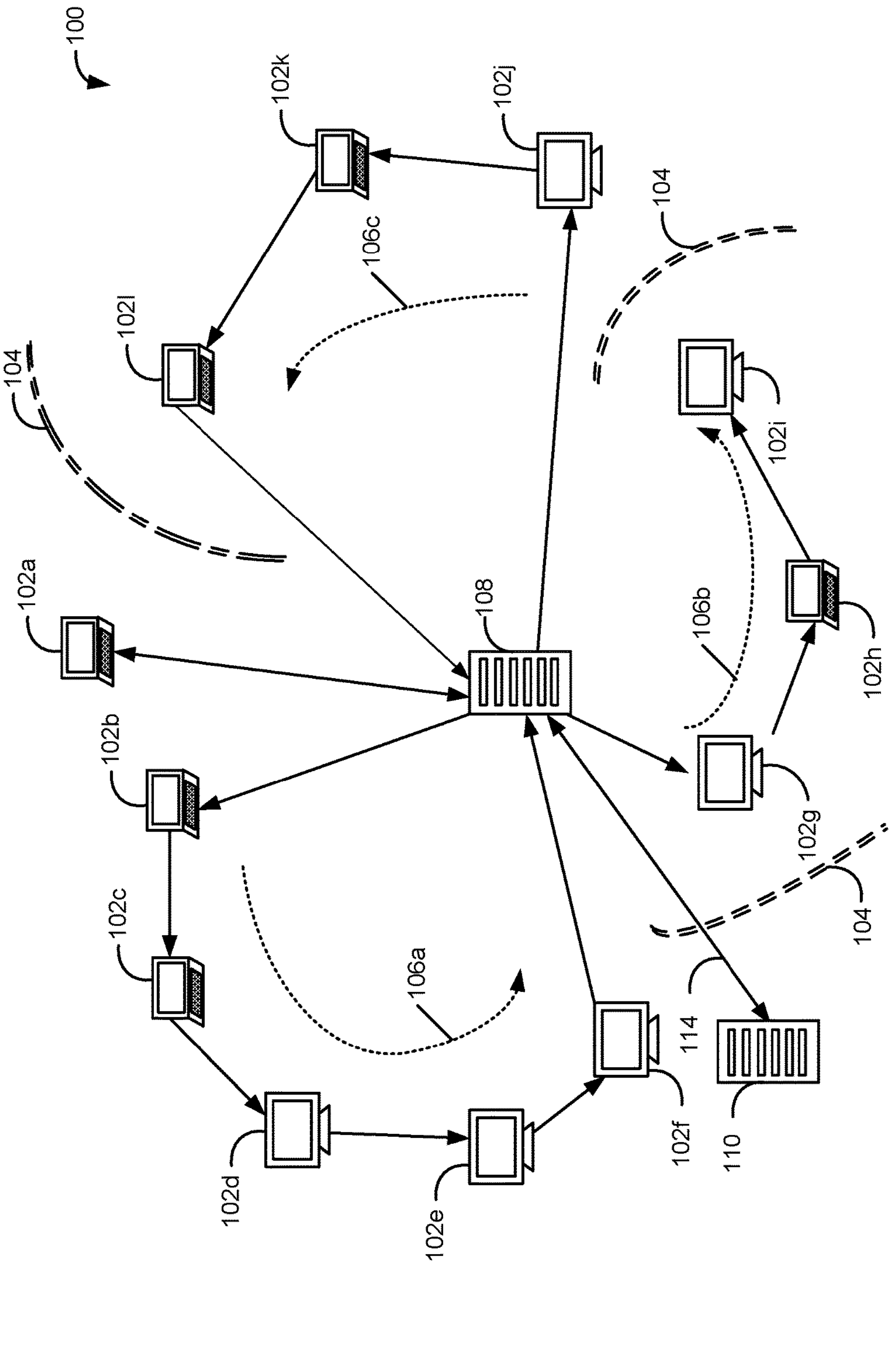
FIGS. 1A-1B illustrate a computer network organized into linear communication orbits, in accordance with some embodiments.
Figure 1B:
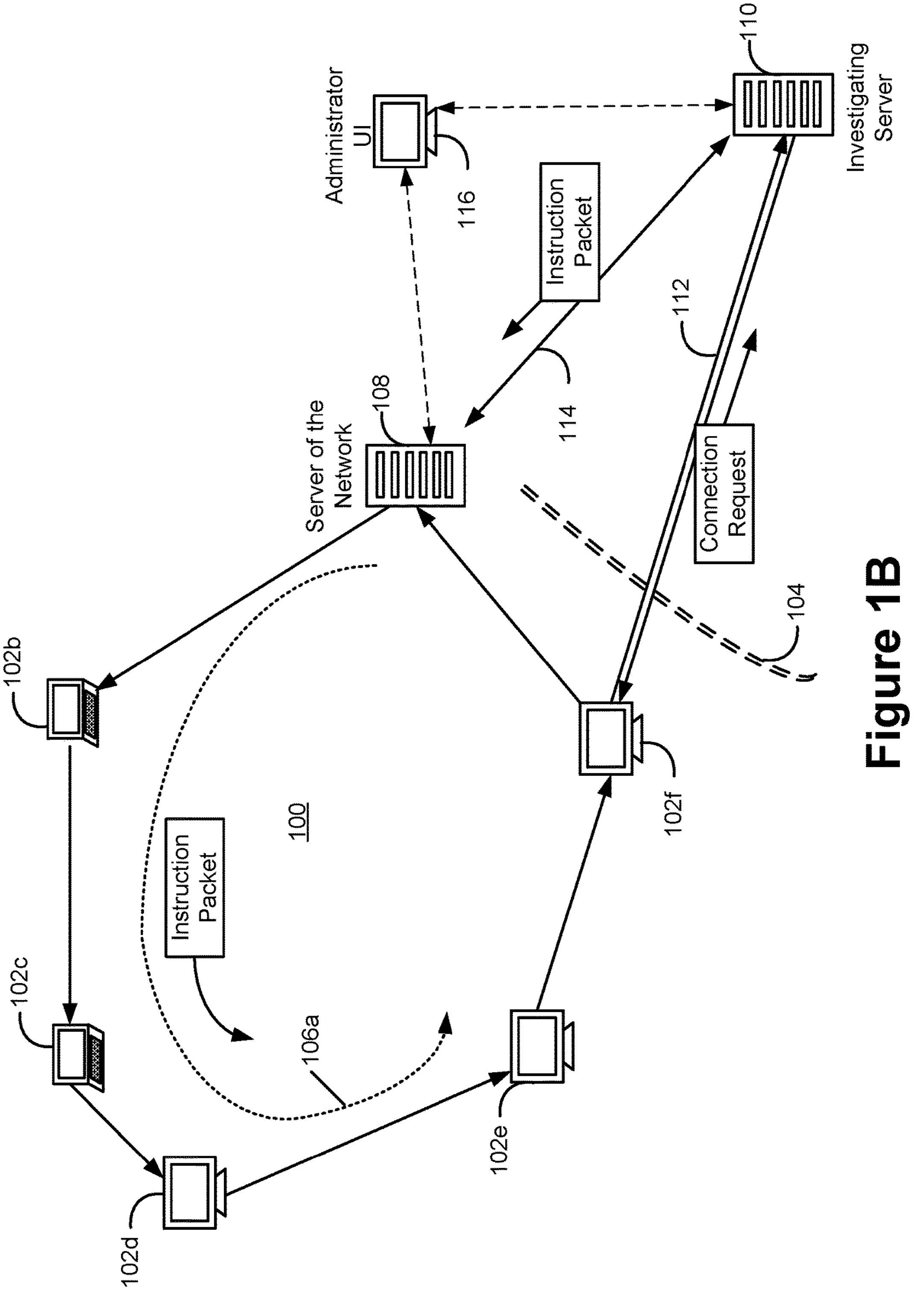

Some methods and devices described in the present specification improve upon threat detection and management by continuously monitoring integrity of operating systems, applications and log files on individual computational machines 102 that are located at different client nodes of an established linear communication orbit 106 as shown in FIGS. 1A and 1B. Such integrity monitoring operations are not limited by a specific schedule, and can be implemented in real-time and without interruption at the individual computational machines. Specifically, in a typical scenario, a server system selects two or more machines 102 located at a subset of the different client nodes of linear communication orbit 106, and specifies a watch list identifying one or more objects (e.g., a file and a directory path) for which events are to be monitored at the two or more machines. The watch list is then deployed from the server system to each of the two or more machines through linear communication orbit 106. Upon receiving the watch list, the respective machine of the two or more machines identifies a plurality of events that occur locally at the respective machine, including events for the objects identified by the received watch list in real-time (i.e., while the plurality of events are occurring at the respective machine). The respective machine then stores event information for the identified plurality of events in a local database. While continuously monitoring the events for the one or more objects locally according to the watch list, the two or more machines wait to receive an integrity reporting request from the server system, and return the event information for at least some of the one or more objects identified by the received watch list in accordance with the integrity reporting request.

In some implementations, file integrity is monitored and reported to satisfy standard enterprise-wide security requirements, such as those provided by Center for Internet Security (CIS), National Institute of Standards and Technology (NIST), Defense Information System Agency (DISA), International Organization for Standardization (ISO) and the International Electrotechnical Commission (IEC). These standard security requirements fulfill system configuration hardening portions of some industry regulatory requirements, e.g., Payment Card Industry Data Security Standard (PCI DSS), Federal Information Security Management Act (FISMA), ISO/IEC 27002, Gramm-Leach-Bliley Act (GLBA), Sarbanes-Oxley Act of 2002 (SOX), and Health Insurance Portability and Accountability Act of 1996 (HIPAA). Alternatively, in some implementations, file integrity is monitored and reported to satisfy customized enterprise-wide security requirements to meet specific internal needs. The watch list and two or more machines are determined by the server system to satisfy these standard or customized security requirements.

In some embodiments, the event information collected at different nodes of the linear communication orbit for the one or more objects identified by the watch list is analyzed locally at each of the two of more machines and/or remotely at the server system. For example, the server system can set up a sandbox environment (e.g., a virtual machine mirroring certain conditions and/or files on the respective node) to perform forensic investigation of security incidents on the respective node. When an event of interest is detected on a particular node as a result of the analysis, the remote server uses the linear communication orbit to send an instruction packet to the particular node, and allows the particular node to establish a direct duplex connection with the server system through an outbound connection request from the particular node to the server system. The server system then takes a deep-dive (e.g., performs forensic analysis) to investigate a respective object corresponding to the event of interest using the direct duplex connection (e.g., requesting the node to upload local context data related to the event of interest and/or to upload a snapshot of the local database, and requesting the node to evaluate the event of interest locally and/or answer one or more queries, etc.).

Some methods and devices described herein improve upon threat detection and management by establishing a trusted client-initiated connection, e.g., for forensic investigation by a remote server. The client-initiated outbound connection can be used by the remote server to perform event inquiries at the client without requiring the client to open its network firewall (e.g., without requiring the client to open inbound ports in its network firewall). In some embodiments, the client is a respective node in a collection of nodes that forms a linear communication network as described in the Incorporated Disclosure, which sets forth a network topology in which messages are passed from node to node in the linear communication orbit. To establish the trusted client-initiated connection, the remote server injects an instruction packet into the linear communication orbit, which travels from node to node through the upstream nodes of the respective node before reaching the respective node. The instruction packet includes instructions for establishing a direct duplex connection (e.g., a direct full-duplex connection, such as a Web Socket connection) with the remote server. The respective node establishes the direct duplex connection according to the instructions received through the linear communication orbit. Thereafter, the respective node can send secure messages (e.g., encrypted messages) and upload historical event data directly to the remote server (e.g., rather than by propagating messages from node to node through the linear communication orbit); and, the remote server can interact directly with the respective node in the network rather than through the network's server and the linear communication orbit.

The direct duplex connection (e.g., a point-to-point direct full-duplex connection) can be used by security incident responders, (who are, for example, network administrators of the monitored network, and/or third-party security incident responders associated with the remote server) to pull local data from the respective node, including event histories, malware files and artifacts, etc. In some embodiments, the remote server can setup a sandbox environment (e.g., a virtual machine mirroring certain conditions and/or files on the respective node) to perform forensic investigation of security incidents on the respective node.

In a typical scenario, a remote server routinely monitors a network for threats (e.g., by dispatching indicators of compromise and receiving aggregated responses back from some or all of the nodes in the network) using node-to-node communication within the linear communication orbit and server-to-server communication to communicate back to the remote server. When an event is detected on a particular node (e.g., an IOC hit is detected, or a user reported a problem), the remote server uses the linear communication orbit to send an instruction packet to the particular node, and allows the particular node to establish a direct duplex connection with the remote server through an outbound connection request from the particular node to the remote server. The remote server then takes a deep-dive (e.g., performs forensic analysis) into event histories at the particular node using the direct duplex connection (e.g., requesting the node to upload event artifact data and/or to upload a snapshot of a local event database, and requesting the node to evaluate one or more IOCs and/or answer one or more queries, etc.).

In some cases, if the result of the deep investigation at the particular node is indicative of a more serious and/or network-wide security concern that may have affected other nodes in the network, the remote server (e.g., at the instruction of an administrator) may initiate a network-wide event data gathering process using the linear communication orbit. For example, the remote server may generate an IOC with a set of relevant indicator items for the event of interest (or queries regarding a set of contextual conditions surrounding the event of interest) based on the analysis done for the particular node, and injected the IOC (or the queries) into the network through the server of the network. The server of the network optionally converts the IOC into a series of queries before sending the queries into the network along the linear communication orbit. After the server of the network has gathered event data from the nodes in the network as answers to the queries, the server of the network forwards the collected event data to the remote server. The remote server may revise the IOC (or the set of contextual conditions) based on the collected event data, such that a more accurate and more efficient IOC (or a more relevant set of contextual conditions) for the event of interest can be used for subsequent threat detection in the network. In some embodiments, the remote server optimizes the IOC (or the relevant set of contextual conditions) by comparing respective variances of the evaluation results (e.g., metrics for characterizing the spread of the evaluating results across all the nodes in the network) for multiple indicator items in the IOC and eliminating or demoting some indicator items that have high variances in their results. In some embodiments, the remote server optimizes the IOC by comparing hit probabilities of multiple indicator items (e.g., indicator items in a logical (e.g., an AND or OR) evaluation statement) and eliminating or reordering (e.g., to a lower priority) at least some of the indicator items (e.g., indicator items with low hit probabilities) in the IOC.

Linear communication orbits are described below with reference to FIG. 1A. FIG. 1B illustrates a schematic diagram of a direct duplex connection between a node in a linear communication orbit and a remote server. Since indicators of compromise (IOCs) are referenced throughout this document, FIGS. 2A-2B provide details concerning indicators of compromise. Methods for establishing direct duplex connections, e.g., for monitoring a network, are described with reference to FIGS. 3A-3B (method 300), FIG. 4 (method 400), and FIGS. 5A-5E (method 500). FIGS. 6-9 are block diagrams of machines in a network or machines interacting with a network (e.g., a node, an administrator's device, a server of a network, and a remote investigating server).

FIG. 1A illustrates a computer network organized into linear communication orbits, in accordance with some embodiments. More specifically, FIG. 1A illustrates a managed network 100 comprising a plurality of interconnected machines or nodes 102 (including 102*a*-1), e.g., computers, servers, mobile devices, and other networked devices that are arranged into one or more linear communication orbits. In some embodiments, the network monitoring methods described herein are performed at one or more nodes (e.g., node 102, see FIGS. 1A and 1B) of a linear communication orbit. In some embodiments, the methods described herein are performed at a remote server (e.g., remote server 110) that is not part of network 100 and is optionally separated from network 100 by a firewall 104, see FIGS. 1A and 1B). In some embodiments, the methods described herein are performed at an administrator's device (e.g., administrator's device 116 that interacts with one or more nodes 102 through server 108 of the network and/or remote server 110, see FIG. 1B). The linear communication orbit structure shown in FIG. 1A is an alternative to the conventional hub-and-spoke or hierarchical architecture for managed networks. However, in some embodiments, the network monitoring methods described herein are performed at one or more nodes/servers of a hub-and-spoke network, where the remote server sends the instruction packet to a respective node through the server of the hub-and-spoke network or the top node of hierarchical architecture, and allow the respective node to initiate the outbound connection request to the remote server. However, in such cases, the benefit and efficiency of the linear communication orbit may be lost.

Examples of managed network 100 include enterprise networks or other networks under common management. In some embodiments, at least some of machines 102 coupled to managed network 100 are distributed across different geographical areas and/or localized at the same physical location. In some embodiments, machines 102 coupled to managed network 100 are divided into several sub-networks separated by one or more firewalls 104. In some embodiments, the network 100 is separated from external networks by one or more firewalls 104.

In some embodiments, machines 102 currently coupled to network 100 are self-organized into one or more contiguous segments 106 of a single linear communication orbit. In some embodiments, each contiguous segment 106 constitutes a respective linear communication orbit.

In some embodiments, managed network 100 also includes server 108 that facilitates the creation and maintenance of the one or more contiguous segments 106. The server 108 may be relatively lightweight, and may be elected from machines 102 in the network.

In some embodiments, as shown in FIG. 1A, the linear communication orbit linking all of the machines coupled to network 100 includes a respective communication channel between each pair of adjacent machines in an ordered sequence of all machines 102 in network 100. In some embodiments, communication between a pair of adjacent machines 102 (e.g., machine 102*g* and machine 102*f*) across a firewall 104 may need to be bridged by an intermediate server (e.g., server 108).

An important feature of linear communication orbit(s) 106 is that, in some embodiments, they are automatically formed without global, continuous, and/or active intervention by any network administrative program or personnel. Each machine 102 joining network 100 is equipped with (or provided with) a set of predetermined rules. According to the set of predetermined rules, each machine 102 finds its immediate neighbor machines and coordinates with these immediate neighbor machines to self-organize into a local segment of the linear communication orbit. The local segments of adjacent machines overlap and fuse into a contiguous segment of the linear communication orbit. In some embodiments, the linear communication orbit grows or contracts as machines join and leave network 100 (e.g., the network is non-static), through the independent local actions of the machines in network 100, without global, continuous, and/or active intervention by any network administrative programs or personnel. Although all machines 102 implement the same set of rules, and each machine directly interacts only with its immediate neighbor machines to facilitate the formation of the orbit, the rules are designed in a way that cause the machines' independent local actions to be globally consistent and to result in self-organization and automatic repair and maintenance of linear communication orbit(s) 106.

In some embodiments, all machines 102 coupled to network 100 are sorted into an ordered sequence according to a respective unique identifier associated with each machine 102. These identifiers are also referred to as the addresses of the machines in the network. For example, in some embodiments, respective IP addresses of machines 102 are used as the identifiers to sort the machines into an ordered sequence. In some embodiments, the machines are sorted according to decreasing IP address values, an upstream direction of the linear communication orbit is the direction of increasing IP address values, and a downstream direction of the linear communication orbit is the direction of decreasing IP address values. In some embodiments, the machines are sorted according to increasing IP address values, an upstream direction of the linear communication orbit is the direction of decreasing IP address values, and a downstream direction of the linear communication orbit is the direction of increasing IP address values.

In some embodiments, other types of unique identifiers or addresses may be used. For each type of unique identifier or address, the set of predetermined rules provides a deterministic way of sorting the unique identifiers or addresses of that type into an ordered sequence. Given the identifiers or addresses of two machines in the network, the relative order of the two machines and their distances in the linear communication orbit (also referred to as an interval between the two machines) can be determined. In some embodiments, not all possible addresses are occupied by a corresponding machine in the network.

In some embodiments, each machine 102 receiving a communication message (e.g., a message including a question part, and an answer part) from its upstream neighbor node acts upon the message by providing an update to the message based on its local state or information, performing some aggregation of the information in the message (e.g., by adding to or modifying aggregated results already included in the message as received from its upstream neighbor), and/or forwarding the message to its downstream neighbor node along the linear communication orbit. Essentially, each machine expends a small amount of resources to take on a small part of the duties of data aggregation without being overly burdened. In the threat management scenario, in some embodiments, the query part of a message may include a request for evaluating an indicator item (e.g., "Is a file with a filename [VIRUS-NAME].EXE present?"), and the answer part may be a hit counter (e.g., a counter for "yes" answers) or log to which a node can append its unique identifier (ID) if the result of the evaluation is a hit (e.g., a "yes" or "TRUE" answer). In some embodiments, instructions for a remedial action (e.g., an executable script) and criteria for determining which node should execute the instructions for the remedial action (e.g., IDs or characteristics of the affected node(s)) may be included in a communication message and propagated along the linear communication orbit (see FIG. 1A) or through a direct duplex connection (see FIG. 1B). A node fitting the criteria will execute the remedial action when it receives the communication message. More details on how the system, security and network management messages are propagated to and collected from machines 102 in network 100 through linear communication orbit(s) 106 are provided in the Incorporated Disclosure.

In some embodiments, each node implements a set of common rules such that each node in the linear communication orbit knows what to do with respect to each query it receives or knows about, without requiring excessive back and forth interactive communications between the nodes themselves or between the nodes and the central management of a server or administrator. This set of common rules is different from the set of common rules for establishing and maintaining the linear communication orbit as described in the Incorporated Disclosure, and can be used in addition to the set of common rules for establishing and maintaining the linear communication orbit.

An advantage of message communication over the linear communication orbit is that queries, answers, and/or instructions regarding threat detection and management can be quickly passed to and from a node 102 or server 108 without excessive communication and computational overhead. In some embodiments, server 108 (or a remote server 110 in communication with server 108) generates individual queries based on IOC feeds or specifications received from various sources (e.g., third-party threat research firms, internal threat management personnel, etc.), where each query contains a request for evaluation of one or more indicator items at one or more targeted nodes (e.g., nodes that meet certain criteria specified in the query). In some embodiments, the server determines the order, frequency, and/or priority by which the queries should be injected. In some embodiments, the server sends out all of the queries and the criteria that individual nodes can use to locally prioritize the evaluation of the indicator items in the queries. The individual nodes perform local evaluation of the indicator items with the order and frequencies set in accordance with the criteria, and send the results back to server 108 through the linear communication orbit.

In some embodiments, server 108 sends the results (e.g., sends an aggregated response) to remote server 110. In some embodiments, server 108/110 determines whether a threat exists in the network and automatically sends out instructions for one or more remedial actions to be carried out at the affected node(s) (e.g., quarantining the affected nodes from the rest of the network, cleaning up offending files, collecting artifacts from the affected nodes, etc.). In some embodiments, remote server 110 communicates with server 108 via secure connection 114. In some embodiments, when remote server 110 needs to send a message or instruction packet to a particular node in the network and a direct connection between remote server 110 and the particular node does not already exist, remote server 110 optionally sends the message to server 108 and has server 108 forward the message or instruction packet to the particular node along the linear communication orbit. In some embodiments, remote server 110 starts a network-wide information gathering processes by sending a series of queries or one or more IOCs to server 108 (or a starting node of the linear communication orbit), allowing server 108 (or the starting node) to propagate the queries or IOCs into the network along the linear communication orbit, and receiving the answers or evaluation results (e.g., individual answers, aggregated answers, and/or metrics and statistics computed based on the answers or evaluation results collected from the nodes in the network) from server 108 (or an end node of the linear communication orbit).

The lightweight, decentralized mechanism (e.g., the set of common action rules observed by the nodes in the network) allows the nodes in the network to self-organize into one or more linear communication orbits, and allows the linear communication orbits to recover/self-heal from broken links and slow connections (e.g., by temporarily bypassing the unresponsive nodes) without active administrative intervention. The self-organization and self-healing aspects of the linear communication orbits ensure that communication and data collection bottlenecks are quickly discovered and eliminated, without causing much observable impact on the communication and data collection speed. In addition, when collecting data along the linear communication orbits, the server may inject queries regarding different aspects of the nodes in separate messages, and the messages may be propagated down the linear communication orbit, processed in parallel at the nodes, and answered by as many nodes as possible (e.g., nodes that satisfy per matching criteria specified by the messages), without being held up by any slow responding nodes. In fact, communication with and data collection from any and all nodes in the network (e.g., enterprise networks with thousands or millions of nodes) may be accomplished in substantially real-time (e.g., a matter of seconds), as opposed to taking days and weeks in a network with a conventional hierarchical or hub-and-spoke configuration. For example, messages are delivered to the nodes at the speed at which messages are propagated through the linear communication orbit, and the processing of the queries at the nodes occurs after receiving the messages, in parallel at the nodes. In some embodiments, answers to the queries are collected in a subsequent traversal of the linear communication orbit by either the original messages (propagating in the reverse direction) or by subsequent "answer collection" messages.

FIG. 1B illustrates that, in some embodiments, remote server 110 communicates (e.g., sends messages and/or queries) directly with a respective node (e.g., node 102*f*) over direct duplex connection 112 (e.g., a WebSocket connection). Various methods are provided herein for establishing direct duplex connections between remote server 110 and nodes 102 in a linear communication orbit (e.g., as described with reference to method 300, FIGS. 3A-3B, method 400, FIG. 4, and/or method 500, FIGS. 5A-5E). Direct duplex connection 112 is particularly useful when a remote server needs to take a deep-dive into a respective node in the network (e.g., to carry out frequent back and forth interactions and/or to transfer large amount of local event data and/or deploy a security patch), rather than investigating the network at-large. The messages and/or queries can be analogous to those described above, but they are sent directly to the respective node via direct duplex connection 112 (rather than being propagated through linear communication orbit 106*a*), and without the communication needing to be bridged by server 108. In some embodiments, remote server 110 can communicate with the respective node either through direct duplex connection 112 (e.g., when remote server 110 wants to query only the respective node) or through linear communication orbit 106*a* (e.g., when remote server 110 wants an aggregated response to a query from some or all of the nodes 102 in the linear communication orbit 106*a*).

As described herein, the direct duplex connection between a particular node and remote server 110 is established with the particular node as the initiating party. In other words, from the perspective of the network, the connection is established with an outbound connection request sent from the node, rather than with an inbound connection request sent from the remote server. When the direct duplex connection is established with an outbound connection request sent from the node (e.g., the node sends the initial connection request in the connection establishment protocol (e.g., the handshake request in establishing a Web Socket connection)), there is no need to open the firewall of the network, which would expose the network to outside security risks.

In some embodiments, in order to prompt a particular node to initiate the connection request for a direct duplex connection, remote server 110 sends a message or instruction packet to the particular node (e.g., node 102*f*) through a server of the network (e.g., server 108) and has the message or instruction packet propagated to the particular node through the linear communication orbit (e.g., linear communication orbit 106*a*). The message or instruction packet contains instruction and necessary data (e.g., public certificate for encryption, IP address, port #) for the particular node to establish the direct point-to-point persistent connection (e.g., a WebSocket connection) with the remote server. When the particular node receives the instruction packet from its upstream node, the particular node initiates the outbound connection request to the remote server. After the remote server receives the connection request from the particular node, the remote server and the node can proceed to establish the duplex connection according to the connection protocol.

In some embodiments, the instruction packet can be dispatched to one or more particular nodes at the command of a network administrator or security incident responder. For example, the network administrator uses an administrator's device 116 to connect to remote server 110 (e.g., via a web interface or a client application provided by a service provider associated with the remote server 110) and manually selects the particular nodes using a network monitoring user interface. In some embodiments, the network monitoring user interface provides other functions, such as reviewing and modifying IOCs, queries, event artifacts, metrics and statistics for IOC evaluations and query responses, and performing sandbox investigation, etc.

In some embodiments, an event recorder is deployed on each node in the network that continuously records local values for particular indicator items (e.g., commonly used indicator items, such as filenames of newly created/modified/deleted/executed files, IP addresses of network connections, ports accessed, and processes started/killed, etc.) to a local event database. An administrator can query these local event databases from the network monitoring user interface by issuing questions to the network through the linear communication orbit. For example, the administrator's device can send the questions to the server of the network and the questions may be packaged in query messages and propagated to the nodes through the server of the network. Each node along the linear communication orbit will be able to quickly respond to these questions based on the past event data stored in their respective local event databases. After the answers have been collected from all relevant nodes in the network, the server of the network forwards the answers back to the administrator's device.

In some embodiments, after a direct duplex connection has been established between a particular node and the remote server, the administrator can also query the local event database of the particular node through the direction duplex connection. In addition, the administrator can take a snapshot of the local event database on the particular node and have it uploaded to the remote server, so that in-depth analysis regarding the particular node may be performed at the remote server (e.g., according to instructions provided by the administrator to the remote server).

In some embodiments, after a direct duplex connection has been established between a particular node and the remote server, the administrator can collect process artifacts from the particular node based on event history and file references for an event of interest identified by the administrator. The administrator can make a copy of the collected process artifacts and corresponding metadata (e.g., OS version, memory, installed apps, usernames, etc.) describing the local environment of the particular node, and use them to create a sandbox (e.g., choose the same operating environment as the particular endpoint machine and add the necessary files and libraries from the collected process artifacts) and recreate the past event(s) in the sandbox for investigation purposes.

In some embodiments, based on the in-depth analysis performed on a particular node, the administrator can select particular events or artifacts of interest in the network monitoring user interface and, in response, be presented with a set of sample questions that can be dispatched to the network for a network-wide analysis. The set of sample questions can be automatically generated based on existing question templates and indicator values that are found on the particular node. The automatic generation of the questions facilitates the investigative process of the administrator, and relieves the administrator from having to create the questions one by one from scratch. In some embodiments, the questions and IOCs for detecting a particular threat or event of interest can be refined (e.g., made more efficient or streamlined) based on the answers collected from the network.

FIG. 2A illustrates an IOC specification 200 which is intended to detect a reverse shell threat. A shell is a segment of code or program which can be used to gain code or command execution on a device. A reverse shell is a shell in which a targeted machine communicates back to an attacking machine.

As used herein, the term "indicator of compromise" means an observable (e.g., an artifact)—or a set of observables—on a computer, computer network, or operating system that indicates a threat (e.g., a known threat, an intrusion) of that computer, computer network, or operating system. Some IOCs indicate the presence of a computer virus or malware. Some IOCs indicate the presence of an event of interest. Specific examples of IOCs include virus signatures, IP addresses, hashes of malware files (e.g., values of MD5 hashes), and URLs of botnet command and control servers. The term "indicator of compromise" or "IOC" is also used as short-hand to mean an IOC specification, as described below. So when an operation is described as, e.g., "generating an IOC," or "dispatching an IOC," that means generating an IOC specification or dispatching an IOC specification. An IOC can be a file containing logical statements written according to a particular format (e.g., as the example specification 200 in FIG. 2A), a series of queries with particular answers, or a set of indicator items with particular indicator values or particular combinations of indicator values, that specify a set of contextual conditions indicative of the presence of a threat.

In some embodiments, an IOC indicates a high probability of compromise. Detection of an IOC need not indicate with 100% certainty that an intrusion has occurred. Instead, in some circumstances, detection of an IOC indicates that additional forensics (e.g., deep investigation) is warranted.

As used herein, "specification of an IOC" (or "IOC specification") means instructions for evaluating an IOC (e.g., instructions in a computer language, such as XML, that is capable of being translated into machine-readable code). In some embodiments, an IOC specification is a computer file that includes, for each of one or more observables: a type of the observable (e.g., a file name, an MD5 hash) and a value for the observable (e.g., "CCAPP.EXE" when the type of the observable is a file name, an MD5 hash value when the type of the observable is a MD5 hash). In some embodiments, the specification includes logical operators (e.g., indicator operator 218, FIG. 2B) connecting the one or more observables (e.g., a logical operator AND, a logical operator OR).

As used herein, the specification for a single observable is called an "indicator item." When an IOC includes a list of indicator items and a single logical operator AND, compromise is indicated only when all of the indicator items are present. When the IOC includes a list of indicator items and a single logical operator OR, compromise is indicated when any of the indicator items are present.

In some embodiments, IOC specification 200 is a text file. For example, IOC specification 200 comprises XML code in a text file. In some embodiments, the XML code is in the form of an Open IOC or STIX (Structured Threat Information Expression) file. In some embodiments, IOC specification 200 is in a tool specific format, such as Yara. In some embodiments, IOC specification 200 is obtained from a subscription intelligence source (e.g., an IOC feed). In some embodiments, IOC specification 200 is generated automatically (e.g., as described with reference to operation 532, method 500, FIG. 5C).

In this example, IOC specification 200 is embodied as an XML file. IOC specification 200 includes a header 202 that specifies various metadata, such as a short description of the IOC (e.g., "CCAPP.EXE", delimited by <short_description> and </short_description>), a description of the IOC (e.g., "Custom Reverse shell", delimited by <description> and </description>), and similarly specified author and author date fields. Thus, CCAPP.EXE is a shorthand name for a known reverse shell threat. In some embodiments, the metadata specified in header 202 is used in a graphical user interface which allows an administrator to select particular IOCs.

IOC specification 200 also includes an IOC definition 204 that specifies a set of observables (and optionally a logical relationship between the observables). Observation of the set of observables (e.g., specified by a set of indicator items) according to the logical relationship specified in IOC definition 204 indicates the presence of the particular reverse shell threat used in this example (i.e., "CCAPP.EXE"). IOC definition 204 is delimited by <definition> and </definition> and includes two indicator items (indicator item 206-1 and indicator item 206-2). More specifically, indicator item 206-1 specifies an MD5 hash value of a file (e.g., by specifying the type of the indicator item as "MD5sum" and the value of the indicator item as "9855C23BE2B6F38630756A277B52CDD2"); and indicator item 206-2 specifies a different MD5 hash value of a file (i.e., "ACB81BEE009B09B2A0688F05EA45851F"). Further, IOC specification 200 specifies an indicator operator OR 208 between indicator items 206-1 and 206-2. So IOC specification 200 specifies that there is a high probability that the CCAPP.EXE reverse shell threat exists in a set of files if either of the aforementioned MD5 hash values is found after applying an MD5 hash to each file in the set of files.

FIG. 2B illustrates an IOC specification 210 which is analogous to IOC specification 200 with the following exceptions: IOC specification 210 includes a header 212 that is the same as header 202 except that the short description in header 212 is "CBAPP.EXE" rather than "CCAPP.EXE"; and IOC specification 210 includes IOC definition 214 that is the same as IOC definition 204 except that IOC definition 214 specifies an indicator operator AND 218 between indicator items 216-1 and 216-2. Indicator item 216-2 also specifies a FileName string rather than an MD5 hash value. Indicator items 216-1 and 216-2 are otherwise analogous to indicator items 206-1 and 206-2, respectively.

Because indicator operator 218 is the logical operator AND, IOC specification 210 specifies that there is a high probability that the CBAPP.EXE reverse shell threat exists in a set of files if a file is found that has both the specified MD5 hash value and the specified file name.

In some circumstances, IOC specifications are published openly (e.g., an administrator can download open IOC specifications from the web). These IOC specifications are equally available to hackers who have coded the very threats that the IOC specifications are attempting to detect. If not encoded in the IOC specifications, the hackers are thus able to see what signatures of their threats are being detected and change those signatures. For example, a file name can easily be changed from "CCAPP.EXE" to "CTAPP.EXE", which would evade detection of an indicator item looking for a threat with the file name "CCAPP.EXE". Thus, some indicator items specify that the evaluating computer should apply an MD5 hash to the names of the files it is checking. The indicator item does not specify the filename that it is looking for, but specifies that the MD5 hash value for that file name is, e.g., "CAA19D52FDB8E1151F378F7C4BF62F76". This makes it more difficult for hackers to modify their threats to avoid detection.

In some embodiments, IOCs are evaluated at a node in a collection of nodes that forms a linear communication orbit (e.g., node 102*e*, FIGS. 1A-1B). After the node performs the evaluation, the node optionally sends back results of the evaluation to a remote server, either directly (e.g., through a direct duplex connection) or through the linear communication orbit. In some embodiments, the server determines if a threat is present in the network and whether the node is affected based on the received results. In some embodiments, the remote server optionally sends out instructions for one or more remedial actions (e.g., quarantining or cleaning up offending files or devices) to the affected node through the linear communication orbit, and the node performs the remedial actions accordingly. In some embodiments, the node determines whether a threat has been detected locally, and optionally, automatically carries out one or more default remedial actions (e.g., quarantining or cleaning up offending files or sending in local artifacts for further investigation).

In some embodiments, an IOC is selectively evaluated, for example, in response to an execution command (e.g., entered on a security incident responder's user interface provided by the remote server) or when the IOC is due for regularly scheduled evaluation.

In some embodiments, the node maintains an index of local results for one or more indicator items (e.g., an index of historical indicator item evaluation results). In some embodiments, the index stores indicator item evaluation results for a particular file or set of files (e.g., stores historical indicator item evaluation results for particular files, such as positive results or negative results for each file). In some embodiments, the index stores the evaluated values specified in the indicator item for the file or the set of files (e.g., stores MD5 hash values for the set of files, so that the node does not have to repeat the MD5 hash evaluation each time the indicator item is executed).

FIGS. 3A-3B, FIG. 4, and FIGS. 5A-5E are flow charts of methods for establishing a trusted client-initiated connection between a respective node and a remote server, e.g., for forensic investigation by the remote server (e.g., remote server 110, FIG. 1B), in accordance with some embodiments. It is important for security incident responders to be able to visualize event information and pull artifacts from nodes of concern (e.g., nodes that have registered an IOC hit or reported a problem). To facilitate security incident responders' activities, these methods allow point-to-point connections (e.g., direct connections, direct duplex connections) be established between the remote server (e.g., a third-party investigating server) with nodes, with outbound connection requests being sent out from the nodes. Once the connections are established, the remote server may interact with the nodes and transfer data to and from the nodes through the point-to-point connections. In some embodiments, the remote server prompts the node to send the outbound connection request by sending an instruction package to the node through a server of the network and the linear communication orbit. The instruction packet includes the information needed for the node to construct the outbound connection request to the remote server. For example, in some embodiments, the instruction packet includes a public certificate, IP address, and/or port that is used by an executable on the node to initiate an outbound connection (e.g., a TCP connection over SSL) to the remote server. In some embodiments, these methods provide a way to establish a trusted connection to a remote server whose identity is trustable because it is the only server with the proper private side of the key pair.

Figure 3B:
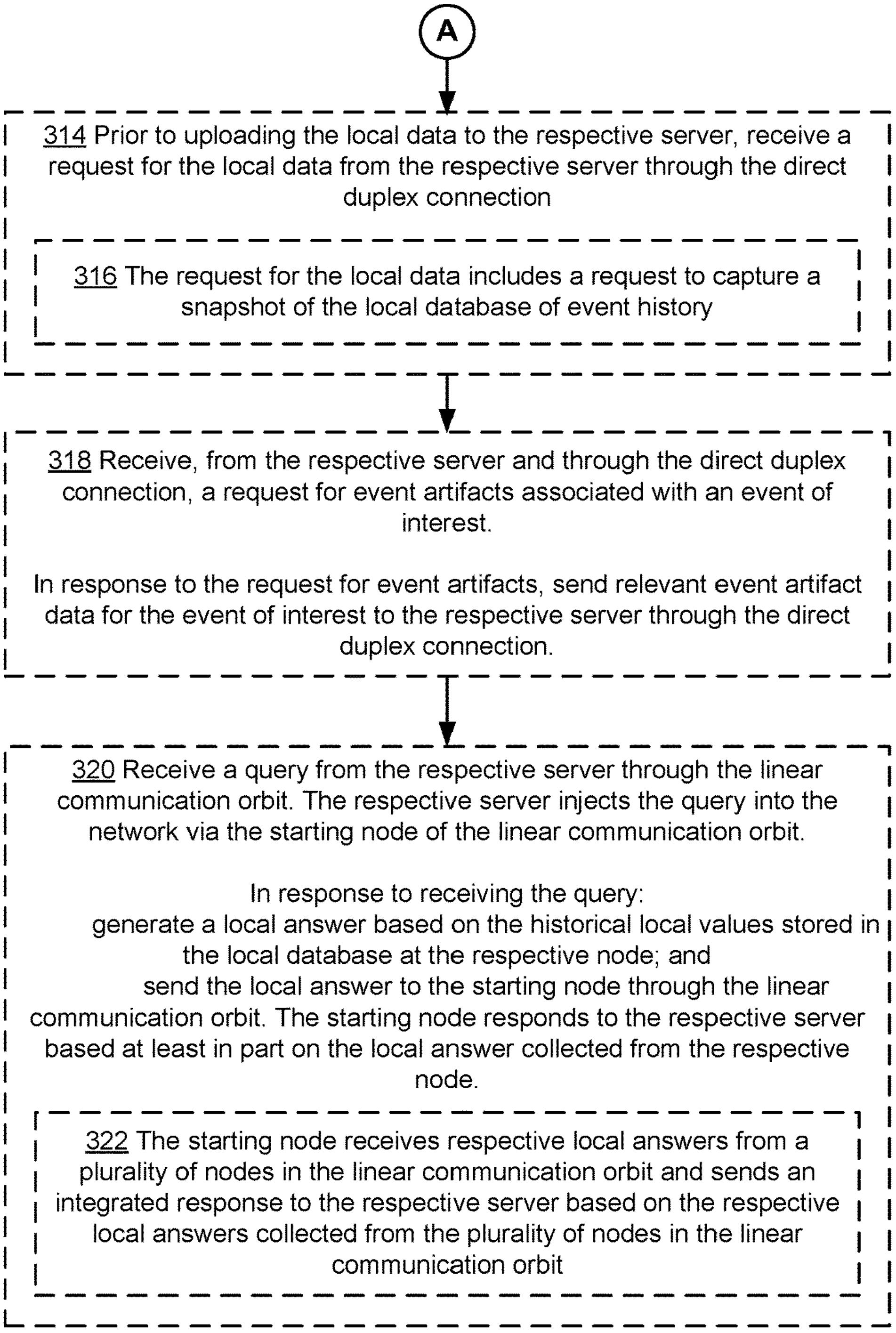
Figure 5B:
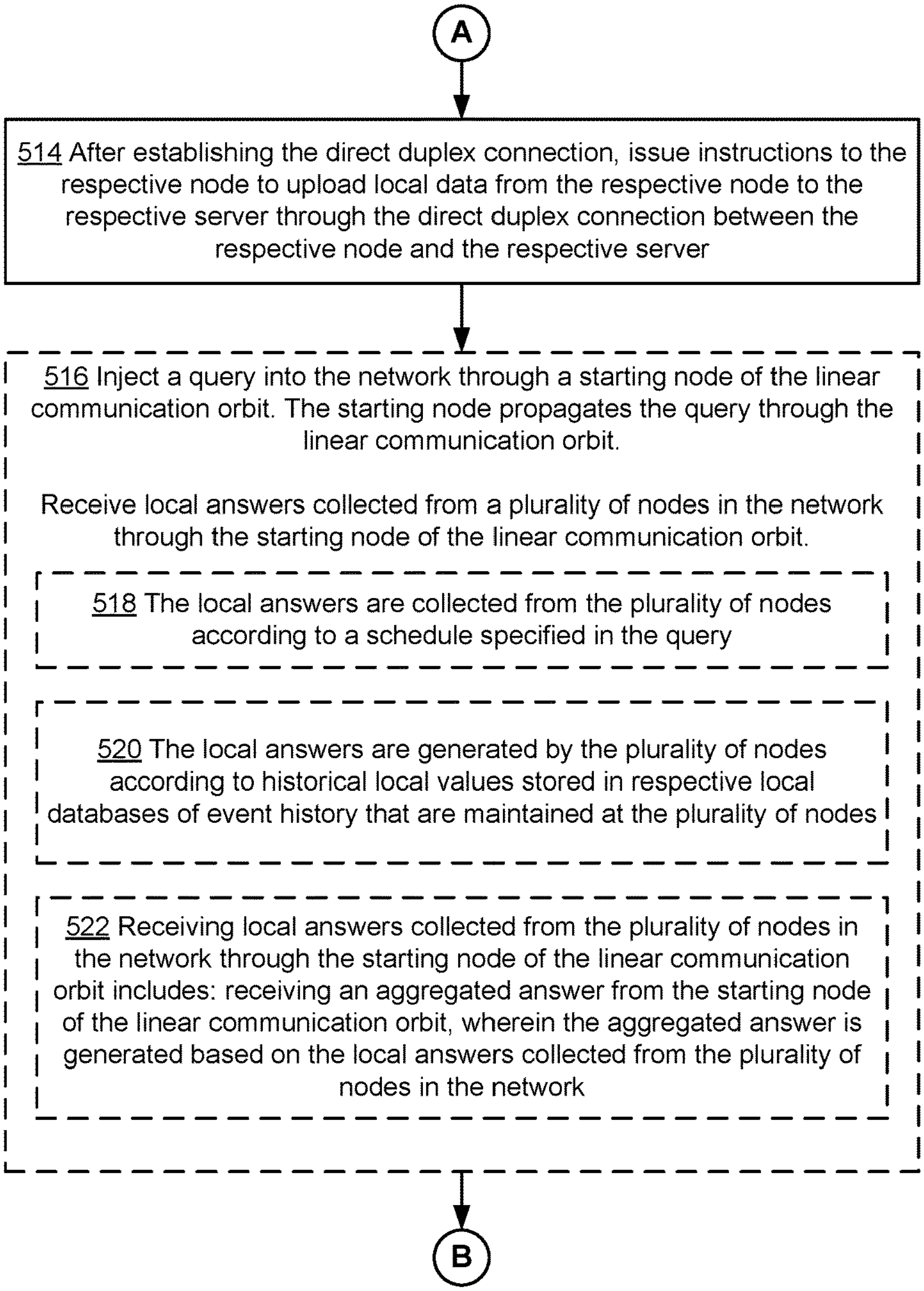
Figure 5C:
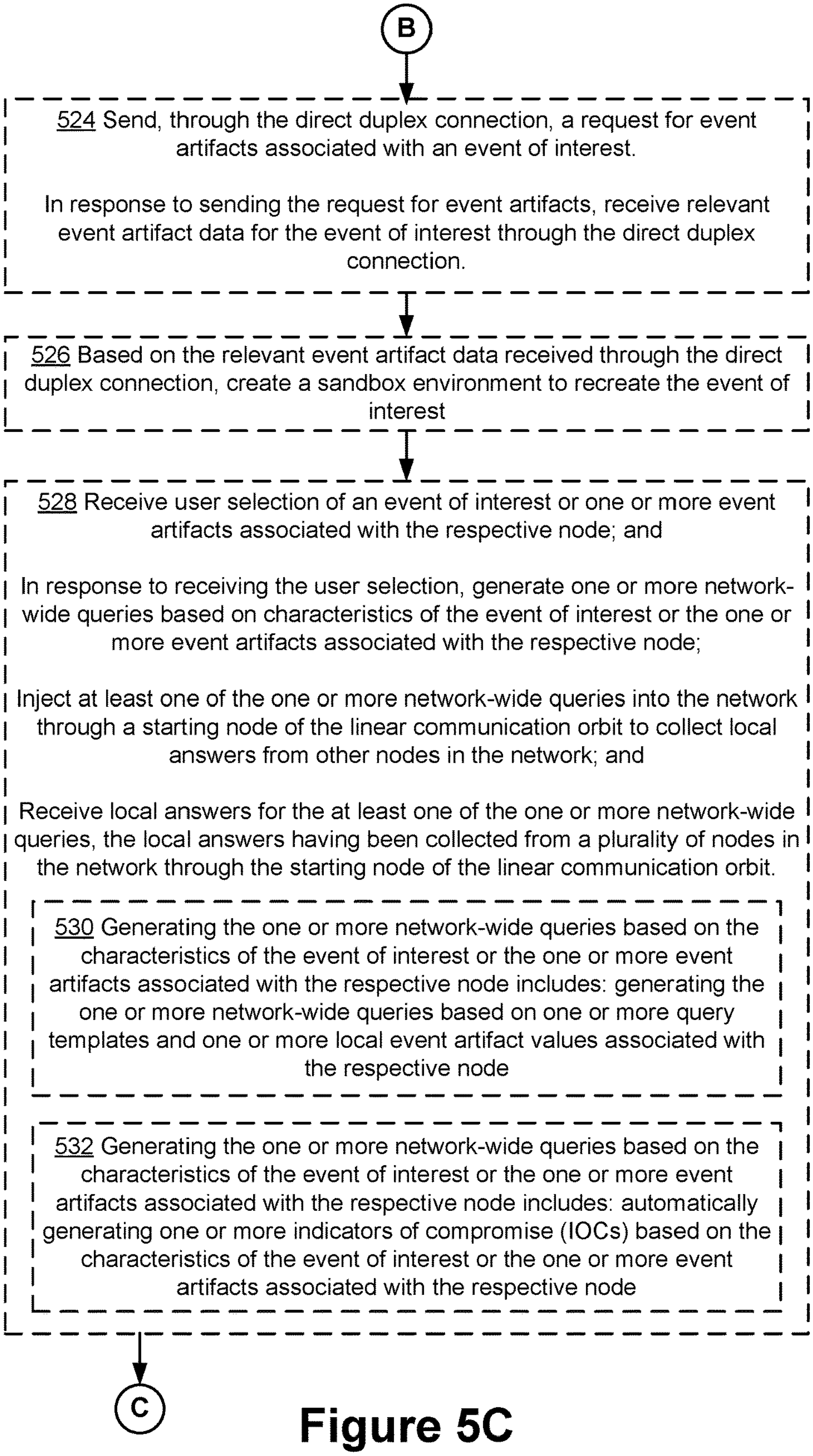
Figure 5E:
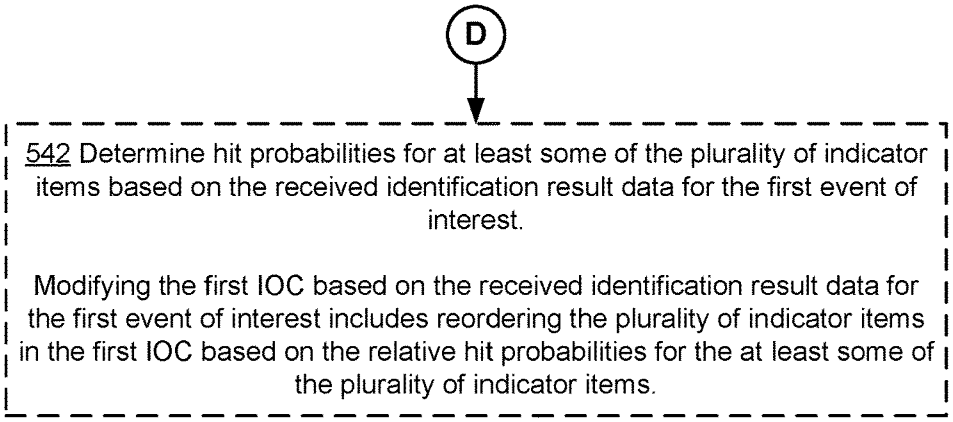

FIGS. 3A-3B are a flow chart of a process 300 for establishing a direct duplex connection between a node and a remote server (e.g., remote server 110, FIG. 1B), e.g., for forensic investigation by the remote server, in accordance with some embodiments. In some embodiments, the direct duplex connection can be used by the remote server to perform event inquiries at the node. In some embodiments, the process 300 is performed by a node (e.g., node 102*f*, FIGS. 1A-1B) in a network (e.g., network 100, FIG. 1A). For brevity, method 300 is described below as being performed by a respective node (e.g., node 102*f*, FIGS. 1A-1B) in a network (e.g., network 100, FIG. 1A) comprising a collection of nodes (e.g., a non-static collection of nodes 102) that forms a linear communication orbit (e.g., linear communication orbit 106*a*, FIGS. 1A-1B). The respective node forms a direct duplex connection (e.g., duplex connection 112, FIG. 1B) with a respective server (e.g., remote server 110, FIG. 1B) after receiving an instruction packet from the respective server through a server of the network (e.g., server 108) and the linear communication orbit (e.g., linear communication orbit 106*a*, FIG. 1B).

During the process 300, the respective node receives (302) an instruction packet through the linear communication orbit, where the instruction packet has been propagated (e.g., from node to node) from a starting node (e.g., an upstream node of the respective node in the linear communication orbit, or server 108, which in the topology shown in FIGS. 1A-1B can be viewed as a starting node in the linear communication orbit 106*a*) to the respective node through one or more upstream nodes of the respective node (e.g., nodes 102*b*-102*e*, when node 102*f* is the respective node) along the linear communication orbit. The instruction packet includes an instruction for establishing a direct duplex connection between the respective node and a respective server (e.g., a remote server, such as remote server 110, FIG. 1B). In some embodiments, the respective server is an investigating server configured to perform forensic investigation for security monitoring of the network. In some embodiments, the respective server is used by security incident responders, e.g., to visualize event information, pull artifacts from nodes of concern (e.g., the respective node), etc. In some embodiments, the respective node is an inspected node in a monitored network (e.g., whose event information and artifacts are analyzed by the respective server). It is worth noting that the respective server (e.g., remote server 110) is distinct from the server of the monitored network (e.g., server 108) and resides outside of the monitored network (e.g., separated from the monitored network by a firewall 104). In some embodiments, the remote server and the server of the network maintain a direct secure connection with each other for data transfers (e.g., for transmitting instructions, queries, and answers).

In some embodiments, the respective server is (304) separated from the network (e.g., separated from the respective node) by a firewall (e.g., firewall 104, FIG. 1B). In some embodiments, no opening of the firewall is required for establishing the direct duplex connection because the connection request is an outbound request sent from the respective node.

In response to receiving the instruction packet through the linear communication orbit, the respective node sends (306) an outbound connection request to the respective server to establish the direct duplex connection. In some embodiments, the direct duplex connection is (308) a secure WebSocket connection (e.g., a full-duplex connection through which the respective node and the respective server can each communicate with each other simultaneously). In some embodiments, once the direct duplex connection is established, the respective node communicates with the respective server through the direct duplex connection without propagating packets through other nodes (e.g., without propagating packets from node to node) in the linear communication orbit.

The respective node uploads (310) local data (e.g., event information such as IOC hits, artifacts such as files that resulted in IOC hits) to the respective server through the direct duplex connection, where the respective server performs analysis (e.g., forensic analysis) on the local data received from the respective node through the direct duplex connection.

Some of the local data may include sensitive information (e.g., customers' financial or personal information). In some embodiments, the respective node encrypts the local data before uploading the local data to the respective server through the direct duplex connection, so that only the respective server can decrypt the local data. In some embodiments, information sent over the direct duplex connection is encrypted using public key encryption.

To that end, in some embodiments, the instruction packet includes a public encryption key for encrypting the local data at the respective node before uploading the local data to the respective server, and the respective server possesses a private decryption key corresponding to the encryption key.

In some embodiments, information sent over the direct duplex connection is encrypted using private key encryption. To that end, in some embodiments, the information packet makes use of the already-secure connection between the respective server and the starting node of the linear communication orbit to provide a private key to the respective node (e.g., the private key is included in the instruction packet). In some embodiments, the instruction packet includes a public key that is used by the respective node to encrypt one or more initial communications. The initial communications include a private key. Subsequent communications between the respective server and the respective node are then encrypted using private key encryption (which is less computationally burdensome than public key encryption). In some embodiments, the respective node maintains (312) a local database of event history at the respective node. The event history includes historical local values for a plurality of indicator items (e.g., values for results of indicator item evaluations, such as "hit" and "miss" results, or "TRUE" and "FALSE" results) that are relevant to events of interest in the network. In some embodiments, the respective node continuously records event histories (e.g., records of events such as file creations, process executions, registry modifications, and network activity) continuously as the events occur.

In some embodiments, prior to uploading the local data to the respective server, the respective node receives (314) a request for the local data from the respective server through the direct duplex connection. In some embodiments, the request for the local data includes (316) a request to capture a snapshot of the local database of event history. In some embodiments, the request for the local data includes a request to evaluate one or more indicator items. In some embodiments, the request for the local data includes a request to evaluate one or more indicators of compromise. In some embodiments, the request for local data includes a request to perform a fresh evaluation (e.g., an up-to-date evaluation) of one or more indicators of compromise and/or indicator items regardless of whether the IOCs and/or indicator items have corresponding entries in the local database of event history.

In some embodiments, the respective node communicates with the respective server in at least two different ways. First, as described above, the respective node communicates directly with the respective server through the direct duplex connection. In some circumstances, this is particularly useful when the respective server wants to communicate with the respective node directly, and does not wish to involve the other nodes in the linear communication orbit in such communications. For example, because of an IOC hit on the respective node, a security incident responder may wish to ask the respective node if it has executed a particular executable. The security incident responder may not, at least initially, be interested in obtaining an answer to the same from all of the nodes in the linear communication orbit. Thus, the respective server asks the respective node, "Did you execute this particular executable?" directly over the direct duplex connection, and the respective node answers the respective server directly over the direct duplex connection.

To that end, in some embodiments, the respective node receives (318), from the respective server and through the direct duplex connection, a request for event artifacts associated with an event of interest. In response to the request for event artifacts, the respective node sends relevant event artifact data for the event of interest to the respective server through the direct duplex connection.

As used herein, the term "event" is used to mean an observable change in the network. A local event is an event that occurs at a particular node. In some embodiments, an event is an observable change to the normal behavior of the network and/or node. Events include normal events (e.g., events that are expected to occur during the normal operation of the network) and abnormal events (e.g., events that should be investigated as indicative of a security incident). In some circumstances, the abnormal events will include security incidents (e.g., a security incident is an event attributable to an unpermitted human root cause, such as malware). In some circumstances, an event of interest is an abnormal event. In some circumstances, an event of interest is an IOC hit.

As used herein, the term "event artifact" means data generated, stored, and/or recorded, wherein the data corresponds to an event. In some embodiments, the event artifacts associated with an event of interest include executable files, registry changes, files modified, files created, files deleted, files referenced, and processes executed, ports opened, and network connections established, etc., in connection with the event of interest.

As used herein, the term "event artifact data" is used to refer to information corresponding to the event artifact. In some embodiments, event artifact data include the event artifact itself (e.g., when a respective node sends event artifact data corresponding to an executable file, the respective node sends a duplicate of the executable file). In some embodiments, the event artifact data include metadata corresponding to the event artifact (e.g., log entries, statistics and metrics corresponding to the event artifacts). That is, the term "event artifact data" is intended to broadly encompass the event artifact itself or information derived from or relating to the event artifact or the event of interest.

For example, in some circumstances, the event artifacts include executable files that triggered an IOC hit (e.g., a file having the filename of suspected malware, or otherwise containing a signature of the suspected malware). In some circumstances, the event artifacts include files (e.g., text files) that triggered an IOC hit or were created by an executable that triggered an IOC hit (e.g., an executable that is suspected of being malware, a child executable of suspected malware, a parent executables of suspected malware). In some circumstances, the event artifacts are files referenced by suspected malware. In some circumstances, the event artifacts include metadata such as executable path references.

In some embodiments, the local data include responses to specific inquiries (e.g., questions) put forth by the respective server. As described below with reference to method 500 (FIGS. 5A-5E), in some embodiments, the remote investigating server will automatically suggest questions for a security incident responder (e.g., an administrator) to ask one or more nodes in a monitored network. For example, the security incident responder might choose to ask the respective node if it has executed a particular process (e.g., a process specified by the path "C:\Windows\System\cmd.exe") or whether it has executed a process with a specified MD5 hash, or a process with a specified command line. The local data will include the respective node's answers to the questions posed by the security incident responder. Thus, method 300 enables the respective server to perform deep investigation of suspicious events at the respective node using event artifacts via the direct duplex connection.

In some circumstances, however, the respective server will want to obtain an answer to the question from two or more (or all) of the nodes in the linear communication orbit. Thus, the respective node communicates with the respective server in a second way. Namely, in some embodiments, the respective node receives (320) a query from the respective server through the linear communication orbit (e.g., a query requesting any of the types of information described above, but where the query requests the information from more than one of the nodes). The respective server injects the query into the network via the starting node (e.g., server 108, FIGS. 1A-1B) of the linear communication orbit. In response to receiving the query, the respective node generates a local answer based on the historical local values stored in the local database at the respective node (or the current local value obtained on the fly) and sends the local answer to the starting node through the linear communication orbit. The starting node responds to the respective server based at least in part on the local answer collected from the respective node. In some embodiments, the starting node receives (322) respective local answers from a plurality of nodes (e.g., each of the nodes 102*b*-102*f*, or a subset of the nodes 102*b*-102*f*) in the linear communication orbit and sends an integrated response to the respective server based on the respective local answers collected from the plurality of nodes in the linear communication orbit.

FIG. 4 is a flow chart of a process 400 for establishing a direct duplex connection, e.g., for forensic investigation by a remote server (e.g., remote server 110, FIG. 1B) between a respective node and the remote server, in accordance with some embodiments. In some embodiments, the direct (e.g., point-to-point) duplex connection can be used by the remote server to perform event inquiries at the respective node. In some embodiments, the remote server performs the forensic investigation at the direction of an administrator. The administrator interacts with the remote server using an administrator's device (e.g., administrator's device 116, FIG. 1B) that is connected to the remote server (e.g., remote server 110, FIG. 1B) via a web interface or an application user interface provided by the remote server. In some embodiments, the administrator's device is also connected to a server of the network (e.g., server 108, FIG. 1B). The administrator can communicate with (e.g., issue instructions and questions, transfer event artifact data or event logs) a particular node in the network through the remote server, when a direct duplex connection has been established between the remote server and the particular node. The administrator can also communicate with a particular node through a server of the network (e.g., issue queries to the server of the network and have the query propagated along the linear communication orbit, and receive aggregated answers collect from nodes along the linear communication orbit). For brevity, the process 400 is described below as being performed at an administrator's device (e.g., administrator's device 116, FIG. 1B).

In the process 400, the administrator's device dispatches (402) an instruction packet to a respective node (e.g., node 102*f*, FIGS. 1A-1B) in a network comprising a collection of nodes (e.g., a non-static collection of nodes) through a linear communication orbit (e.g., linear communication orbit 106*a*, FIGS. 1A-1B) formed by the collection of nodes. The instruction packet propagates from node to node along the linear communication orbit until reaching the respective node. The instruction packet includes an instruction for establishing a direct connection (e.g., a direct duplex connection, a direct full-duplex connection) between the respective node and a respective server (e.g., an investigating server, such as remote server 110, FIG. 1B) by initiating an outbound connection request from the respective node to the respective server. For example, in some embodiments, after the administrator logs onto the remote server from the administrator's device, the administrator can select the respective node from a list of nodes in the monitored network to perform a deep investigation, and as a result of that, a command is sent from the administrator's device to the remote server asking the remote server to send out the instruction packet to the selected node. Upon receiving the command, the remote server sends the instruction packet to the server of the network, where the server of the network propagates the instruction packet to the respective node through the linear communication orbit. Upon receiving the instruction packet through the server of the network and the linear communication orbit, the respective node initiates the outbound connection request to the remote server.

In some embodiments, the respective server is (404) separated from the network (e.g., separated from the respective node) by a firewall (e.g., firewall 104, FIG. 1B). In some embodiments, no opening of the firewall is required for establishing the direct duplex connection.

In some embodiments, dispatching the instruction packet to the respective node in the network through the linear communication orbit formed by the collection of nodes comprises (406): sending the instruction packet to a starting node of the linear communication orbit (e.g., an upstream node of the respective node in the linear communication orbit, or a server of the network). In some embodiments, the instruction packet identifies the respective node (e.g., by its IP address) as a destination for the instruction packet and is propagated through one or more upstream nodes of the respective node (e.g., nodes 102*b*-102*e* when node 102*f* is the respective node, FIGS. 1A-1B) in the linear communication orbit before reaching the respective node (e.g., the instruction packet is propagated from node to node).

After dispatching the instruction packet to the respective node through the linear communication orbit, the administrator's device receives (408) confirmation (e.g., from the respective server) that the direct connection between the respective node (e.g., node 102*f*, FIG. 1B) and the respective server (e.g., the investigating server 110) has been established based on the outbound connection request initiated from the respective node to the respective server. For example, after the direct connection has been established, the remote server sends a notification to the administrator's device, and the notification is displayed to the administrator in the network monitoring user interface. In some embodiments, data related to the respective node (e.g., IP address, device name, etc.) can be presented to the administrator as well.

After receiving the confirmation, the administrator's device issues (410) instructions through the respective server (e.g., remote server 110) to the respective node to upload local data from the respective node to the respective server through the direct connection between the respective node and the respective server. In some embodiments, the local data include event artifact data, IOC results, a snapshot of the local database of event history (e.g., log values), historical local values of event histories, or a combination thereof. In some embodiments, the event artifacts associated with an event of interest include executable files, registry changes, files modified, files created, files deleted, files referenced, and processes executed, in connection with the event of interest. For example, in some circumstances, the event artifacts include executable files (or log entries corresponding to executable files) that triggered an IOC hit (e.g., suspected malware). In some circumstances, the event artifacts include files (e.g., text files, or log entries corresponding to those files) that triggered an IOC hit or were created by an executable that triggered an IOC hit (e.g., an executable that is suspected of being malware, a child executable of suspected malware, a parent executable of suspected malware). In some circumstances, the event artifacts are files referenced by suspected malware (or log entries corresponding to those files). In some circumstances, the event artifacts include metadata such as executable path references.

In some embodiments, the local data include responses to specific inquiries (e.g., questions) put forth by the respective server. As described below with reference to method 500 (FIGS. 5A-5E), in some embodiments, the investigating server will automatically suggest questions for a security incident responder (e.g., an administrator) to ask one or more nodes in an investigated network. For example, the security incident responder might choose to ask the respective node if it has executed a particular process (e.g., a process specified by the path "C:\Windows\System\cmd.exe") or whether it has executed a process with a specified MD5 hash, or a process with a specified command line. In some embodiments, local data include the respective node's answers to the questions posed by the security incident responder. Further detail regarding local data uploaded to the respective server is provided elsewhere in this document.

In some embodiments, the direct connection is encrypted as described above. In some embodiments, the instructions comprise an instruction packet that includes an encryption key for encrypting the local data at the respective node before uploading to the local data to the respective server. The respective server possesses a decryption key corresponding to the encryption key. The instruction packet further includes instructions for encrypting the local data before uploading the local data to the respective server through the direct connection.

In some embodiments, the administrator's device is a specialized device (e.g., a device with heightened security functions) that maintains secure connections with the server of the monitored network (e.g., server 108) and the remote investigating server (remote server 110). In some embodiments, apart from presenting the network monitoring user interface to an administrator, the administrator's device can also be a regular node in the network and have the same characteristics and functions of other nodes in the network with respect to the maintenance and workings of the linear communication orbit. In some embodiments, the server of the network can be lightweight and served by a node selected from all nodes in the network; thus, the administrator's device can also serve as the server of the network in some scenarios. When the administrator's device also serves as the server of the network, actions performed "through the server of the network" are performed by the administrator's device directly.

FIGS. 5A-5E are a flow chart of a process 500 for establishing a direct duplex connection between a respective node and a remote server, e.g., for forensic investigation by the remote server, in accordance with some embodiments. The direct duplex connection can be used by the remote server to perform event inquiries at the respective node. For brevity, process 500 is described as being performed by a respective server (e.g., remote server 110, FIG. 1B), which in some embodiments is a remote server that performs forensic investigation on a respective node (e.g., node 102*f*, FIG. 1B) and is optionally separated from the respective node by a firewall (e.g., firewall 104, FIG. 1B).

During the process 500, the remote server dispatches (502) an instruction packet to a respective node (e.g., node 102*f*, FIG. 1B) in a network (e.g., network 100, FIG. 1B)

comprising a collection of nodes (e.g., two or more nodes) through a linear communication orbit (e.g., linear communication orbit 106*a*, FIG. 1B) formed by the collection of nodes. The instruction packet propagates from node to node along the linear communication orbit until reaching the respective node. The instruction packet includes an instruction for establishing a direct duplex connection (e.g., a full-duplex connection) between the respective node and the respective server by initiating an outbound connection request from the respective node to the respective server.

In some embodiments, dispatching the instruction packet to the respective node in the network through the linear communication orbit formed by the collection of nodes comprises: sending (504) the instruction packet to a starting node of the linear communication orbit (e.g., server 108, FIGS. 1A-1B, which in the topology shown in FIGS. 1A-1B can be viewed as a node in the linear communication orbit 106*a*). The instruction packet identifies the respective node as a destination for the instruction packet (e.g., by specifying a unique ID, such as an IP address, or one or more characteristics of the respective node), and the instruction packet is propagated through one or more upstream nodes of the respective node (e.g., nodes 102*b*-102*e* when the respective node is node 102*f*) in the linear communication orbit before reaching the respective node.

In some embodiments, the direct duplex connection is (506) a secure Web Socket connection (e.g., a full-duplex connection through which the respective node and the respective server can each communicate with one another simultaneously).

In some embodiments, the respective server is (508) separated from the network (e.g., separated from the respective node) by a firewall (e.g., firewall 104, FIG. 1B). In some embodiments, no opening of the firewall is required for establishing the direct duplex connection.

After dispatching the instruction packet to the respective node through the linear communication orbit, the respective server receives (510), from the respective node, a request for establishing the direct duplex connection between the respective node and the respective server. In response to receiving the request from the respective node, the respective server establishes (512) the direct duplex connection between the respective node and the respective server (e.g., by responding to the request, and completing the connection establishment handshake according to the connection protocol).

As noted above, in some embodiments, the respective node communicates with the respective server in at least two different ways. The first way is that the respective node communicates with the respective server through the direct duplex connection (e.g., without going through one or more other nodes in the linear communication orbit). To that end, after establishing the direct duplex connection, the respective server issues (514) instructions to the respective node to upload local data (e.g., data generated by and/or stored at the respective node) from the respective node to the respective server through the direct duplex connection between the respective node and the respective server. In some embodiments, issuing instructions (e.g., query response instructions) to the respective node to upload local data from the respective node to the respective server through the direct duplex connection further includes sending a request to the respective node to capture a snapshot of a local database of event history maintained at the respective node (e.g., capturing a snapshot includes duplicating the local database of event history and sending the duplicated local database of event history to the respective server). In some embodiments, allowing local event history to be stored at the nodes in the network, and only uploading a snapshot of the local event database as needed, may reduce the data storage and maintenance burden on the remote server.

In some embodiments, the instruction packet includes an encryption key, and the respective server possesses a decryption key corresponding to the encryption key. The respective server receives encrypted local data from the respective node through the direct duplex connection between the respective node and the respective server and decrypts the encrypted local data using the decryption key corresponding to the encryption key. Encryption of data passed between the respective node and the respective server is described in greater detail above with reference to method 300 (FIGS. 3A-3B).

In some embodiments, the respective node communicates with the respective server is via one or more other nodes in the linear communication orbit (e.g., by node-to-node and server-to-server communication, FIG. 1A). This is particularly useful when the respective server wants to request a response to a question from a plurality of nodes in the linear communication orbit (e.g., “Has an executable with a filename ‘VIRUS.EXE’ been executed on this machine?”). Rather than each node responding individually to the query message, the plurality of nodes can produce an aggregated response by propagating the query message and appending their own answers to the aggregated response (e.g., by appending its own identifier or IP address to a hit log in the answer portion of the query message). Thus, the aggregated response includes local answers to the question from the plurality of nodes in the linear communication orbit. To that end, in some embodiments, the respective server injects (516) a query (e.g., a request for data from one or more nodes) into the network through a starting node of the linear communication orbit. The starting node propagates the query (e.g., in a query message) through the linear communication orbit. The respective server receives local answers collected from a plurality of nodes in the network through the starting node of the linear communication orbit. For example, in some embodiments, when the query message has been propagated through the linear communication orbit and reached an end node of the linear communication orbit, the answer portion of the query message contains the aggregated answers from all the nodes (or all nodes for which the query has produced a “hit”). The end node sends the aggregated answers back to the server of the network, and the server of the network then forwards the aggregated answer to the remote server.

In some embodiments, the query requests local answers from one or more nodes that are specified in the query (e.g., by their respective IP addresses, or by their characteristics (e.g., all machines running version x of the operating system)). In some embodiments, the query request local answers from each of the nodes in the collection of nodes forming the linear communication orbit. In some embodiments, the local answers include local data (e.g., data generated by and/or stored at the respective node). In some embodiments, the local data include event artifact data, IOC results, a snapshot of the local database of event history (e.g., log values), historical local values of event histories, or a combination thereof.

In some embodiments, the local answers are collected (518) from the plurality of nodes according to a schedule specified in the query (e.g., a schedule based on time or trigger events). For example, in some embodiments, the query will specify that one or more IOCs should be evaluated on each node according to a schedule and/or evaluated at a certain frequency (e.g., once a day, once a week, etc.). The local answers include results of these IOC evaluations and are collected from the plurality of nodes at set times (e.g., once a day, once a week, or at some other interval; however, the schedule for collecting the local answers need not be the same as the schedule for evaluating the IOCs). In some embodiments, in order to minimize the burden of threat monitoring, local answers are collected from the plurality of nodes at "down times" for the network, e.g., times when the network is typically not experiencing a lot of traffic (e.g., 2:00 AM local time).

In some embodiments, the local answers are (520) generated by the plurality of nodes according to historical local values stored in respective local databases of event histories that are maintained at the plurality of nodes (e.g., local values generated by the nodes prior to and/or independently of the arrival of the query). For example, in some embodiments, each of the plurality of nodes maintains an index of IOC results. In some embodiments, the local database for each node in the plurality of nodes includes the IOC index for that node and the event history includes the IOC results for that node. Each node in the plurality of nodes can then respond to the question, e.g., "Which nodes have returned a hit for this IOC in the last week?" by referencing the historical local values in the node's respective local database. As another example, in some embodiments, the local database for each node in the plurality of nodes includes a log of executable-related events that have occurred at the node (e.g., a log with a record of the executables that have been executed, when those executables were executed, which files were referenced by the executables, which files have been written by those executables and their file paths). Each node in the plurality of nodes can then respond to the question (e.g., "Which nodes have executed this particular executable in the last week?") according to historical local values in the node's respective local databases. Thus, the local databases save computational time in aggregating responses from the plurality of nodes.

In some embodiments, the aggregated answer is an answer that is accumulated as the query is answered at each qualifying node (e.g., each node in the plurality of nodes), or is an answer that is generated by the starting node after receiving all of the local answers from the plurality of nodes.

In some embodiments, receiving local answers collected from the plurality of nodes in the network through the starting node of the linear communication orbit includes: receiving (522) an aggregated answer from the starting node of the linear communication orbit. The aggregated answer is generated based on the local answers collected from the plurality of nodes in the network. For example, consider the query, "Which nodes have executed this particular executable in the last week?" In some embodiments, a node that answers the query in the affirmative appends its IP address to the aggregated answer, and then passes the aggregated answer to the next downstream node, which does the same (e.g., node 102*d*, FIGS. 1A-1B, answers the question by appending its IP address if it has executed the executable, and passes the aggregated response to node 102*e*). In some embodiments, when the aggregated response again reaches the starting node (e.g., server 108, FIGS. 1A-1B), the starting node returns the aggregated response to the respective server (e.g., returns the response to server 110 via secure connection 114, FIG. 1B). In some embodiments, each node in the plurality of nodes appends information indicating its identity (e.g., its IP address) and additional information responsive to the query (e.g., a list of IOC hits or actual local indicator values for indicator items in the IOCs).

Returning now to communication between the respective node and the respective server using the direct duplex connection, in some embodiments, the respective server sends (524), through the direct duplex connection, a request for event artifacts associated with an event of interest. In response to the request for event artifacts, the respective node sends relevant event artifact data for the event of interest to the respective server through the direct duplex connection. In other words, in response to sending the request for event artifacts, the respective server receives relevant event artifact data for the event of interest through the direct duplex connection. In some embodiments, the event artifacts associated with the event of interest include executable files, registry changes, files modified, files created, files deleted, files referenced, and processes executed, in connection with the event of interest. For example, in some circumstances, the event artifacts include executable files that triggered an IOC hit (e.g., suspected malware). In some circumstances, the event artifacts include files (e.g., text files) that triggered an IOC hit or were created and/or referenced by an executable that triggered an IOC hit (e.g., an executable that is suspected of being malware, a child executable of suspected malware, and/or a parent executable of suspected malware, etc.). In some circumstances, the event artifacts include metadata such as executable path references.

In some embodiments, the relevant event artifact data for the event of interest include the event artifacts themselves and/or metadata associated with the event of interest. In some embodiments, the metadata associated with the event of interest include environment parameters of the respective node at the time of the event of interest. In some embodiments, the environment parameters include information concerning the specifications of the respective node. In some embodiments, the environment parameters include version information for an operating system running on the respective node, a list of applications installed on the respective node, a number and type of CPUs on the respective node, information about memory on the respective node, usernames, file paths, execution paths and/or dependencies, etc.

In some embodiments, based on the relevant event artifact data received through the direct duplex connection, the respective server creates (526) a sandbox environment to recreate the event of interest (e.g., recreate creation of a file that resulted in an IOC hit). In some embodiments, the sandbox environment is created as a virtual machine running on the respective server. The virtual machine mimics (e.g., mirrors) certain states/conditions and/or files on the respective node. The sandbox environment is used to test event artifacts (e.g., including untrusted, suspicious, and/or unverified files that may contain a virus or other malicious code), without allowing the software to harm the respective server. In some embodiments, the sandbox environment is used to create new indicators of compromise (e.g., by running a known malware executable and seeing what files it references, determining MD5 hashes for files referenced by the known malware executable, etc., and then constructing IOCs based on this information).

For example, when an executable is pulled from a node, it can be stored by the respective server in an encoded archive along with files that the executable references. The encoded archive prevents the files from being deleted or moved by antivirus software. In some embodiments, the encoded archive includes information about the path where the executable was found as well as the files that it referenced during its execution. In some embodiments, these archived files are automatically transferred and deployed into the sandbox environment using the files and metadata. In the sandbox environment, the executable can be executed. The files referenced by the executable can be learned from the executable path references as well as the event history, which includes information about which files were modified and which child executables were launched.

In some embodiments, the respective server receives (528) user selection of an event of interest or one or more event artifacts associated with the respective node. In response to receiving the user selection, the respective server generates one or more network-wide queries based on characteristics of the event of interest or the one or more event artifacts associated with the respective node. The respective server injects at least one of the one or more network-wide queries into the network through a starting node of the linear communication orbit (e.g., via secure connection 114, FIG. 1B) to collect local answers from other nodes in the network and receives local answers for the at least one of the one or more network-wide queries (e.g., via secure connection 114, FIG. 1B), the local answers having been collected from a plurality of nodes in the network through the starting node of the linear communication orbit.

In some embodiments, generating the one or more network-wide queries based on the characteristics of the event of interest or the one or more event artifacts associated with the respective node includes: generating (530) the one or more network-wide queries based on one or more query templates and one or more local event artifact values associated with the respective node. In some embodiments, the network-wide queries include a request to identify the nodes in the linear communication orbit that share the one or more event artifacts or have records of similar event artifacts in their respective event histories. In some embodiments, characteristics of an event of interest may include contextual conditions surrounding the occurrence of the event of interest, such as names of newly created/modified/deleted files, names and resource consumption of active processes, IP addresses associated with active network connections, etc., at the time that the event of interest occurred at the respective node.

In some embodiments, generating the one or more network-wide queries based on the characteristics of the event of interest or the one or more event artifacts associated with the respective node includes: automatically generating (532) one or more indicators of compromise (IOCs) based on the characteristics of the event of interest or the one or more event artifacts associated with the respective node. The generated IOCs can be used inside the network or outside the network (e.g., added to a IOC subscription feed).

In some embodiments, prior to injecting the at least one of the one or more network-wide queries into the network, the respective server presents (534) the one or more network-wide queries that have been generated in an administrator user interface (e.g., a network monitoring user interface for security incident responders) and receives user selection of the at least one of the one or more network-wide queries in the administrator user interface for injection into the network.

In an example scenario of operations 528-534, described above, prior to operation 528, the respective node will have reported (e.g., through the direct duplex connection) having executed a particular executable (e.g., an executable named cmd.exe) that may be involved in an event of interest. For example, an administrator's user interface might display all of the processes executed by the respective node for a security incident responder to examine. The administrator's user interface may allow user selection of the executables displayed in the administrator's user interface. Thus, the user can select "cmd.exe" in the user interface. (An example of operation 528). In response to the user selecting "cmd.exe," the respective server generates queries pertinent to "cmd.exe," such as "Which nodes have executed cmd.exe?" or "Which files on each node have been referenced by cmd.exe?" or "Which files on each node have referenced cmd.exe?" (An example of operation 530, where, e.g., the template is "Which files on each node have referenced <filename>?" and the local event artifact value is <filename>="cmd.exe"). The respective server may also generate an IOC for "cmd.exe," including indicator items for the file name "cmd.exe" as well as any files referenced by "cmd.exe." (An example of operation 532). In some embodiments, the network-wide queries include a query corresponding to the automatically generated IOC (e.g., "Run an automatically generated IOC on selected nodes for this event of interest.") The respective server presents these queries to the security incident responder via the administrator's user interface and receives user selection of the security incident responder's desired queries. (An example of operation 534). In some embodiments, these queries are dispatched to the linear communication orbit, e.g., through the secure connection between the respective server (e.g., remote serve 110, FIG. 1B) and the starting node of the linear communication orbit (e.g., server 108, FIG. 1B).

In some embodiments, the respective server dispatches (536) a first IOC for a first event of interest into the network. The first IOC includes a plurality of indicator items. In response to dispatching the first IOC into the network, the respective server receives identification result data for the first event of interest from a plurality of nodes (e.g., nodes that self-identify (or are otherwise independently determined) as having encountered or not encountered the first event of interest) in the network and modifies the first IOC based on the received identification result data for the first event of interest. In some embodiments, the identification result data for the first event of interest includes actual evaluation results (e.g., TRUE or FALSE answers) for the indicator items in the first IOC, evaluation results for the first IOC ("hit" or "miss" results for the identification of the first event of interest), and/or actual indicator values for the indicator types specified in the first IOC (e.g., exact filenames of new files created by the executable "cmd.exe")). In some embodiments, modifying the first IOC includes at least one of removing at least one of the plurality of indicator items and reordering the plurality of indicator items based on the received identification result data.

In some embodiments, the identification result data include data that indicate a particular state of the node at the time when the event of interest occurred, e.g., the presence or absence of a condition (or a set of conditions), such as the presence or absence of a particular file or process that is suspected of being a threat or a byproduct of a threat. In some embodiments, the first IOC describes a condition or a combination of conditions that are indicative of the occurrence of the event of interest (e.g., infection by a virus, occurrence of a security breach, etc.) in terms of a particular evaluation result for an indicator item (e.g., presence of a file named "VIRUS.exe"=TRUE) or a particular combination of indicator values for a set of multiple indicator items (e.g., "presence of a file named 'VIRUS.exe'=TRUE" AND "Port 88 is open=TRUE"). In some embodiments, the identification result data include data indicative of whether the first event of interest was caused by the presence or absence of a security threat. For example, the identification result data optionally include timing information for creation, modification, and deletion of particular files and processes named in the IOC. For example, an indicator item in the first IOC may ask "Is process X occupying more than 50% of the CPU?" In some embodiments, the identification result data include results of evaluating the first IOC (e.g., a "hit" or "miss" result for identifying the event of interest according to the first IOC). In some embodiments, the identification result data include results of evaluating each indicator item (or a subset of indicator items) (e.g., TRUE or FALSE result for evaluating the indicator items in the first IOC) in the plurality of indicator items. In some embodiments, for at least some of the indicator items (e.g., IP addresses of network connections created after execution of cmd.exe included "192.168.73.13"=TRUE) in the first IOC, actual indicator values for the indicator types of the indicator items are returned as part of the identification result data (e.g., IP addresses of all network connections created after execution of cmd.exe are returned as part of the identification result data) for the first event of interest.

In some embodiments, if the first IOC includes a good set of indicators for the first event of interest, the identification result data (e.g., including evaluation results for the first IOC) received from the plurality of nodes would include a large percentage of "hits" for nodes that self-identify (or are otherwise independently determined) as having encountered the first event of interest. If the identification result data received from the plurality of nodes include a moderate percentage or small percentage of "hits" for nodes that self-identify (or are otherwise independently determined) as having encountered the first event of interest, the indicator items included in the first IOC should probably be revised to improve the accuracy of the first IOC.

In some embodiments, some of the indicator items are good indicators for the event of interest, while others are not as good. For example, if out of one hundred nodes being queried, fifty nodes self-identify (or are otherwise independently determined) as having encountered the first event of interest. If out of the fifty nodes that self-identify (or are otherwise independently determined) as having encountered the first event of interest, over ninety percent of the nodes answered "TRUE" for indicator item A, and "FALSE" for indicator item B; and out of the fifty nodes that self-identify (or are otherwise independently determined) as not having encountered the first event of interest, over ninety percent of the nodes answered "FALSE" for indicator item A, and "TRUE" for indicator item B, then, the combination of conditions, i.e., "indicator item A=TRUE" AND "indicator item B=FALSE", would constitute a good IOC for identifying the first event of interest. If however, out of the fifty nodes that self-identify (or are otherwise independently determined) as having encountered the first event of interest, over ninety percent of the nodes answered "TRUE" for indicator item A, and "FALSE" for indicator item B; and out of the fifty nodes that self-identify (or are otherwise independently determined) as not having encountered the first event of interest, over 90 percent of the nodes answered "FALSE" for indicator item A, and "FALSE" for indicator item B, then, indicator item B is not a good indicator item to include in the first IOC, and should be removed in the revision of the first IOC.

In some embodiments, event artifacts data for particular indicator items are obtained from the plurality of nodes, and patterns (e.g., repeated occurrences of a particular condition or a particular combination of conditions) are strongly correlated with the presence or absence of the event of interest. Based on the patterns (e.g., repeated occurrences of a set of contextual conditions) discovered in the identification result data, new indicator items may be added to the first IOC, and existing indicator items may be modified or deleted from the first IOC.

In some embodiments, receiving the identification result data for the first event of interest from the plurality of nodes in the network includes: receiving (538) evaluation result data indicating repeated occurrences of a set of contextual conditions associated with the first event of interest (e.g., repeated occurrences of a particular indicator value or a particular combination of indicator values for the indicator item types specified in the first IOC) at multiple nodes in the network or for multiple evaluations of the first IOC over time.

Repeated instances of evaluating an IOC can be used to determine the usefulness (e.g., fidelity) of indicator items within the IOC (e.g., the indicator items' ability to properly identify conditions of interest). In some embodiments, the respective server determines respective confidence values for at least some of the indicator items, wherein the confidence value for a respective indicator item is based on a correlation between evaluation results of the indicator item and the presence or absence of the event of interest. In some embodiments, the correlation between evaluation results of the indicator item and the presence or absence of the event of interest is based on the evaluation results from repeated instances of evaluating the first IOC. In some embodiments, the correlation is further based on the evaluation results for the plurality of indicator items obtained from the repeated instances of evaluating the first IOC. In some embodiments, the respective server determines (540) respective variances for at least some of the plurality of indicator items based on the received identification result data for the first event of interest. In some embodiments, the respective variances are one or more metrics that characterize the spread of indicator values for respective indicator items. Based on the respective variances for the at least some of the plurality of indicator items, the respective server determines respective confidence values for the at least some of the plurality of indicator items for the first event of interest. Modifying the first IOC based on the received identification result data for the first event of interest from the plurality of nodes in the network includes removing one or more of the plurality of indicator items from the first IOC based on relative confidence values of the at least some of the plurality of indicator items (e.g., those with low confidence values).

As used herein, "variance" means a contingency (e.g., correlation) of an indicator item on an underlying state of the node (e.g., a prior occurrence or condition). In some embodiments, the variance of an indicator item means a contingency of the indicator item on the presence and/or absence of a security threat (e.g., the underlying state of the node is the presence and/or absence of the security threat). In some embodiments, a confidence value is a numerical value representing a certainty (e.g., a strength) which with the indicator item correlates with the underlying state of the node. In some embodiments, a confidence value is a numerical value representing the certainty with which the null hypothesis is rejected given the respective variance of the indicator item (e.g., using a chi-squared test for categorical data). The null hypothesis is the assumption that the results of the indicator item's evaluation results are independent of the underlying state of the node (e.g., the presence or absence of the threat). In some embodiments, the confidence value is the proportion of indicator item "hits" that correctly identify a security threat (e.g., the true positive rate, also called the sensitivity, which can be calculated by one minus the type-I error rate). In some embodiments, the confidence value is the proportion of indicator item "misses" that correctly identify that the security threat is absent on the respective node (e.g., the true negative rate, also called the specificity, which can be calculated by one minus the type-II error rate).

In some embodiments, an indicator item evaluation result is determined to be correct if the result is in agreement with an independent or superseding determination of the existence of the state of the node. In some embodiments, an indicator item evaluation result is determined to be correct if the indicator item evaluation result agrees with an IOC result for the same threat (e.g., the IOC is considered the gold standard test for the threat). In some embodiments, when a respective indicator item is included in an IOC, a hit for the indicator item is determined to be a correct hit if the IOC also returns a hit. Likewise, an indicator item miss is determined to be a correct miss if the IOC also returns a miss. An indicator item hit is determined to be a false positive when the IOC returns a miss. An indicator item miss is considered to be a false negative when the IOC returns a hit. In some embodiments, an indicator item evaluation is determined to be correct if it is in agreement with a determination made by a security incident responder (e.g., a person).

In some embodiments, the respective server determines (542) hit probabilities for at least some of the plurality of indicator items based on the received identification result data for the first event of interest. Modifying the first IOC based on the received identification result data for the first event of interest includes reordering the plurality of indicator items in the first IOC based on the relative hit probabilities for the at least some of the plurality of indicator items. In some embodiments, a hit probability is a probability that an indicator item produces a hit, regardless of the fidelity of that indicator item to the condition being tested for (e.g., hit probability is unrelated to the confidence value of the indicator item). In some embodiments, the hit probability is an a priori probability (e.g., an uninformed prior probability) that the indicator item returns a hit. In some embodiments, a hit probability is the probability of a hit given the presence of the condition being tested for.

In some embodiments, this reordering of indicator items can reduce resource consumption and improve response times associated with IOC evaluation. For example, consider an IOC with a plurality of indicator items connected by a logical OR (e.g., IOC specification 200, FIG. 2A). The IOC will return a true result whenever any of the plurality of indicator items returns a true result, so the respective server reorders the plurality of indicator items so that indicator items with higher hit probabilities are evaluated first. If an indicator item returns a hit, the machine evaluating the IOC can stop evaluating the remaining indicator items, because their results have no bearing on the overall IOC evaluation result.

Conversely, consider an IOC with a plurality of indicator items connected by a logical AND (e.g., IOC specification 210, FIG. 2B). The IOC will return a false result whenever any of the plurality of indicator items returns a false result, so the respective server reorders the plurality of indicator items so that indicator items with higher hit probabilities are evaluated last. If an indicator item returns a miss, the machine evaluating the IOC can stop evaluating the remaining indicator items, because their results have no bearing on the overall IOC evaluation result.

Thus, reordering the indicator items allows the respective server to increase its odds of being able to "short-cut" the IOC evaluations.

Figure 6:
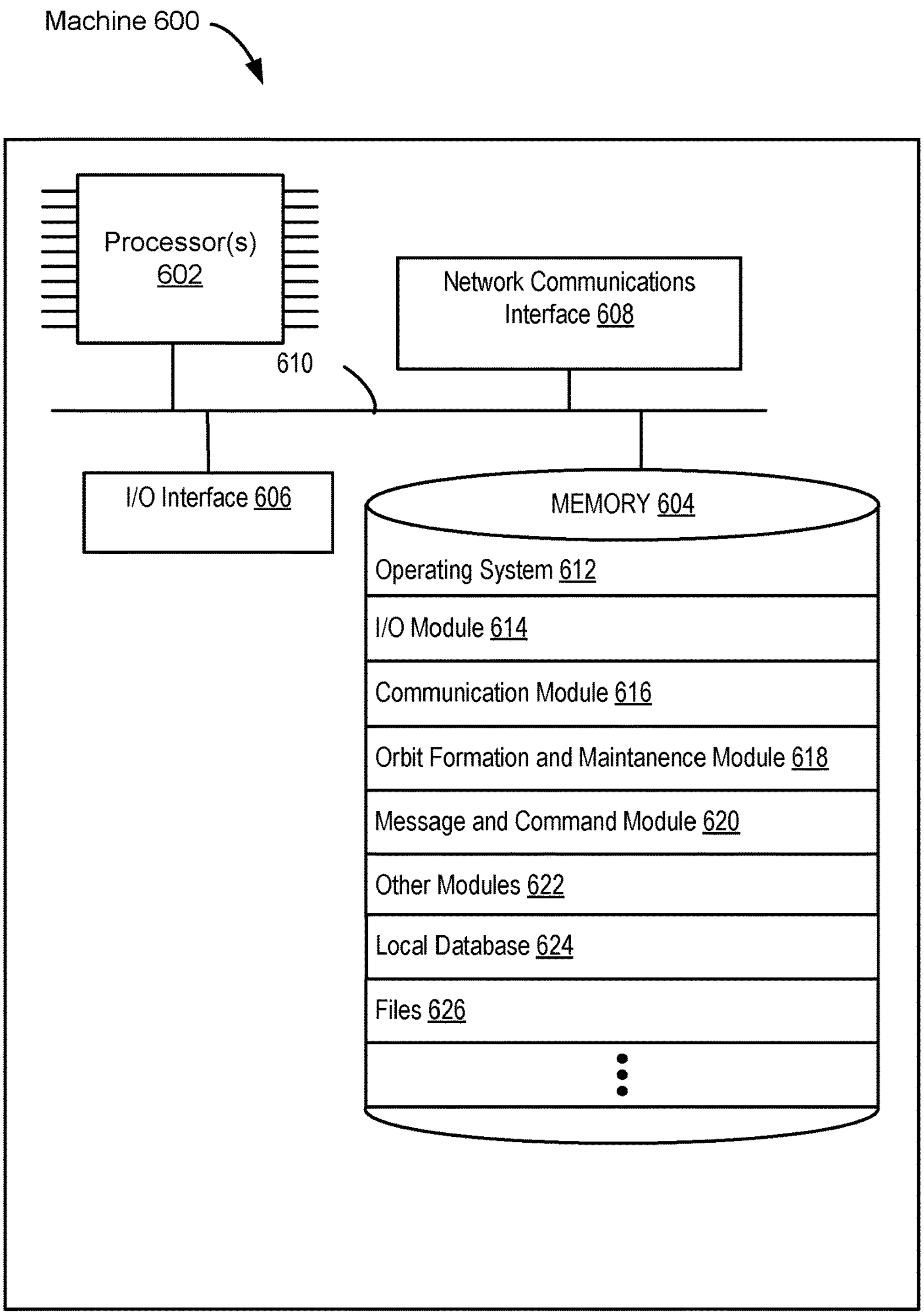
FIG. 6 is a block diagram of a system (e.g., an exemplary node) in accordance with some embodiments.

FIG. 6 is a block diagram of an exemplary machine 600 (e.g., serving as a node 102 shown in FIGS. 1A-1B). In some implementations, machine 600 includes one or more processors 602, memory 604 for storing programs and instructions for execution by one or more processors 602, one or more communications interfaces such as input/output interface 606 and network interface 608, and one or more communications buses 610 for interconnecting these components.

In some embodiments, input/output interface 606 includes a display and input devices such as a keyboard, a mouse or a track-pad. In some embodiments, communication buses 610 include circuitry (sometimes called a chipset) that interconnects and controls communications between system components. In some embodiments, memory 604 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. In some embodiments, memory 604 includes one or more storage devices remotely located from the one or more processors 602. In some embodiments, memory 604, or alternatively the non-volatile memory device(s) within memory 604, comprises a non-transitory computer readable storage medium.

In some embodiments, memory 604 or alternatively the non-transitory computer readable storage medium of memory 604 stores the following programs, modules and data structures, instructions, or a subset thereof:

- Operating System 612 that includes procedures for handling various basic system services and for performing hardware dependent tasks.
- I/O module 614 that includes procedures for handling various basic input and output functions through one or more input and output devices.
- Communication module 616 that is used for connecting machine 600 to other machines (e.g., other machines 102 in network 100), administrator's device 116, or servers (e.g., server 108/110) via one or more network communication interfaces 608 (wired or wireless) and one or more communication networks, such as the Internet, other wide area networks, local area networks, metropolitan area networks, and so on.
- Orbit formation and maintenance module 618 that includes instructions to self-insert into a linear communication orbit and self-healing from a broken link in the linear communication orbit.
- Message and command module 620 that includes instructions for (1) providing and collecting system, security and network management messages and commands (e.g., detection requests, reporting requests, reporting messages, remedial instructions, etc.) and/or (2) distribution of files and software updates (e.g., the management software).
- Other modules 622 that include instructions for handling other functions and aspects described herein, such as creation and maintenance of local event logs and performing IOC evaluations based on local state.
- Local Database 624 that stores local values for event histories, e.g., results for one or more indicator items (e.g., results of evaluating one or more indicator items with respect to a file or set of files, such as files 626), event artifacts, and/or an index of indicator item evaluation results, etc.

- Files 626, optionally including files having executable programs, image files containing images, and/or data files containing data of various types.

FIG. 6 is merely illustrative of the structures of machines 600. A person skilled in the art would recognize that particular embodiments of machines 600 may include more or fewer components than those shown. One or more modules may be divided into sub-modules, and/or one or more functions may be provided by different modules than those shown.

Figure 7:
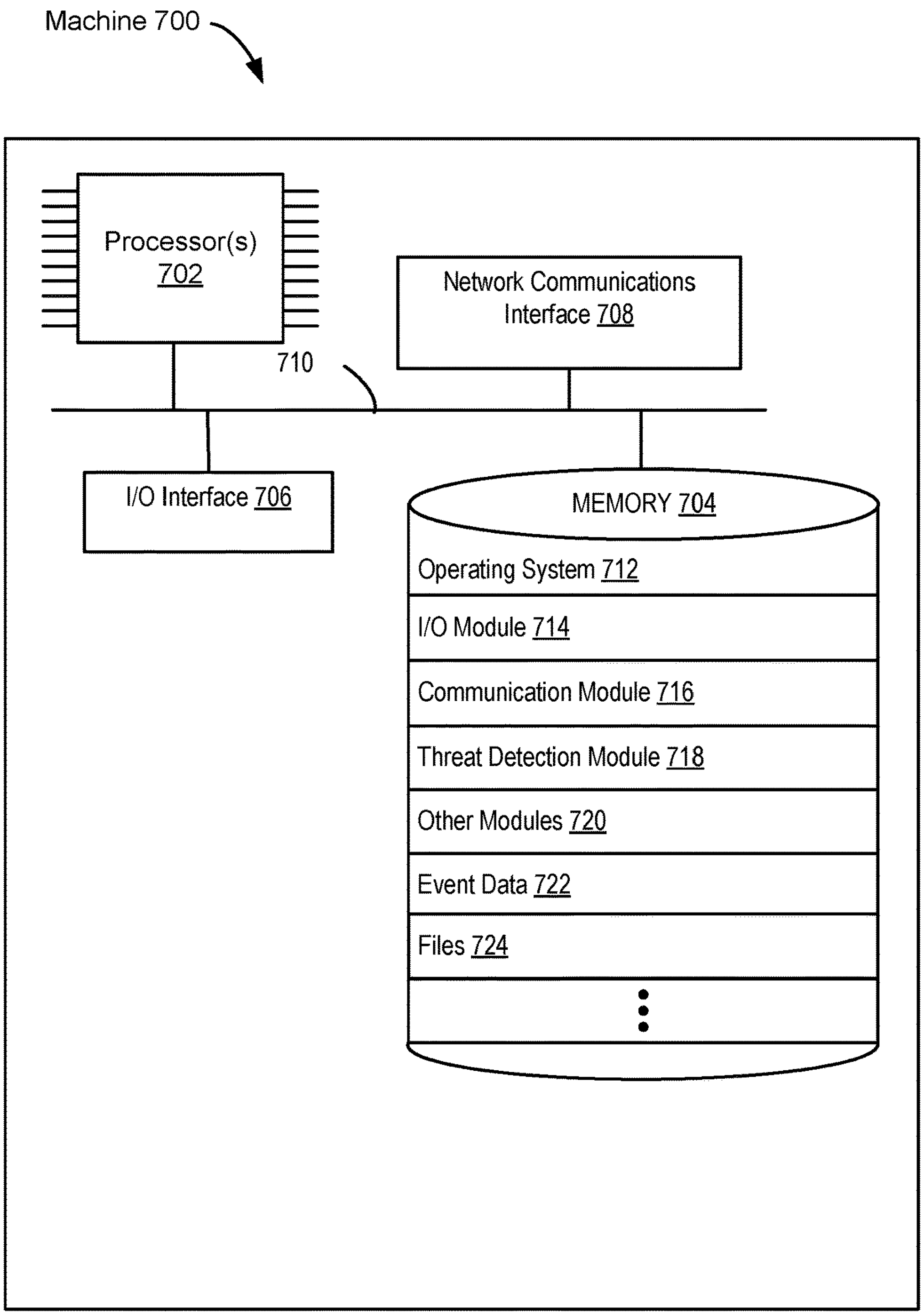
FIG. 7 is a block diagram of a system (e.g., an administrator's device) in accordance with some embodiments.

FIG. 7 is a block diagram of an exemplary machine 700 (e.g., serving as an administrator's device 116 shown in FIG. 1B). In some implementations, machine 700 includes one or more processors 702, memory 704 for storing programs and instructions for execution by one or more processors 702, one or more communications interfaces such as input/output interface 706 and network interface 708, and one or more communications buses 710 for interconnecting these components.

In some embodiments, input/output interface 706 includes a display and input devices such as a keyboard, a mouse or a track-pad. In some embodiments, communication buses 710 include circuitry (sometimes called a chipset) that interconnects and controls communications between system components. In some embodiments, memory 704 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. In some embodiments, memory 704 includes one or more storage devices remotely located from the one or more processors 702. In some embodiments, memory 704, or alternatively the non-volatile memory device(s) within memory 704, comprises a non-transitory computer readable storage medium.

In some embodiments, memory 704 or alternatively the non-transitory computer readable storage medium of memory 704 stores the following programs, modules and data structures, instructions, or a subset thereof:

- Operating System 712 that includes procedures for handling various basic system services and for performing hardware dependent tasks.
- I/O module 714 that includes procedures for handling various basic input and output functions through one or more input and output devices.
- Communication module 716 that is used for connecting machine 700 to other machines (e.g., machines 102 in network 100) or servers (e.g., server 108, server 110) via one or more network communication interfaces 708 (wired or wireless) and one or more communication networks, such as the Internet, other wide area networks, local area networks, metropolitan area networks, and so on.
- Threat Detection module 718 that includes instructions to provide a user management interface for generating and/or dispatching queries and IOCs to the network or to a particular node in the network, to perform forensic analysis on event artifacts data and local event logs collected from a particular node, to generate and revise IOCs based on information collected from the network and/or a particular node.
- Other modules 720 that include instructions for handling other functions and aspects described herein, such as dispatching instructions for remedial actions when threats are detected in a monitored network.
- Event data 722 that stores local values for event histories, event artifacts, and/or an index of indicator item evaluation results, etc. collected from the network or a particular node.
- Files 724, optionally including files having executable programs, image files containing images, and/or data files containing data of various types.

FIG. 7 is merely illustrative of the structures of machines 700. A person skilled in the art would recognize that particular embodiments of machines 700 may include more or fewer components than those shown. One or more modules may be divided into sub-modules, and/or one or more functions may be provided by different modules than those shown.

Figure 8:
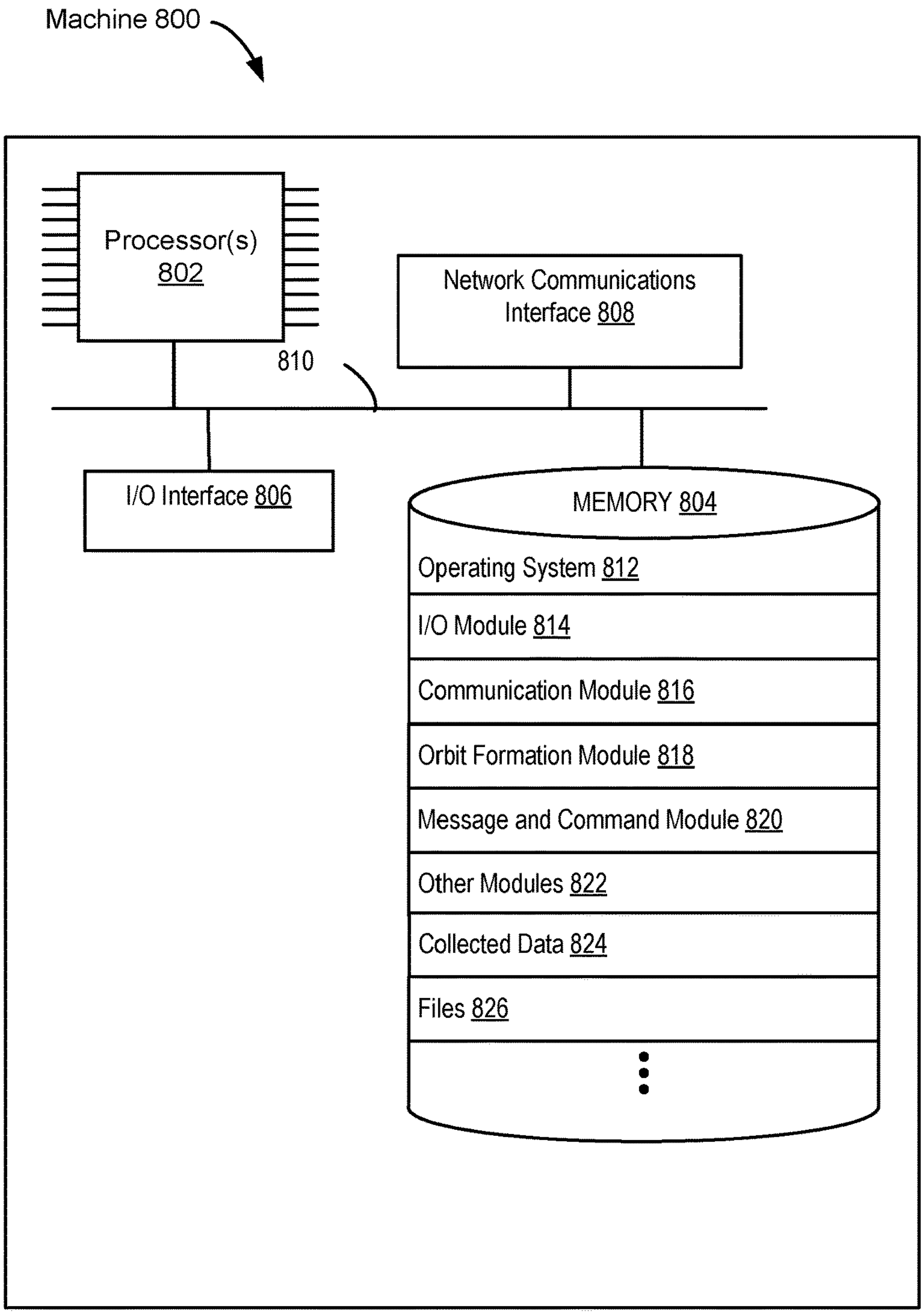
FIG. 8 is a block diagram of a system (e.g., a server of the network) in accordance with some embodiments.

FIG. 8 is a block diagram of an exemplary machine 800 (e.g., serving as a server 108 of the network shown in FIGS. 1A-1B). In some implementations, machine 800 includes one or more processors 802, memory 804 for storing programs and instructions for execution by one or more processors 802, one or more communications interfaces such as input/output interface 806 and network interface 808, and one or more communications buses 810 for interconnecting these components.

In some embodiments, input/output interface 806 includes a display and input devices such as a keyboard, a mouse or a track-pad. In some embodiments, communication buses 810 include circuitry (sometimes called a chipset) that interconnects and controls communications between system components. In some embodiments, memory 804 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. In some embodiments, memory 804 includes one or more storage devices remotely located from the one or more processors 802. In some embodiments, memory 804, or alternatively the non-volatile memory device(s) within memory 804, comprises a non-transitory computer readable storage medium.

In some embodiments, memory 804 or alternatively the non-transitory computer readable storage medium of memory 804 stores the following programs, modules and data structures, instructions, or a subset thereof:

- Operating System 812 that includes procedures for handling various basic system services and for performing hardware dependent tasks.
- I/O module 814 that includes procedures for handling various basic input and output functions through one or more input and output devices.
- Communication module 816 that is used for connecting machine 800 to other machines (e.g., machines 102 in network 100, an administrator's device 116) or servers (e.g., remote server 110) via one or more network communication interfaces 808 (wired or wireless) and one or more communication networks, such as the Internet, other wide area networks, local area networks, metropolitan area networks, and so on.
- Orbit formation module 818 that includes instructions to determine and provide ordinal positions of machines 102 in an ordered sequence of all managed machines 102 currently known to be coupled to network 100.
- Message and command module 820 that includes instructions for (1) providing and collecting system, security and network management messages and commands (e.g., detection requests, reporting requests, reporting messages, remedial instructions, etc.) and/or (2) distribution of files and software updates (e.g., the management software). In some embodiments, message and command module 720 provides a user interface for a network or system administrator to directly perform various system and network functions, such as issuing status inquiries, providing management instructions, deploying system configurations, and dispatching software updates, etc.

- Other modules 822 that include instructions for handling other functions and aspects described herein, such as forwarding instructions, queries, requests from the administrator's device and/or the remote investigating server along the linear communication orbit, and forwarding responses and answers collected from the network to the administrator's device and/or the remote investigating server.
- Collected data 824 that optionally include raw and/or processed data collected from the network, including for example, local values for event histories, event artifacts, and/or an index of indicator item evaluation results, etc. collected from the network.
- Files 826, optionally including files having executable programs, image files containing images, and/or data files containing data of various types.

FIG. 8 is merely illustrative of the structures of machines 800. A person skilled in the art would recognize that particular embodiments of machines 800 may include more or fewer components than those shown. One or more modules may be divided into sub-modules, and/or one or more functions may be provided by different modules than those shown.

Figure 9:
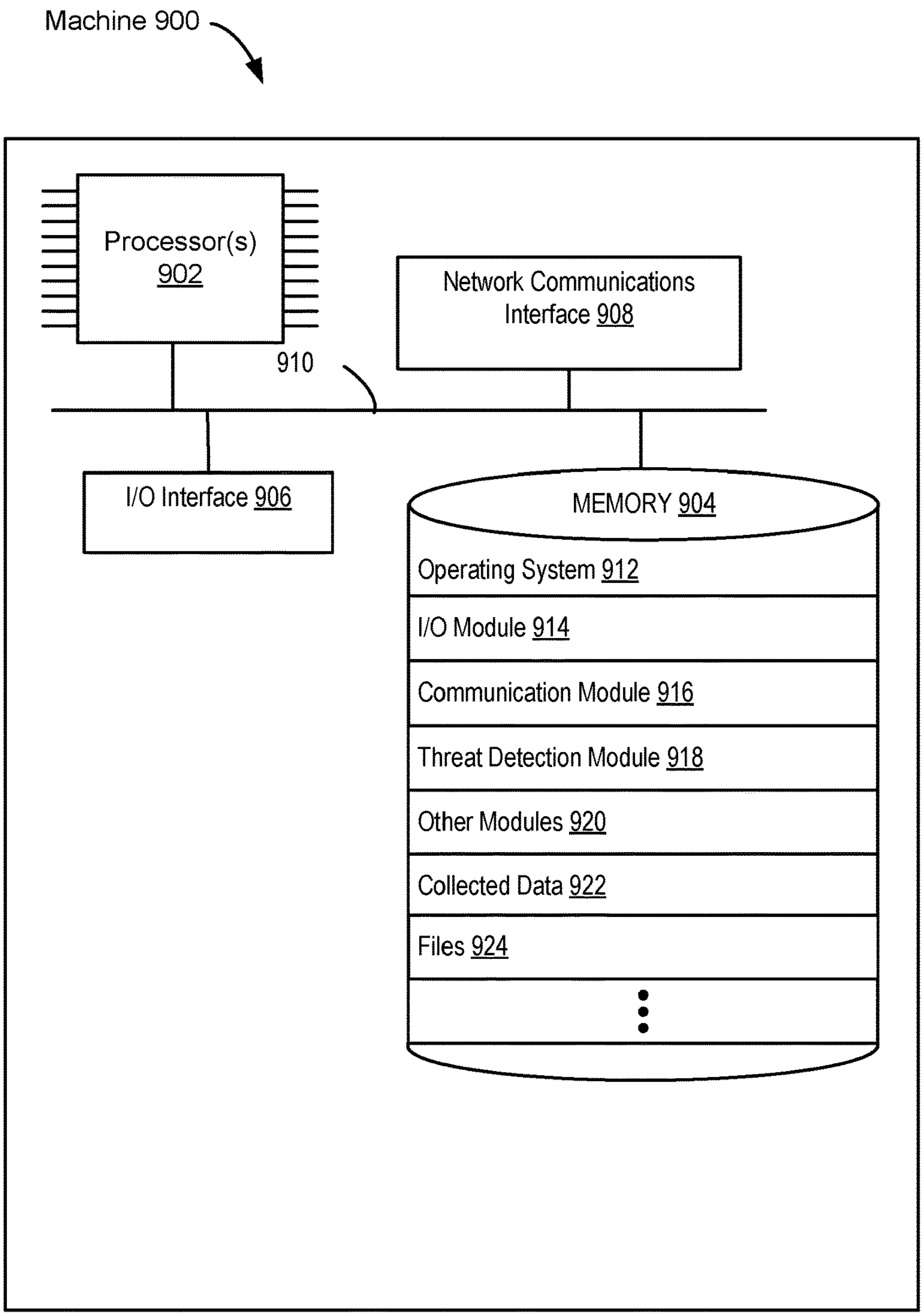
FIG. 9 is a block diagram of a system (e.g., a remote investigating server) in accordance with some embodiments.

FIG. 9 is a block diagram of an exemplary machine 900 (e.g., serving as a remote investigating server 110 shown in FIG. 1B). In some implementations, machine 900 includes one or more processors 902, memory 904 for storing programs and instructions for execution by one or more processors 902, one or more communications interfaces such as input/output interface 906 and network interface 908, and one or more communications buses 910 for interconnecting these components.

In some embodiments, input/output interface 906 includes a display and input devices such as a keyboard, a mouse or a track-pad. In some embodiments, communication buses 910 include circuitry (sometimes called a chipset) that interconnects and controls communications between system components. In some embodiments, memory 904 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. In some embodiments, memory 904 includes one or more storage devices remotely located from the one or more processors 902. In some embodiments, memory 904, or alternatively the non-volatile memory device(s) within memory 904, comprises a non-transitory computer readable storage medium.

In some embodiments, memory 904 or alternatively the non-transitory computer readable storage medium of memory 904 stores the following programs, modules and data structures, instructions, or a subset thereof:

- Operating System 912 that includes procedures for handling various basic system services and for performing hardware dependent tasks.
- I/O module 914 that includes procedures for handling various basic input and output functions through one or more input and output devices.
- Communication module 916 that is used for connecting machine 900 to other machines (e.g., machines 102 in network 100, an administrator's device 116) or servers (e.g., server 108) via one or more network communication interfaces 908 (wired or wireless) and one or more communication networks, such as the Internet, other wide area networks, local area networks, metropolitan area networks, and so on.
- Threat detection module 918 that includes instructions to generate an instruction packet for a node to initiate an outbound connection to the machine 900, sending the instruction packet to the node through the linear communication orbit, establish a direct full duplex connection at the request of the node, communicate with the node through the direct full duplex connection, performing investigation (e.g., sandbox investigation) on data collected from the node through the direct connection, issue network-wide queries through a server of the network, determining security status of the network based on data collected from the network through the linear communication orbit, generate queries and IOCs to send into the network, etc.
- Other modules 920 that include instructions for handling other functions and aspects described herein, such as providing an administrator interface for monitoring the network.
- Collected data 922 that optionally include raw and/or processed data collected from the network, including for example, local values for event histories, event artifacts, and/or an index of indicator item evaluation results, etc. collected from the network.
- Files 924, optionally including files having executable programs, image files containing images, and/or data files containing data of various types.

FIG. 9 is merely illustrative of the structures of machines 900. A person skilled in the art would recognize that particular embodiments of machines 900 may include more or fewer components than those shown. One or more modules may be divided into sub-modules, and/or one or more functions may be provided by different modules than those shown.

Figure 10:
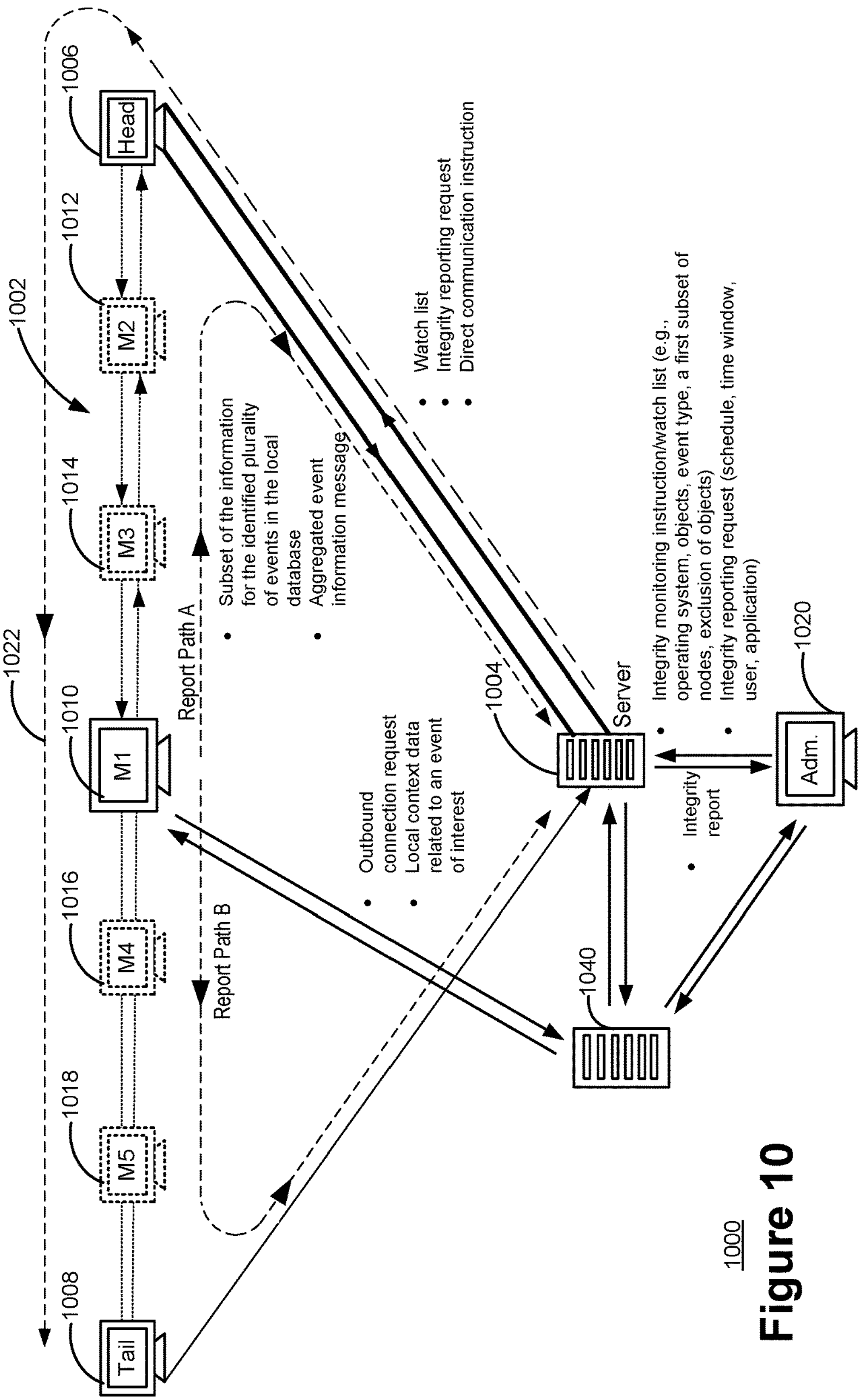
FIG. 10 illustrates an example integrity monitoring system that monitors integrity at a network including a plurality of machines located at a non-static collection of nodes that form a linear communication orbit in accordance with some embodiments.

FIG. 10 illustrates an example integrity monitoring system 1000 that monitors integrity at a network including a plurality of machines located at a non-static collection of nodes that form a linear communication orbit 1002 in accordance with some embodiments. Each machine of the plurality of machines has a respective machine identifier, and the plurality of machines have self-organized into an ordered sequence in accordance with a predefined order of the respective machine identifiers of the plurality of machines. In integrity monitoring system 1000, a remote server 1004 is coupled to linear communication orbit 1002 at a head node 1006. In addition to head node 1006, linear communication orbit 1002 further includes a tail node 1008 and a plurality of intermediate machines (e.g., machines M1-M5) 1010-1018 which are coupled between head node 1006 and tail node 1008. While intermediate machines 1010-1018 illustrate the configuration of linear communication orbit 1002, in some embodiments, linear communication orbit 1002 includes only one intermediate machine, while in other embodiments, it includes dozens, hundreds or even thousands of intermediate machines.

Remote server 1004 obtains a watch list that identifies one or more objects (e.g., one or more files and directories) for which events are to be monitored, and deploys the watch list through linear communication orbit 1002 to two or more machines (e.g., one of which is computational machine (M1)

1010) of the plurality of machines located at a first subset of nodes in linear communication orbit 1002. Specifically, the watch list is provided to head node 1006 by remote server 1004, and propagates from node to node along a command path 1022 following linear communication orbit 1002 until reaching a respective node corresponding to each of the two or more machines. Each of the two or more machines is then configured to perform a set of integrity monitoring operations locally according to the watch list. The computational machine at the respective node optionally continues to pass the watch list to other downstream machines (e.g., computational machines 1008, 1016 and 1018) on the linear communication orbit 1002, or alternatively forgoes passing the watch list along the linear communication orbit 1002. For example, in some embodiments, if a computational machine at the respective node (e.g., computational machine (M1) 1010) determines that it is the last one of the two or more machines that need to receive the watch list, that computational machine forgoes passing the watch list along the linear communication orbit 1002.

In some embodiments, a respective object identified by the watch list is a file or a directory. In some embodiments, the one or more objects are selected from a first watch list template including a first predefined list of files and directories associated with a target operating system (e.g., Microsoft Windows, iOS and macOS by Apple Inc., Linux, and Android by Google). Alternatively, in some embodiments, the one or more objects are selected from a second watch list template including a second predefined list of files and directories that need to be monitored to satisfy a standard security requirement (e.g., PCI DSS). Further, in some embodiments, the one or more objects are selected from a third watch list template including a third predefined list of files and directories associated with a specific client application executed at the respective node. In some circumstances, in addition to objects selected from any predefined list of files and directories, the one or more objects further includes one or more individual files/directories that do not belong to the respective watch list template.

In some embodiments, the watch list defines one or more event types to be monitored locally at the respective node for each of the one or more objects identified in the watch list. For each of the one or more objects, the one or more event types include at least one of creation, deletion, modification, renaming, and changing access permissions of the respective object. Optionally, the one or more objects of the watch list are associated with identical or distinct event types to be monitored locally at the respective node. Further, in some embodiments, event types to be monitored for a specific object in the watch list are identical at different nodes of linear communication orbit 1002, and in some other embodiments, the event types to be monitored for the specific object in the watch list are distinct from each other at different nodes of linear communication orbit 1002.

In some embodiments, the watch list excludes a file, a directory path, or a directory path type from the one or more objects for which events are to be monitored. In an example, the watch list is defined to exclude a particular directory (e.g., the /bin directory) from the one or more objects for which events are to be monitored. Further, in some embodiments, the watch list excludes a type of event for a specific file or directory in the watch list. For example, in accordance with an example watch list, access permission change of the bin directory does not need to be monitored at the respective node, while creation, deletion, modification and renaming of any file in the bin directory need to be monitored.

In some embodiments, the remote server 1004 is coupled to an administrator machine 1020. The remote server 1004 receives from the administrator machine an integrity monitoring instruction to deploy the watch list to a first subset of nodes in linear communication orbit 1002. The integrity monitor instruction includes the watch list and identifiers of the first subset of nodes including the respective node. In some embodiments, each of the first subset of nodes is selected individually by a user on the administrator machine 1020. In some embodiments, the first subset of nodes are selected on the administrator machine 1020 based on node selection criteria (e.g., whether the respective node executes a target operating system, or whether the respective node must comply with a standard security requirement). For example, a user can select all nodes of linear communication 1002 that run a specific operating system as the first subset of nodes. The user may optionally add or exclude a subset of the nodes running the specific operating system from the first subset of nodes. In addition, when the specific operating system is associated with a watch list template including a predefined list of files and directories, the user can further select the one or more objects from the watch list template to be monitored at the first subset of nodes in the linear communication orbit.

The user can also define one or more event types to be monitored locally at the respective node for each of the one or more objects identified in the watch list. Also, the user can enter a user input on the administrator machine 1020 to exclude a directory path or directory path type from the one or more objects in the watch list, or exclude an event type from the one or more event types to be monitored locally for each of the one or more objects. In some embodiments, the user defines the same watch list for use by each of the first subset of nodes in integrity monitoring, while in some embodiments, the user customizes the one or more objects and corresponding event types in the watch list for a specific node of the first subset of nodes.

Optionally, administrator machine 1020 is coupled to server 1004, but does not belong to linear communication orbit 1002 on which the watch list is deployed. Optionally, administrator machine 1020 is integrated within server 1004. Optionally, administrator machine 1020 is coupled on linear communication orbit 1002 and configured to function as an administrator to control deployment of the watch list and collect local event information from linear communication orbit 1002.

Each computational machine (e.g., computational machine (M1) 1010) at a respective node of linear communication orbit 1002 identifies a plurality of events that occur locally at the respective node in real-time while the plurality of events are occurring, and the plurality of events include events for the one or more objects identified by the watch list received at the respective node. After the plurality of events are identified, the computational machine (e.g., computational machine (M1) 1010) stores event information for the identified plurality of events in a local database. Thus, event information for the events for the one or more objects identified by the watch list is stored locally in the local database of the respective node.

In some embodiments, the computational machine (e.g., computational machine (M1) 1010) creates a plurality of integrity warning tags to identify a subset of the events for the one or more objects identified by the received watch list. Each integrity warning tag indicates that a corresponding event has been identified for an object identified by the watch list. Each of the plurality of integrity warning tags is stored in the local database in association with the corresponding event, which is one of the subset of events for the one or more objects identified by the watch list, allowing the respective computational machine to efficiently identify the corresponding event during a subsequent event reporting process. The above-described event identification and storing operations, and optionally the tagging operations, are performed at each of the nodes (e.g., at each of the first subset of nodes) to which the watch list has been deployed, while the events for the one or more objects identified by the watch list are occurring locally at those nodes.

While event identification, storing and tagging operations are being performed at each node in the first subset of nodes in linear communication orbit 1002, remote server 1004 deploys an integrity reporting request to the respective node in linear communication orbit 1002 (e.g., along command path 1022 following linear communication orbit 1002). The integrity reporting request propagates from node to node along linear communication orbit 1002 until it reaches the respective node (e.g., computational machine (M1) 1010). Specifically, in an example, the integrity reporting request is provided to head node 1006 by remote server 1004, and passes computational machines 1012 and 1004 until reaching computational machine (M1) 1010. In some situations, computational machine (M1) 1010 continues to pass the integrity reporting request to one or more other downstream machines (e.g., computational machines 1016, 1018 and 1008) on the linear communication orbit 1002. However, in some situations, in accordance with a determination that it is the last one of two or more machines that need to report event information related to the one or more objects in the watch list, computational machine (M1) 1010 forgoes passing the watch list along the linear communication orbit 1002.

In some embodiments, remote server 1004 periodically deploys the integrity reporting request to linear communication orbit according to a predetermined schedule (e.g., a regular interval of every 30 minutes, or at a set of predefined times in each day, week or month). Alternatively, or in addition, in some embodiments, remote server 1004 deploys the integrity reporting request to linear communication orbit 1002 upon receiving a user request entered from administrator machine 1020.

After receiving the integrity reporting request through linear communication orbit 1002, the computational machine (e.g., M1 1010) at the respective node of linear communication orbit 1002 identifies a subset of the event information for the identified plurality of events in the local database and returns the identified subset of the event information to remote server 1004 through linear communication orbit 1002. For example, computational machine (M1) 1010 receives the integrity reporting request from remote server 1004 via head node 1006, and sends the identified subset of the event information to remote server 1004 along a report path A or a report path B. Report path A extends to remote server 1004 via head node 1006 and has a direction that is opposite to the direction of command path 1022 along which the integrity reporting request is passed along linear communication orbit 1002. Report path B extends to remote server 1004 via tail node 1008 and has a direction that is the same as the direction of command path 1022. In some embodiments, when the identified subset of the event information generated by computational machine (M1) 1010 passes an intermediate machine (e.g., computational machine (M2) 1012) on report path A or B, the local subset of the event information generated by the intermediate machine is combined with the subset of the event information generated by a computational machine located upstream on the corresponding report path to produce an aggregated event information message (also called a response message). The aggregated event information message is then sent to remote server 1004 along the same report path. Further, in some embodiments, after receiving event information from the first subset of nodes to which the watch list has been deployed, remote server 1004 generates an integrity report based on the received event information, which is event information corresponding to the one or more objects identified in the watch list for the first subset of nodes, and provides the integrity report to a user.

It is noted that a computational machine in linear communication orbit 1002 optionally returns event information corresponding to the one or more objects identified by the watch list independently of other computational machines on linear communication orbit 1002, or alternatively, returns event information corresponding to the one or more objects identified by the watch list with the event information of the other computational machine in an aggregated manner.

The subset of the event information collected from the respective node of linear communication orbit 1002 corresponds to event information for at least some of the one or more objects identified by the watch list deployed to the first subset of nodes. In some implementations, the integrity reporting request includes an integrity reporting criterion, and the subset of the event information for the identified plurality of events corresponds to event information in the local database that satisfies the integrity reporting criterion. Stated another way, the integrity reporting criterion defines one or more filtering criteria to identify the subset of the event information corresponding to the at least some of the one or more objects identified by the watch list. In some implementations, the integrity reporting request defines a time window within which one or more events of interest corresponding to the subset of the event information occurred. In accordance with such an integrity reporting criterion, the computational machine at the respective node reports event information in the local database for at least some events that occurred within the time window for the one or more objects identified by the watch list. In some implementations, the integrity reporting request defines one or more unauthorized users who initiate one or more events of interest corresponding to the subset of the event information. In accordance with such an integrity reporting criterion, the computational machine at the respective node reports event information in the local database for at least some events that are initiated by the one or more unauthorized users identified in the integrity reporting criterion. In some implementations, the integrity reporting request defines a list of unauthorized applications that are not permitted to make changes to the one or more objects identified by the watch list. In accordance with such an integrity reporting criterion, the computational machine at the respective node reports event information in the local database for at least some events that are performed by any of the listed unauthorized applications.

Alternatively, in some implementations, the integrity reporting request defines one or more authorized users who are permitted to initiate one or more events of interest corresponding to the subset of the event information. In accordance with such an integrity reporting criterion, the computational machine at the respective node reports event information for events initiated by any person other than the one or more authorized users for the one or more objects identified by the watch list. In some implementations, the integrity reporting request defines a list of authorized applications that are permitted to make changes to the one or more objects identified by the watch list. In accordance with such an integrity reporting criterion, the computational machine at the respective node reports event information for events performed by any application other than the one or more authorized applications on the one or more objects identified by the received watch list. It is noted that in some embodiments, the integrity reporting criterion can include two or more filtering criteria of the time window, such as the one or more authorized/unauthorized users, the list of authorized/unauthorized applications, and the like, if the two or more filtering criteria are compatible with each other.

In some embodiments, remote server 1004 identifies one or more events of interest by filtering the subset of the event information for the identified plurality of events according to an integrity monitoring criterion, after it receives the subset of the event information for the identified plurality of events from the respective node of linear communication orbit 1002. In some embodiments, the integrity monitoring criterion identifies a second subset of nodes for which remote server 1004 identifies event information for at least some of the one or more objects identified by the received watch list. The second subset of nodes are distinct from, and belong to the first subset of nodes on which events for the one or more objects are monitored according to the watch list. Stated another away, remote server 1004 further selects the second subset of nodes from the first subset of nodes to monitor the event information related to the objects in the watch list. In some embodiments, the integrity monitoring criterion defines at least one of a time window within which the one or more events of interest corresponding to the subset of the event information occurred, one or more unauthorized users who initiate the one or more events of interest corresponding to the subset of the event information, one or more authorized users who are permitted to initiate one or more events of interest corresponding to the subset of the event information, a list of authorized applications that are permitted to make changes to the one or more objects identified by the watch list, and a list of unauthorized applications that are not permitted to make changes to the one or more objects identified by the watch list.

It is noted that in some embodiments, the subset of the event information for the identified plurality of events is filtered at both the respective node and remote server 1004 according to an integrity reporting criterion and an integrity monitoring criterion, respectively. By these means, integrity monitoring system 1000 can accurately identify events of interest for investigation or for reporting to administrator machine 1020.

As explained above, in some embodiments, a plurality of integrity warning tags are stored in the local database of the respective node in association with a subset of the events for the one or more objects identified by the watch list. In some circumstances, the integrity reporting request received from remote server 1004 includes a command to return to the server system event information for any event that is stored in the local database with an integrity warning tag. In response to the integrity reporting request, the computational machine at the respective node identifies in the database the subset of the events for the one or more objects identified by the watch list, which are events stored in the database with integrity warning tags. Event information for the identified subset of the events, for the one or more objects identified by the received watch list, is identified and returned to remote server 1004.

Conversely, in some embodiments, remote server 1004 receives the subset of the event information for the identified plurality of events, including the event information for the identified subset of the events for the one or more objects identified by the received watch list. Remote server 1004 then labels respective events in the events for the one or more objects identified by the watch list with predefined labels that correspond to predefined event evaluations. Example predefined event evaluations include: important, suspicious, expected, ignored and planned. In an example, any access permission change to a file in the bin directory (e.g., /bin) is labelled as "suspicious." Further, in some implementations, the predefined labels are applied to the respective events by a user when the user reviews the identified subset of the events for the one or more objects identified by the watch list on administrator machine 1020. Alternatively, in some implementations, remote server 1004 automatically labels the respective events in the events for the one or more objects identified by the watch list according to predetermined event evaluation rules corresponding to the predefined event evaluations.

In some embodiments, remote server 1004 initiates subsequent operations on the respective events in the events for the one or more objects identified by the watch list according to their corresponding event labels. In an example, remote server 1004 is required to report any event labelled as "suspicious" or "important" to administrator machine 1020. In another example, remote server 1004 is required to report any event labelled as "important" to an investigation server 1040 for further analysis.

In some cases, the subset of the event information for the identified plurality of events received from a particular computational machine indicates that an event of interest has occurred at the particular computational machine. Investigation server 1040 works in conjunction with remote server 1004 to initiate a deep dive into local context data at the particular node (e.g., by performing forensic analysis). Specifically, investigation server 1040 sends a direct communication instruction via linear communication orbit 1002 for establishing a direct duplex connection between the respective node and investigation server 1040. More specifically, investigation server 1040 sends the direct communication instruction to remote server 1004, which continues to pass the direct communication instruction to head node 1006 and other computational machines on linear communication orbit 1002 along command path 1022. In response to receiving the direct communication instruction, computational machine (M1) 1010 (in which the event of interest has occurred) sends an outbound connection request to investigation server 1040 via remote server 1004 to establish a direct duplex connection between the respective node and investigation server 1040. Once the direct duplex connection is established between the respective node and investigation server 1040, computational machine (M1) 1010 uploads its local context data related to the event of interest to investigation server 1040 through the direct duplex connection. Investigation server 1040 then performs analysis on the local context data received from computational machine (M1) 1010 through the direct duplex connection to investigate integrity of a respective object corresponding to the event of interest that has occurred at computational machine (M1) 1010.

It is noted that in some embodiments, remote server 1004 and investigation server 1040 are distinct from each other, but belong to a server system. Alternatively, in some embodiments, integrity monitoring system 1000 includes a single server machine that functions as both remote server 1004 and investigation sever 1040. The servers are optionally separated from the network (e.g., separated from the respective node) by a firewall, and no opening of the firewall is required for establishing the direct duplex connection. In some embodiments, the direct duplex connection is a secure websocket connection.

Figure 11:
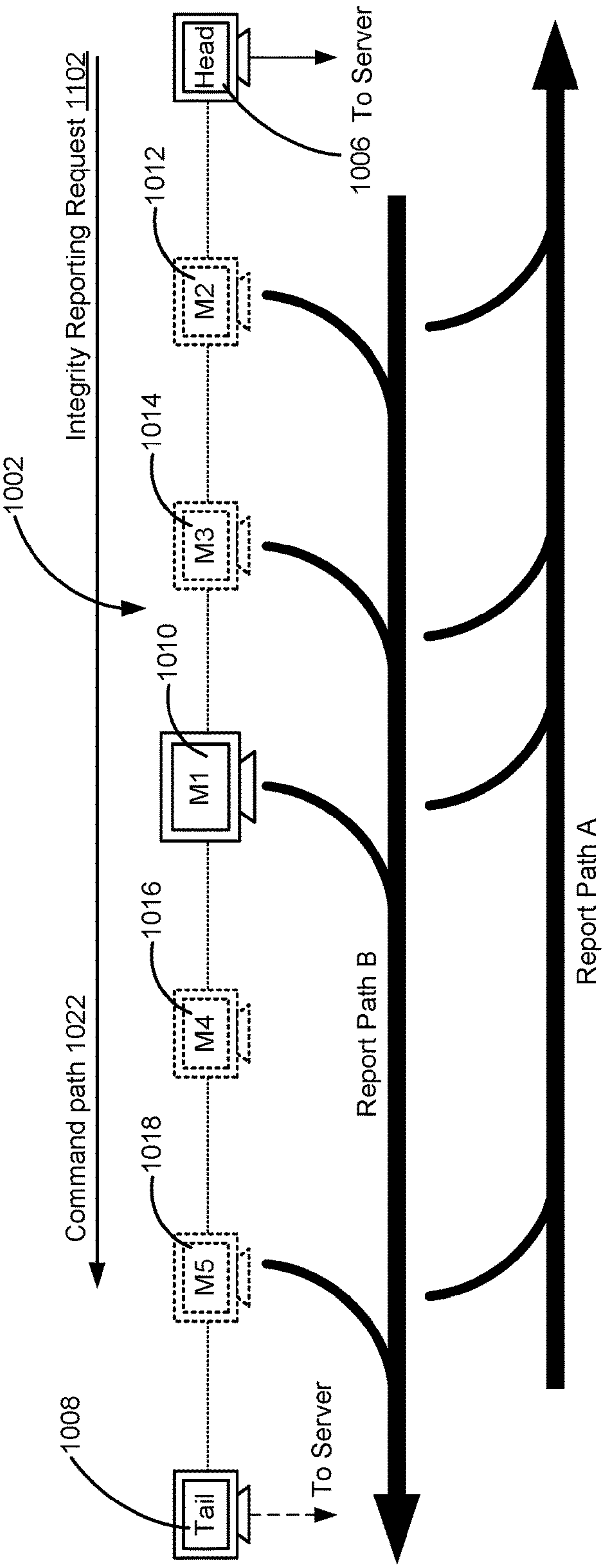
FIG. 11 illustrates an example process of returning event information for objects identified by a watch list in response to an integrity reporting request on a linear communication orbit in accordance with some embodiments.

FIG. 11 illustrates an example process 1100 of returning event information for objects identified by a watch list in response to an integrity reporting request 1102 on a linear communication orbit in accordance with some embodiments. Remote server 1004 injects the integrity reporting request 1102 into linear communication orbit 1002 to collect from different client nodes event information for at least some of the one or more objects identified by the received watch list. In accordance with an example command path 1022, the integrity reporting request 1102 is initially received at head node 1006 of linear communication orbit 1002, and then passed from node to node along linear communication orbit 1002 until it reaches tail node 1008 of linear communication orbit 1002. A respective node of linear communication orbit 1002 responds to the integrity reporting request by identifying a subset of the event information, corresponding to the at least some of the one or more objects identified by the received watch list, and returning the identified subset of the event information to remote server 1004 through linear communication orbit 1002. If an intermediate machine (e.g., machine (M4) 1016) determines that it does not store any event information locally for the one or more objects identified by the watch list, it merely passes the integrity reporting request 1102 from a first neighboring machine to a second neighboring machine on linear communication orbit 1002 without returning any event information.

In some embodiments, linear communication orbit 1002 includes a report path A that is opposite in direction to command path 1022. In response to receiving the integrity reporting request 1102 to collect event information for the objects in the watch list, a respective node of linear communication orbit 1002 determines whether it stores in its local database event information for at least some of the one or more objects identified by the received watch list. If a specific machine (e.g., machine (M1) 1010) determines that such event information is available in the local database of the respective node, it returns the event information for at least some of the one or more objects identified by the watch list to a neighboring machine (e.g., machine M3) from which the specific machine at the respective node received the integrity reporting request. Optionally, the specific machine delays returning its own event information for the objects in the watch list until aggregated event information comes downstream on report path A and reaches the specific machine. In an example, the aggregated event information received at the respective node (e.g., at computational machine M1) includes event information identified in an upstream machine (e.g., computational machine M5) for at least some of the objects identified in the watch list. The event information identified at the respective node for the objects in the watch list is incorporated into the aggregated event information (e.g., in an aggregated event information message or file), and passed downstream to a neighboring machine on report path A in an aggregated manner. When the aggregated event information reaches head node 1006, the computational machine at head node 1006 reports the aggregated event information to remote server 1004.

Alternatively, in some embodiments, linear communication orbit 1002 includes a report path B that is consistent with (e.g., "travels" in the same direction as) command path 1022. In response to receiving from a first neighboring machine (e.g., machine M3) an integrity reporting request 1102 to collect the event information for the objects in the watch list, a specific machine (e.g., machine M1) determines whether it stores in its local database event information for at least some of the one or more objects identified by the received watch list. If the specific machine determines that it does store such event information, the specific machine then passes its locally stored event information for the objects in the watch list to a second neighboring machine (e.g., machine M4) to which the specific machine at the respective node passes integrity reporting request 1102. Optionally, the specific machine delays passing its own event information for the objects in the watch list until aggregated event information for one or more other machines comes downstream along report path B and reaches the specific machine. In an example, the aggregated event information received at the respective node (e.g., at machine M1) includes event information identified in an upstream machine (e.g., machine M2 or M3) for at least some of the objects identified in the watch list. The event information for the objects in the watch list identified at the respective node (e.g., machine M1) is incorporated into the received aggregated event information (e.g., in an aggregated event information message or file, or in integrity reporting request 1102) and passed downstream to a neighboring machine on report path B in an aggregated manner. When the aggregated event information reaches tail node 1008, the computational machine at tail node 1008 reports the aggregated event information to remote server 1004.

In some embodiments or in some circumstances, when the aggregated event information (e.g., for one or more upstream machines) reaches the respective node of linear communication orbit 1002, the event information for the objects in the watch list is not available at the respective node yet. Optionally, the computational machine at the respective node passes the aggregated event information to a next mode in a corresponding report path without adding any event information to the received aggregated event information. However, in some embodiments, the computational machine at the respective node holds the aggregated event information for a predetermined wait time (e.g., up to, but no longer than, the predetermined wait time, such as an amount of time in the range of 100 milliseconds to 1 second), such that the computational machine at the respective node can check whether a new event occurs within the predetermined wait time for the objects identified by the watch list. At the end of the predetermined wait time, if no new event has occurred for the objects identified by the watch list, the computational machine at the respective node passes the aggregated event information received from its neighboring machine to a next node in a corresponding report path. Conversely, if one or more new events have occurred for the objects identified by the watch list within the wait time, the computational machine reports the event information for the new events with the aggregated event information received from its neighboring machine (e.g., by adding the event information for the new events to the received aggregated event information, and passing the resulting aggregated event information to its neighboring machine).

In some embodiments, the integrity reporting request 1102 is directed to collecting event information for the objects identified by the received watch list according to an integrity reporting criterion (e.g., a predefined age or time window) specified by the integrity reporting request 1102. Upon receiving the integrity reporting request 1102, a respective node of linear communication orbit 1002 identifies a subset of the event information stored in the database, comprising event information for the objects identified by the watch list that meet the integrity reporting criterion. If the respective node identifies any such events, it reports those events to remote server 1004 through linear communication orbit 1002. However, if the respective node determines that none of the stored event information for the objects identified by the watch list meets the integrity reporting criterion, it either does not report any stored event information for the objects identified by the received watch list to remote server 1004, or alternatively it reports a subset of the stored event information (e.g., the most recent event information for the objects identified by the received watch list) to remote server 1004 through linear communication orbit 1002.

In an example, the integrity reporting criterion defines that the local event information to be reported is local event information generated within 20 minutes prior to receiving the integrity reporting request. In another example, the integrity reporting criterion defines that the local event information to be reported, for the objects identified by the received watch list, is local event information generated within 24 hours prior to receiving the integrity reporting request, or alternatively local event information generated at or after a specified date and time (e.g., at or after Jan. 1, 2017, 00:00:01 AM). Event information for the objects identified by the received watch list that fall within the time window specified by the integrity reporting request are returned to remote server 1004.

In some embodiments, integrity reporting request 1102 is sent repeatedly from remote server 1004 to the nodes in a linear communication orbit (e.g., linear communication orbit 1002) according to a specified or predetermined schedule. In some embodiments, the repeated sending of integrity reporting request 1102 by remote server 1004 stops once all nodes in a target set of nodes (e.g., the first subset of nodes) have reported their local event information for the objects identified by the watch list. In some embodiments, the specified or predetermined schedule includes one or more of: a duration of regular reporting (e.g., Jan. 1-20, 2018), a reporting frequency (e.g., once per hour, or once every 24 hours), and one or more specific reporting times (e.g., 12 PM, 2 AM).

In some other embodiments, the integrity reporting request is directed to collecting local event information for the objects identified by the watch list according to a predetermined reporting schedule. The integrity reporting request defines the reporting schedule as one or more of: a duration of regular reporting (e.g., Jan. 1-20, 2018), a reporting frequency (e.g., once per hour, or once every 24 hours), and one or more specific reporting times (e.g., 12 PM, 2 AM). Upon receiving the integrity reporting request once, a respective node of linear communication orbit 1002 automatically sends its recent local event information to remote server 1004 through linear communication orbit 1002 according to the predetermined reporting schedule. In some embodiments, the reporting schedule defines a termination date/time for such a regular reporting scheme. In some embodiments, another reporting control message is sent to linear communication orbit 1002 to abort the regular reporting scheme.

Figure 12:
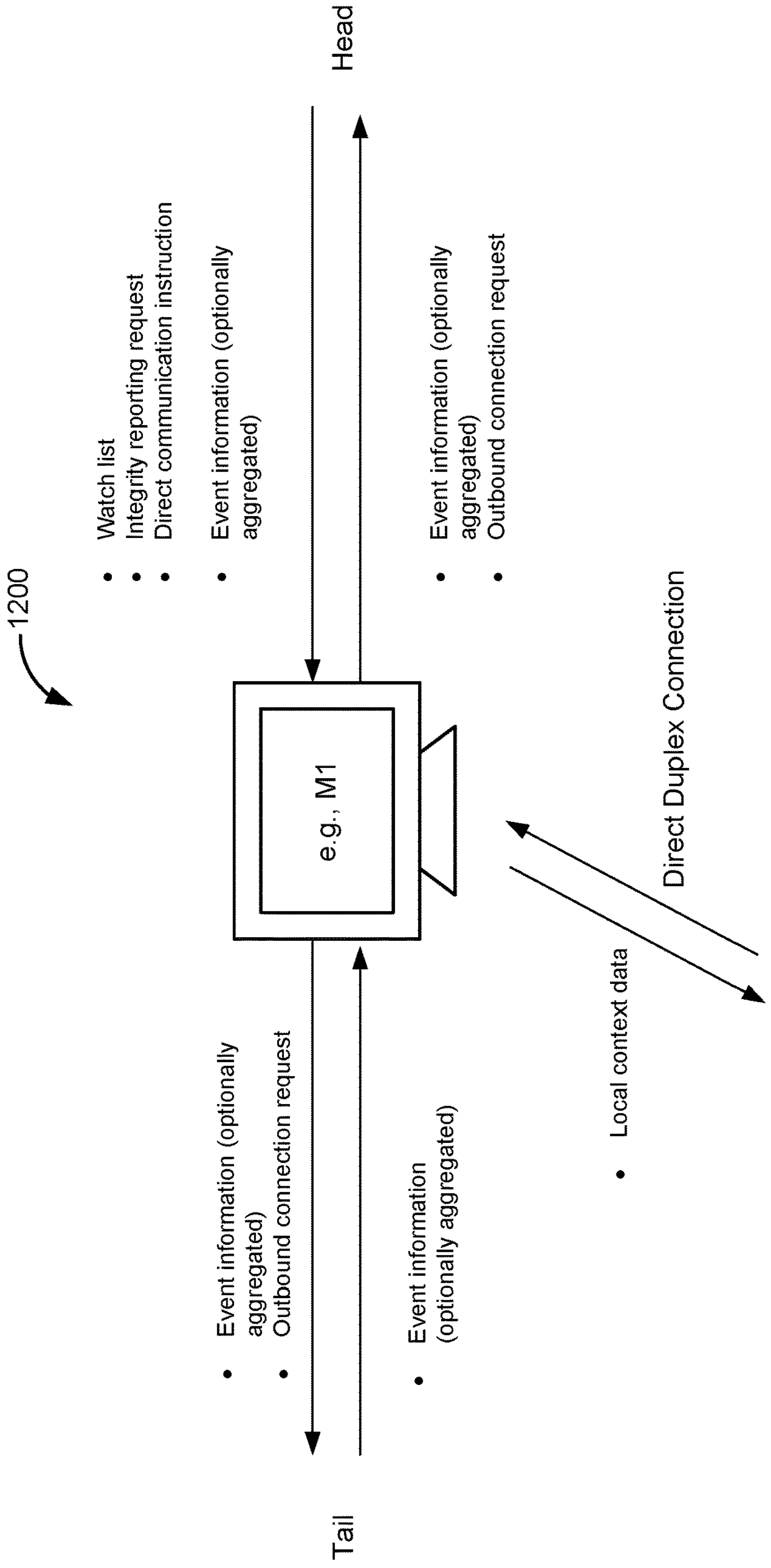
FIG. 12 illustrates an example computational machine that monitors file integrity and responds to an integrity reporting request in accordance with some embodiments.
Figure 13A:
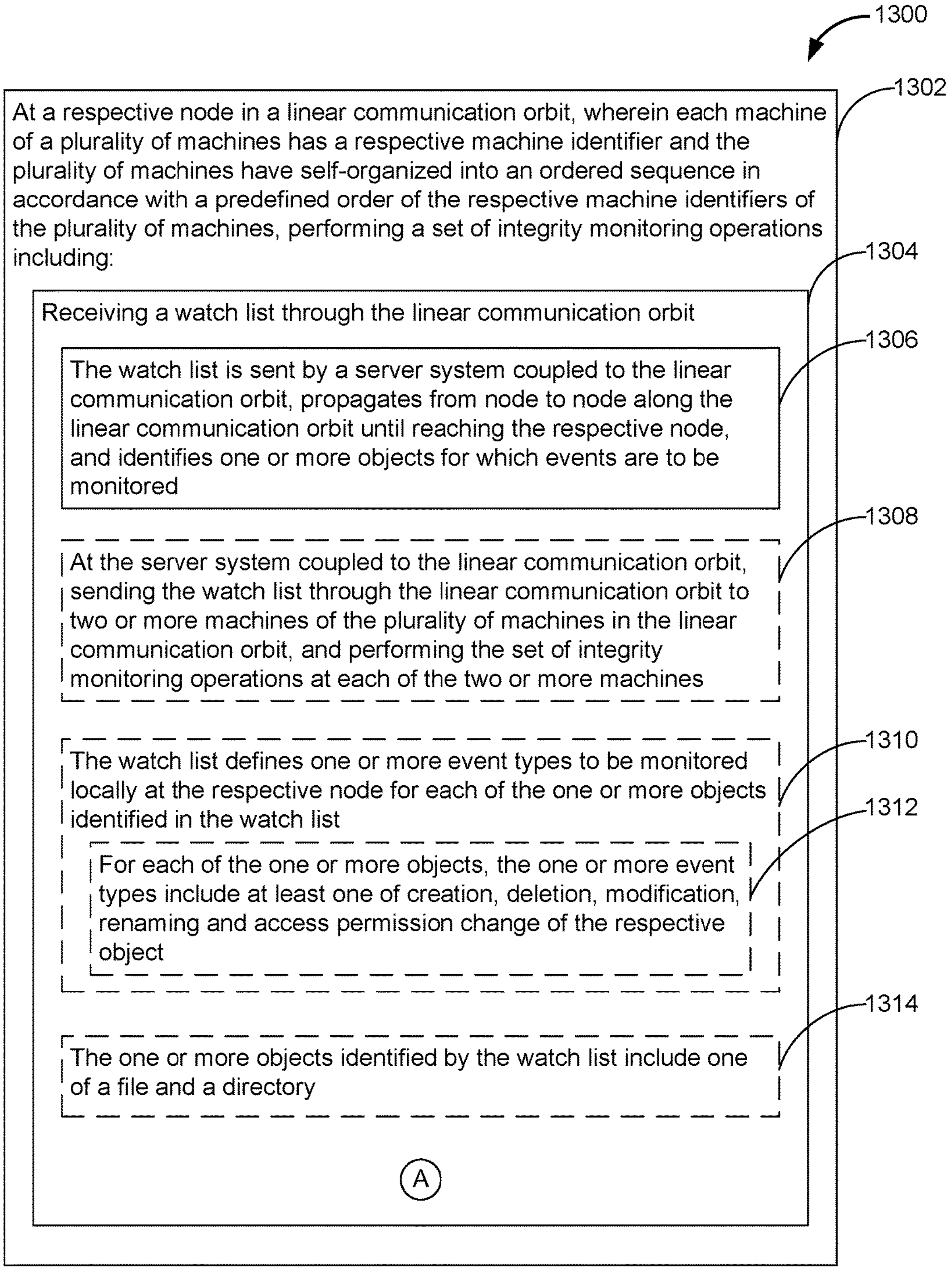
FIGS. 13A-13F include a flow diagram representing a method implemented by a computational machine for monitoring integrity of a computer network in accordance with some embodiments.
Figure 13B:
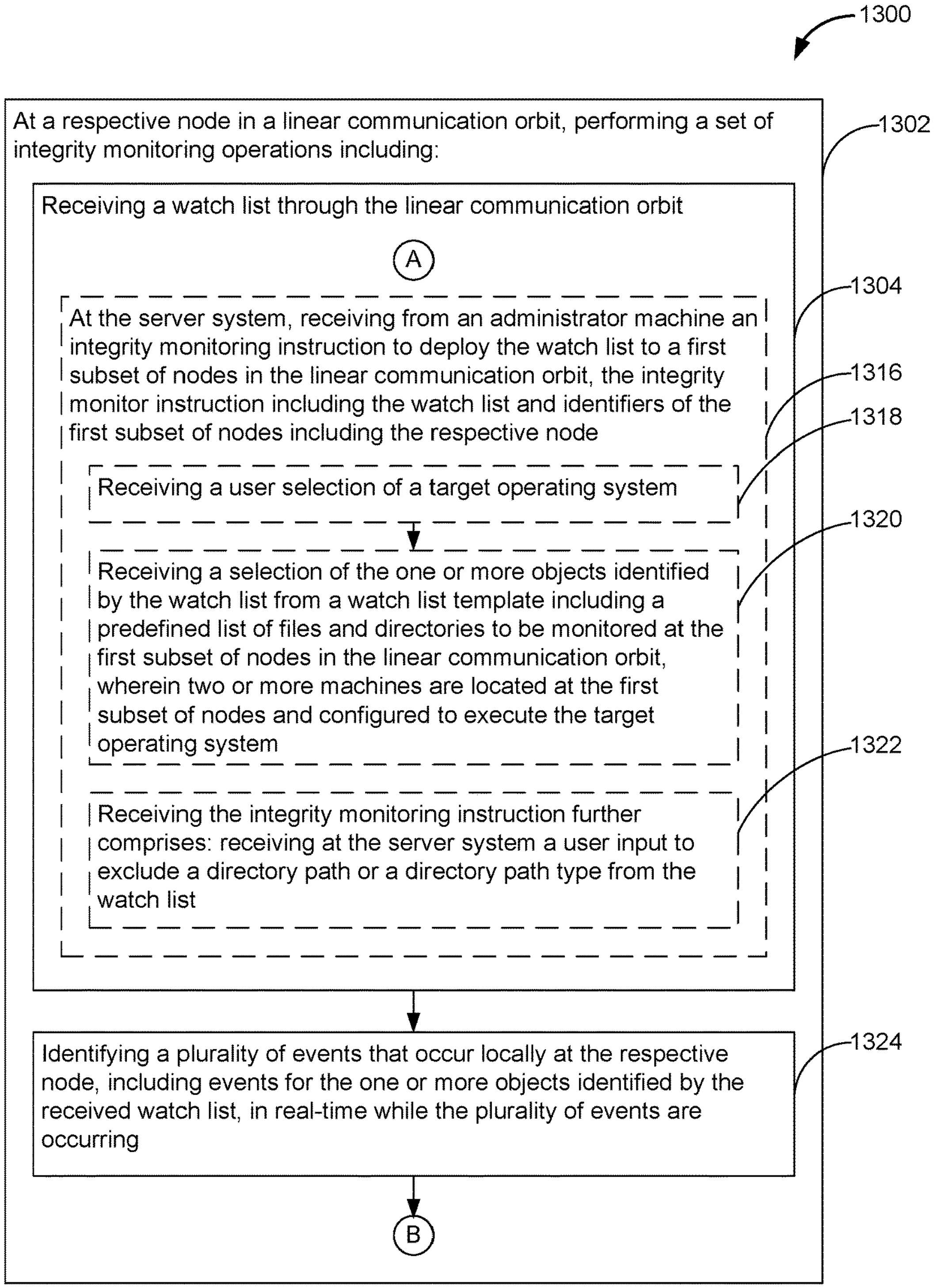
Figure 13C:
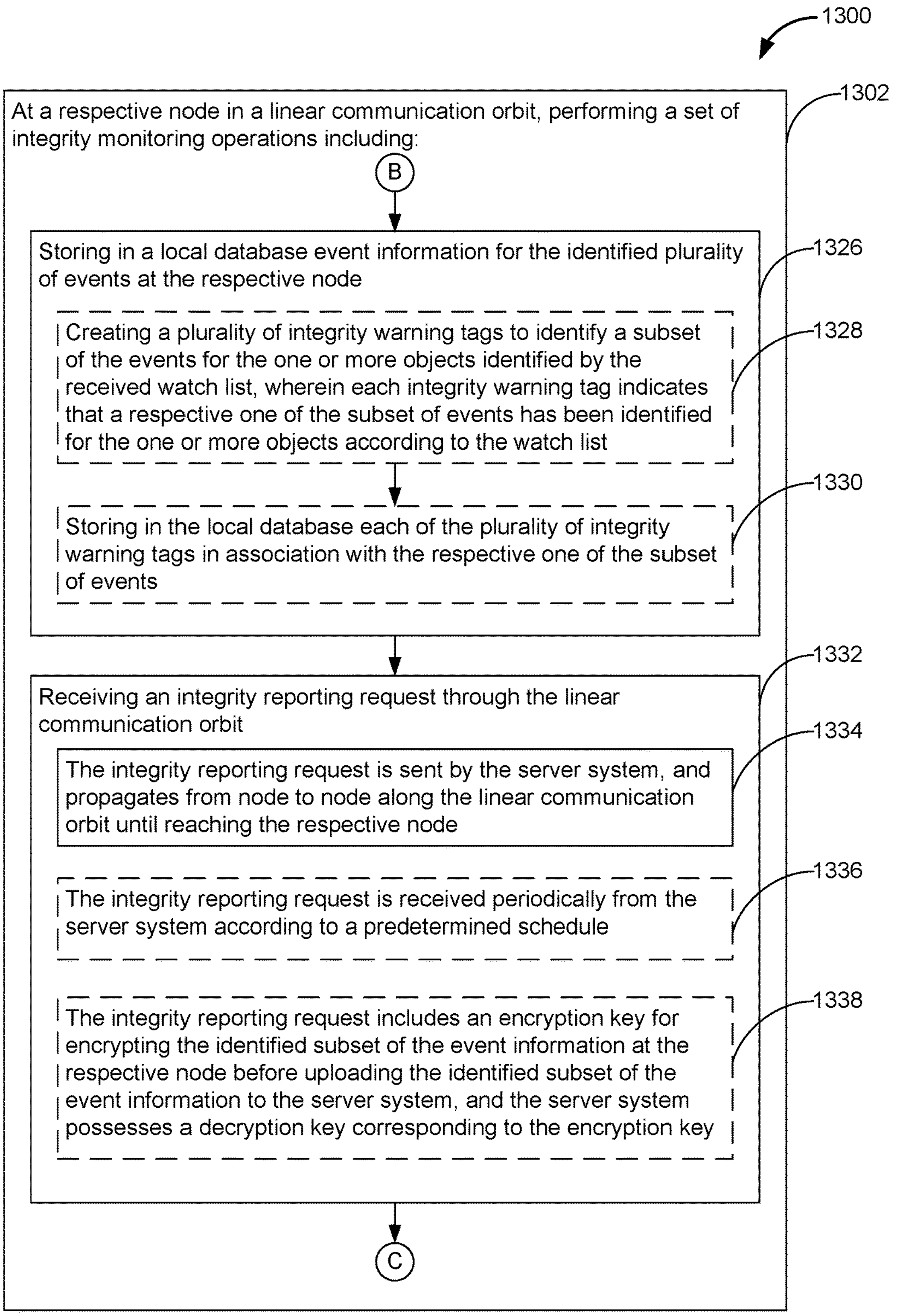
Figure 13D:
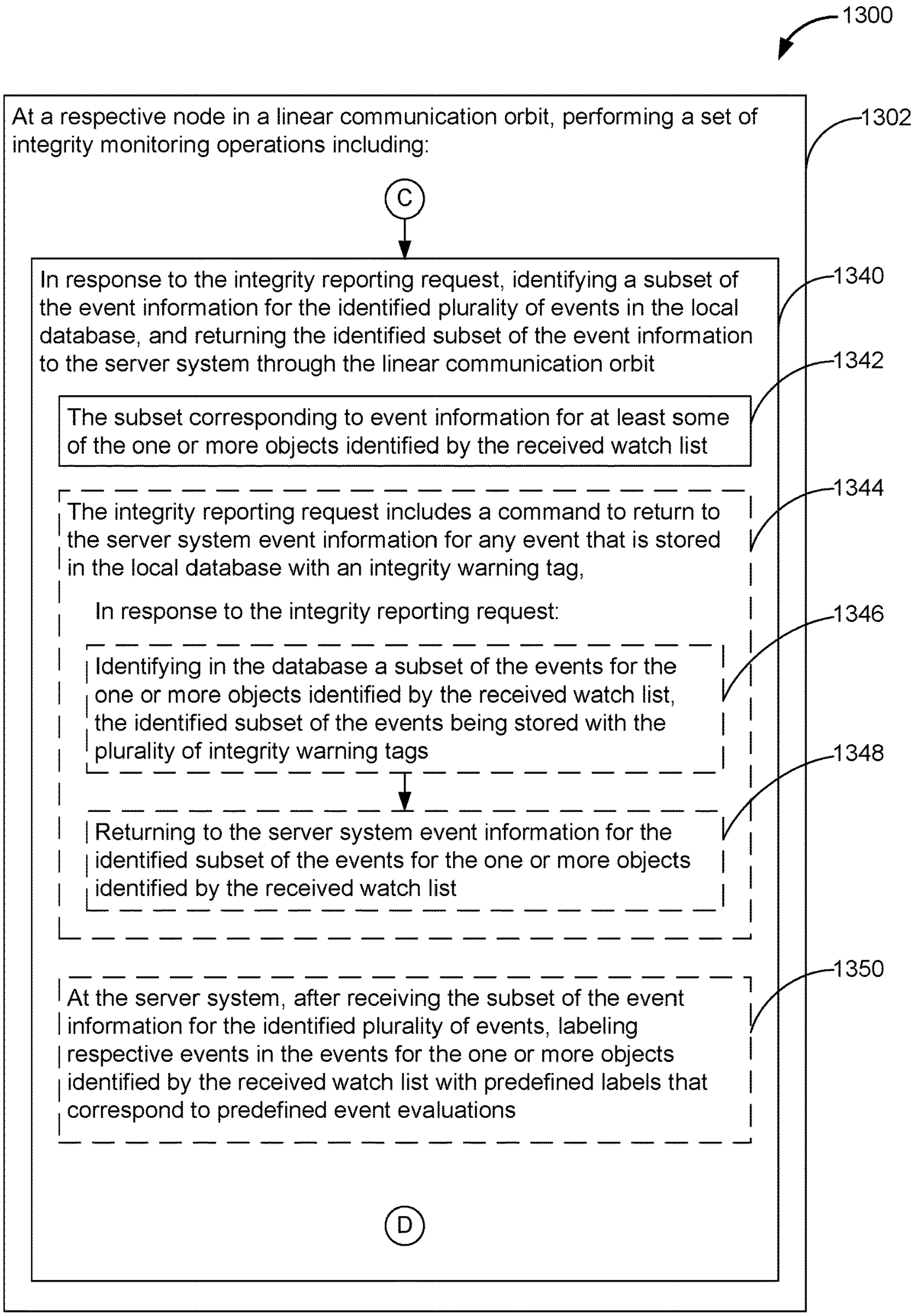
Figure 13E:
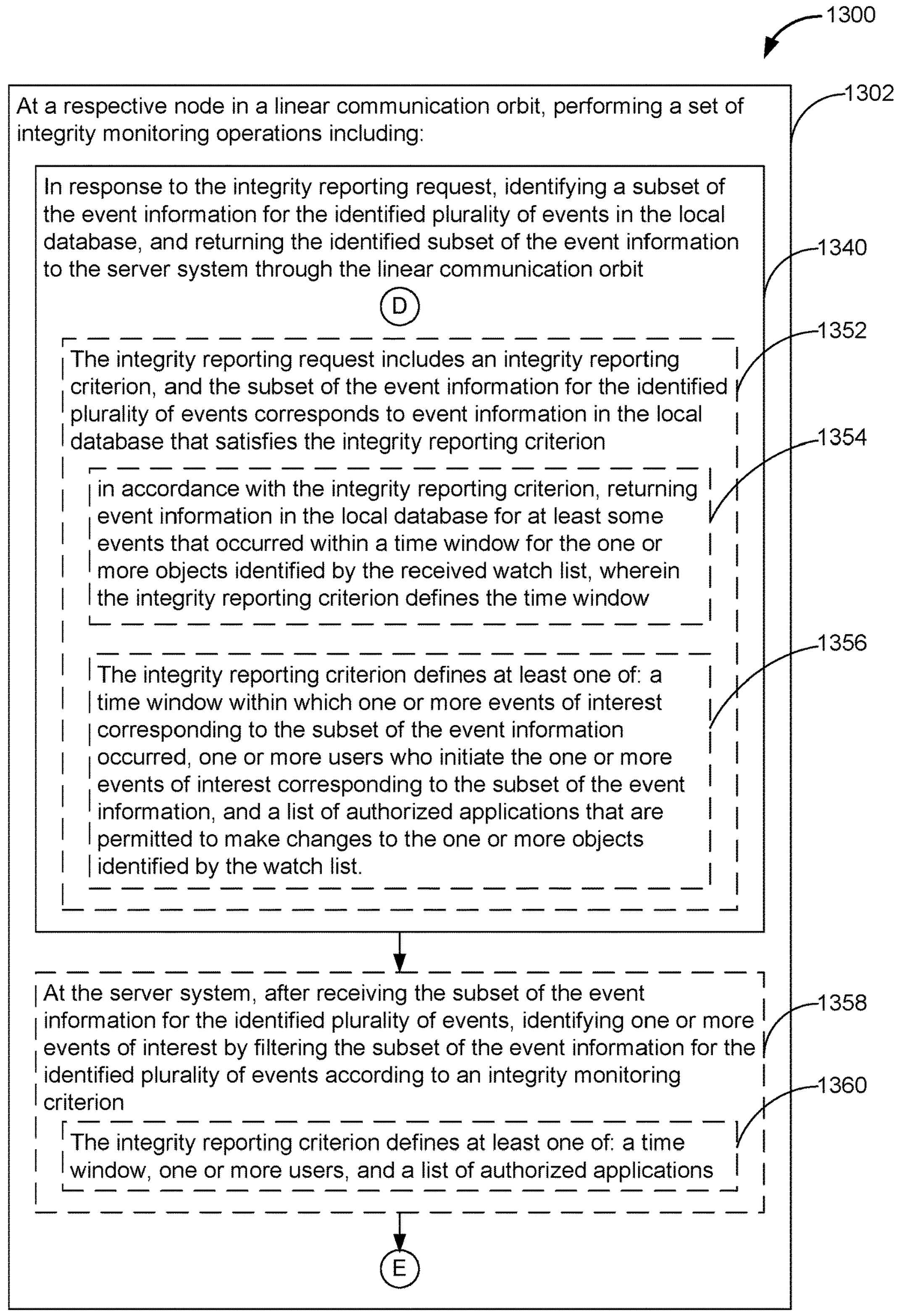
Figure 13F:
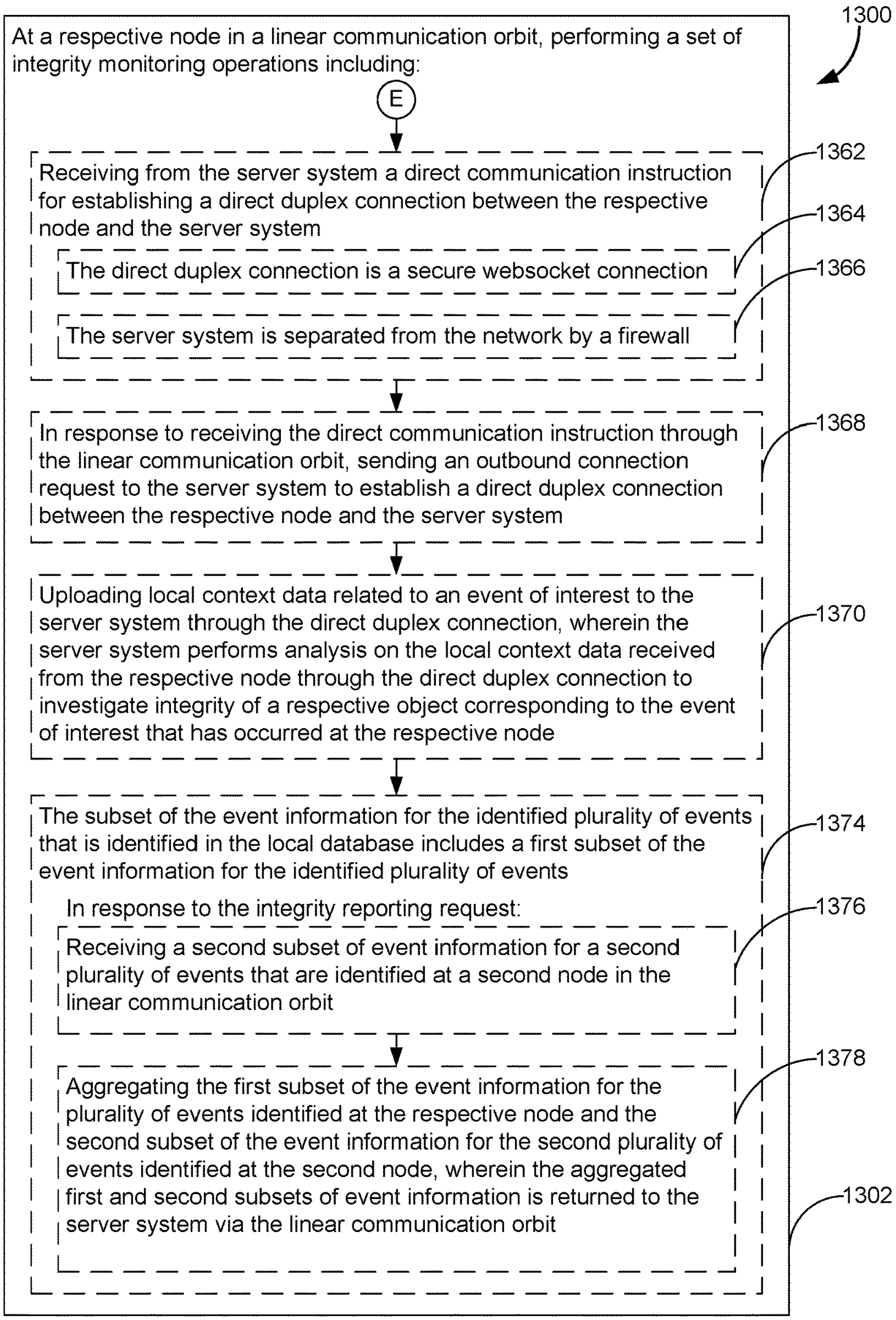

FIG. 12 illustrates an example computational machine 1200 that monitors file integrity and responds to an integrity reporting request in accordance with some embodiments. Computational machine 1200 is located at a client node of a computer network, and is identified therein by a unique machine identifier. In the computer network, a plurality of machines including computational machine 1200 self-organize into an ordered sequence (i.e., linear communication orbit 1002) in accordance with a predefined order of the respective machine identifiers of the plurality of machines. Machine 1200 receives a watch list through linear communication orbit 1002, e.g., receives the watch list from one of its neighboring nodes when the watch list is deployed by remote server 1004 to linear communication orbit 1002. After receiving the watch list from one of its neighbors, machine 1200 continues to distribute the watch list to the other one of its neighboring nodes. If machine 1200 is located at a head node, it receives the watch list from remote server 1004 directly. If machine 1200 is located at a tail node, it does not pass the watch list to any other node in linear communication orbit 1002.

Computational machine 1200 identifies a plurality of events that occur locally at the respective node while the plurality of events are occurring, and stores in a local database event information for the identified plurality of events. After the watch list is received at computational machine 1200, the plurality of events identified by computational machine 1200 includes events for the one or more objects identified by the received watch list, and the event information stored in the database includes event information for the one or more objects identified by the received watch list. In some embodiments, a subset of the events for the one or more objects identified by the received watch list are identified by a plurality of integrity warning tags, and event information for the subset of the events is stored in the local database in association with the plurality of integrity warning tags.

In addition, machine 1200 receives an integrity reporting request through linear communication orbit 1002, i.e., receives the integrity reporting request from one of its neighboring nodes when the integrity reporting request is deployed by remote server 1004 to linear communication orbit 1002. After receiving the integrity reporting request, machine 1200 continues to distribute the integrity reporting request to the other one of its neighboring nodes. If machine 1200 is located at a head node, it receives the integrity reporting request from remote server 1004 directly. If machine 1200 is located at a tail node, it does not pass the integrity reporting request to any other node in linear communication orbit 1002. In some embodiments, the integrity reporting request is sent repeatedly from remote server 1004 to machine 1200 according to a specified or predetermined schedule. In some embodiments, the integrity reporting request is sent once from remote server 1004 to machine 1200, and optionally includes a predetermined reporting schedule.

In response to the integrity reporting request, machine 1200 identifies event information for at least some of the one or more objects identified by the watch list, and returns the identified event information to remote server 1004 through the linear communication orbit 1002. For example, machine 1200 identifies such event information from among the event information stored in a local event information database of machine 1200. Specifically, machine 1200 returns the identified event information to a downstream node on a corresponding report path, e.g., one of its neighboring nodes located downstream on the report path (e.g., report path A or B in FIGS. 10 and 11). In some implementations, machine 1200 returns the identified event information to remote server 1004 through the linear communication orbit 1002 independently of event information identified at any other client nodes on the linear communication orbit 1002. In some implementations, machine 1200 returns the identified event information to remote server 1004 through the linear communication orbit in an aggregated manner. For example, machine 1200 delays returning the event information for at least some of the one or more objects identified by the received watch list until aggregated event information comes downstream on the corresponding report path and reaches the specific machine. The event information identified at machine 1200 for the objects in the watch list is then incorporated into the aggregated event information (e.g., in an aggregated event information message or file), and passed downstream to the downstream node on the corresponding report path in an aggregated manner. The corresponding report path is optionally consistent with or opposite to a command path along which the watch list and the integrity reporting request is deployed on linear communication orbit 1002. More details on reporting event information in response to the integrity reporting request are discussed above with reference to FIG. 11.

In some circumstances, the event information for at least some of the objects identified by the watch list indicates that an event of interest has occurred at machine 1200, and an investigation server 1040 (FIG. 10) needs to communicate with machine 1200 to investigate the event of interest. Remote server 1004 sends a direct communication instruction via linear communication orbit 1002 for establishing a direct duplex connection between machine 1200 and investigation server 1040. Machine 1200 receives the direct communication instruction from one of its neighboring nodes located upstream on a command path. In response to receiving the direct communication instruction, machine 1200 sends an outbound connection request to remote server 1004 via linear communication obit 1002 to establish the direct duplex connection between machine 1200 and investigation server 1040. The outbound connection request is optionally sent to either one of the neighboring nodes of machine 1200 and returned to remote server 1004 along a corresponding report path on which the event information is reported for at least some of the objects in the watch list. Once the direct duplex connection is established between machine 1200 and investigation server 1040, machine 1200 uploads its local context data related to the event of interest to investigation server 1040 through the direct duplex connection, thereby enabling investigation server 1040 to investigate integrity of an object corresponding to the event of interest that has occurred at machine 1200.

In some implementations, machine 1200 is not one of a subset of nodes selected to be monitored according to the watch list, or does not include any of the objects identified in the watch list. As a result, machine 1200 passes the watch list, the integrity reporting request, and/or the event information identified at other client nodes between its neighboring nodes. In some implementations, remote server 1004 sends a direct communication instruction for establishing a direct duplex connection between investigation server 1040 and a machine distinct from machine 1200. Machine 1200 passes the direct communication instruction, the outbound connection request, and/or the local context data between its neighboring nodes to facilitate investigation of an event of interest that has occurred at the machine distinct from machine 1200.

FIGS. 13A-13G include a flow diagram representing a method 1300 implemented by a computational machine for monitoring integrity of a computer network in accordance with some embodiments. Method 1300 is optionally governed by instructions that are stored in a non-transitory computer readable storage medium and that are executed by one or more processors of the computational machine (e.g., machines 600, FIG. 6, and 1006-1018, FIG. 10). Each of the operations shown in FIGS. 13A-13G may correspond to instructions stored in a computer memory or non-transitory computer readable storage medium (e.g., memory 604 of machine 600 in FIG. 6). The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in method 1300 may be combined and/or the order of some operations may be changed.

Method 1300 is performed by a computational machine (e.g., machine 600 and machine M1) coupled at a respective node of a linear communication orbit. The linear communication orbit is formed by a plurality of machines located at a non-static collection of nodes of the computer network. Each machine of the plurality of machines has a respective machine identifier, and the plurality of machines have self-organized into an ordered sequence in accordance with a predefined order of the respective machine identifiers of the plurality of machines. The computational machine performs (1302) a set of integrity monitoring operations including receiving (1304) a watch list through the linear communication orbit. The watch list is sent (1306) by a server system (e.g., a server system that includes remote server 1004) coupled to the linear communication orbit, and propagates from node to node along the linear communication orbit until reaching the respective node. The watch list identifies one or more objects for which events are to be monitored. In some embodiments, the server system sends (1308) the watch list through the linear communication orbit to two or more machines of the plurality of machines in the linear communication orbit, and the set of integrity monitoring operations are performed at each of the two or more machines. The two or more machines are located at a first subset of nodes of the linear communication orbit.

In some embodiments, the watch list defines (1310) one or more event types to be monitored locally at the respective node for each of the one or more objects identified in the watch list. Optionally, for each of the one or more objects, the one or more event types include (1312) at least one of creation, deletion, modification, renaming, and changing access permissions of the respective object. In some embodiments, the one or more objects identified by the watch list include (1314) one of a file and a directory. In some embodiments, the watch list excludes a directory path or a directory path type.

In some embodiments, the server system is also coupled to an administrator machine. The server system receives (1316) from the administrator machine an integrity monitoring instruction to deploy the watch list to a first subset of nodes (e.g., a predefined group of nodes based on specified criteria) in the linear communication orbit. The integrity monitor instruction includes the watch list and identifiers of the first subset of nodes including the respective node. Further, in some embodiments, the server system receives a first user selection of a target operating system (1318), and a second user selection (1320) of the one or more objects identified by the watch list from a watch list template including a predefined list of files and directories to be monitored at the first subset of nodes in the linear communication orbit. Two or more machines are located at the first subset of nodes and configured to execute the target operating system. Alternatively, in some implementations, the server system receives (1322) a user input to exclude a directory path or a directory path type from the watch list. More details on the watch list are discussed above with reference to FIG. 10.

Further, the computational machine identifies (1324) a plurality of events that occur locally at the respective node, in real-time while the plurality of events are occurring, and stores (1326) in a local database event information for the identified plurality of events at the respective node. The plurality of events includes events for the one or more objects identified by the received watch list. In some embodiments, the computational machine creates (1328) a plurality of integrity warning tags to identify a subset of the events for the one or more objects identified by the received watch list, and each integrity warning tag indicates that a respective one of the subset of events has been identified for the one or more objects according to the watch list. The computational machine stores (1330) in the local database each of the plurality of integrity warning tags in association with the respective one of the subset of events.

The computational machine receives (1332) an integrity reporting request through the linear communication orbit. The integrity reporting request is sent (1334) by the server system, and propagates from node to node along the linear communication orbit until reaching the respective node of the computational machine. In some embodiments, the integrity reporting request is received (1336) periodically from the server system according to a predetermined schedule. In some embodiments, the integrity reporting request includes (1338) an encryption key for encrypting the identified subset of the event information at the respective node before uploading the identified subset of the event information to the server system. The server system possesses a decryption key corresponding to the encryption key, such that when event information is returned in an encrypted format in response to the integrity reporting request, the server system uses the decryption key to decipher (e.g., decrypt) the event information.

In response to the integrity reporting request, the computational machine identifies (1340) a subset of the event information for the identified plurality of events in the local database, and returns the identified subset of the event information to the server system through the linear communication orbit. The subset of the event information corresponds to (1342) event information for at least some of the one or more objects identified by the received watch list. In some embodiments, the integrity reporting request includes (1344) a command to return to the server system event information for any event that is stored in the local database with an integrity warning tag. In response to such an integrity reporting request, the computational machine identifies in the database a subset of the events for the one or more objects identified by the received watch list, wherein the identified subset of the events are events having been stored (1346) with integrity warning tags. The computational machine returns (1348) to the server system event information for the identified subset of the events for the one or more objects identified by the watch list according to the stored plurality of integrity warning tags.

In some embodiments, after receiving the subset of the event information for the identified plurality of events, the server system labels (1350) respective events in the events for the one or more objects identified by the watch list with predefined labels that correspond to predefined event evaluations (e.g., important, suspicious, expected, ignored or planned). More details on labelling the events identified for the one or more objects in the watch list are discussed above with reference to FIG. 10.

In some embodiments, the integrity reporting request includes (1352) an integrity reporting criterion, and the subset of the event information returned to the server system corresponds to event information in the local database that satisfies the integrity reporting criterion. For example, in some embodiments, the integrity reporting criterion defines a time window. In accordance with the integrity reporting criterion, the computational machine returns (1354) event information in the local database for at least some events that occurred within the time window for the one or more objects identified by the received watch list. In some embodiments, the integrity reporting criterion defines (1356) at least one of: a time window within which one or more events of interest, corresponding to the subset of the event information, occurred, one or more users who initiate the one or more events of interest corresponding to the subset of the event information, and a list of authorized applications that are permitted to make changes to the one or more objects identified by the watch list.

Alternatively, in some embodiments, after receiving the subset of the event information for the identified plurality of events from the computational machine, the server system identifies (1358) one or more events of interest by filtering the subset of the event information for the identified plurality of events according to an integrity monitoring criterion. Further, in some embodiments, the integrity monitoring criterion defines (1360) at least one of: a time window within which the one or more events of interest, corresponding to the subset of the event information, occurred, one or more users who initiate the one or more events of interest corresponding to the subset of the event information, and a list of authorized applications that are permitted to make changes to the one or more objects identified by the watch list.

In some embodiments, the computational machine receives (1362) from the server system a direct communication instruction for establishing a direct duplex connection between the respective node (at which the computational machine is located) and the server system. The direct duplex connection can be (1364) a secure websocket connection. Under some circumstances, the server system is separated (1366) from the network by a firewall. In response to receiving the direct communication instruction through the linear communication orbit, the computational machine sends (1368) an outbound connection request to the server system to establish a direct duplex connection between the respective node and the server system. The computational machine uploads (1370) local context data related to an event of interest to the server system through the direct duplex connection. The server system performs analysis on the local context data received from the respective node through the direct duplex connection to investigate integrity of a respective object corresponding to the event of interest that has occurred at the respective node. In some embodiments, in the event that one or more objects are found to have been compromised, the server system performs one or more remedial actions, such as replacing the compromised objects with objects whose integrity has not been compromised, or, in another example, undoing unauthorized changes in access permissions or other unauthorized changes to one or more objects at the respective node.

In some embodiments, the subset of the event information for the identified plurality of events that is identified in the local database includes (1374) a first subset of the event information for the identified plurality of events. In response to the integrity reporting request, the computational machine receives (1376) a second subset of event information for a second plurality of events that are identified at a second node in the linear communication orbit. The second node is distinct from the respective node, and the second subset corresponds to at least some of the one or more objects identified by the watch list received at the second node. The computational machine aggregates (1378) the first subset of the event information for the plurality of events identified at the respective node and the second subset of the event information for the second plurality of events identified at the second node. The aggregated first and second subsets of event information is returned to the server system via the linear communication orbit. More details on responding to the integrity reporting request in an aggregated manner are discussed above with reference to FIG. 11.

It should be understood that the particular order in which the operations in FIGS. 13A-13F have been described is merely an example and is not intended to indicate that the described order is the only order in which the operations could be performed. One of ordinary skill in the art would recognize various ways to monitor integrity for computational machines coupled at respective nodes of a linear communication orbit as described herein.

It is noted that some of the features or operations of method 1300 described above have been described in more detail with reference to FIGS. 10-12, and those descriptions are to be considered to be part of the description of method 1300, where applicable. In some embodiments, referring to FIG. 6, message and command module 620 further includes an integrity monitoring module for implementing method 1300. The integrity module includes instructions for handling receipt, processing, propagation, collecting and reporting of messages/commands/information configured to monitor integrity of a computer network (e.g., watch lists, integrity reporting requests, event information for objects identified in a watch list, direct communication instructions, outbound connection requests, and local context data). In some embodiments, local database 624 is configured to store a subset of the messages/commands/information for monitoring integrity of the computer network.

Figure 14A:
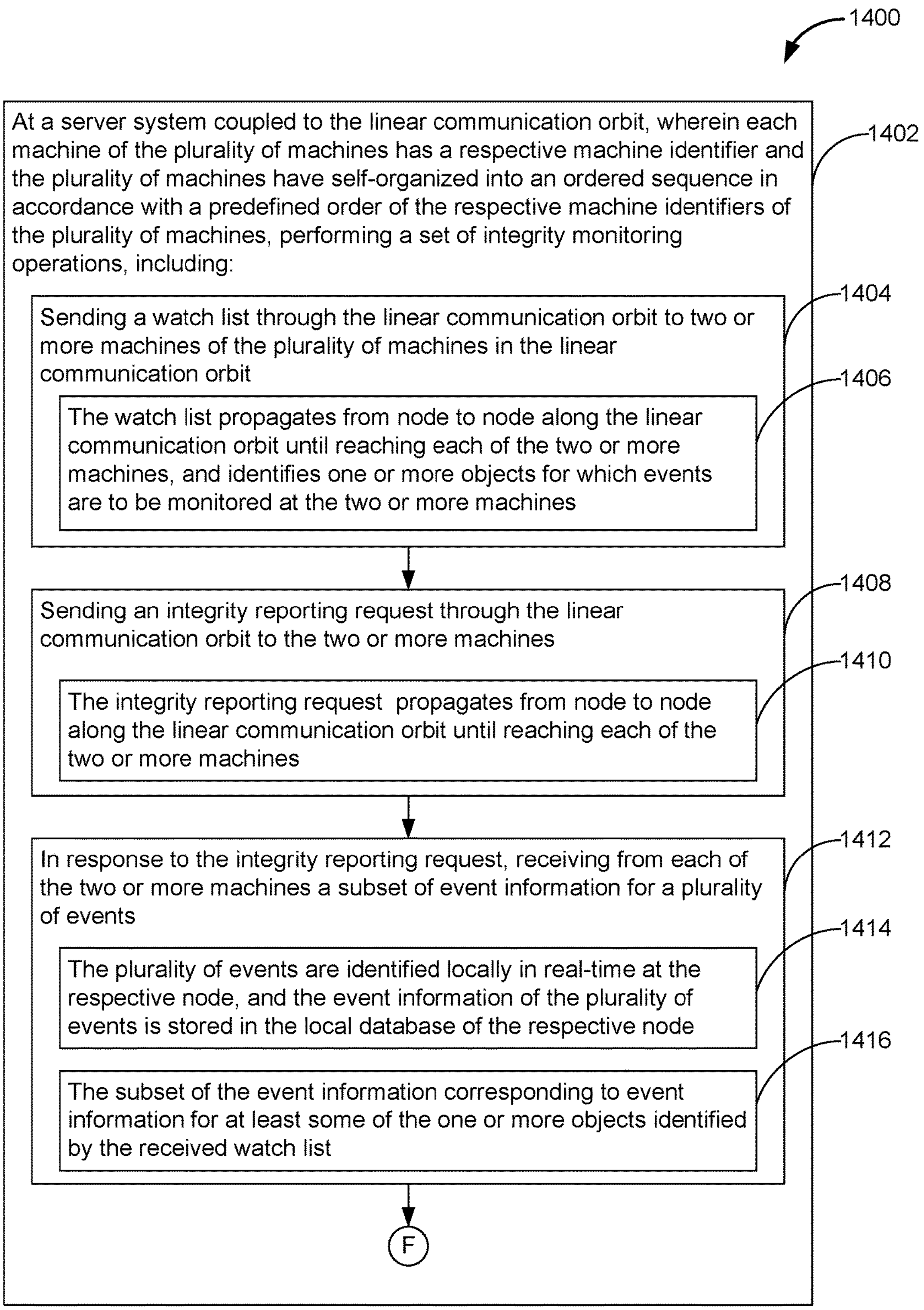
FIGS. 14A and 14B include a flow diagram representing another method implemented by a server system for monitoring integrity of a computer network in accordance with some embodiments.
Figure 14B:
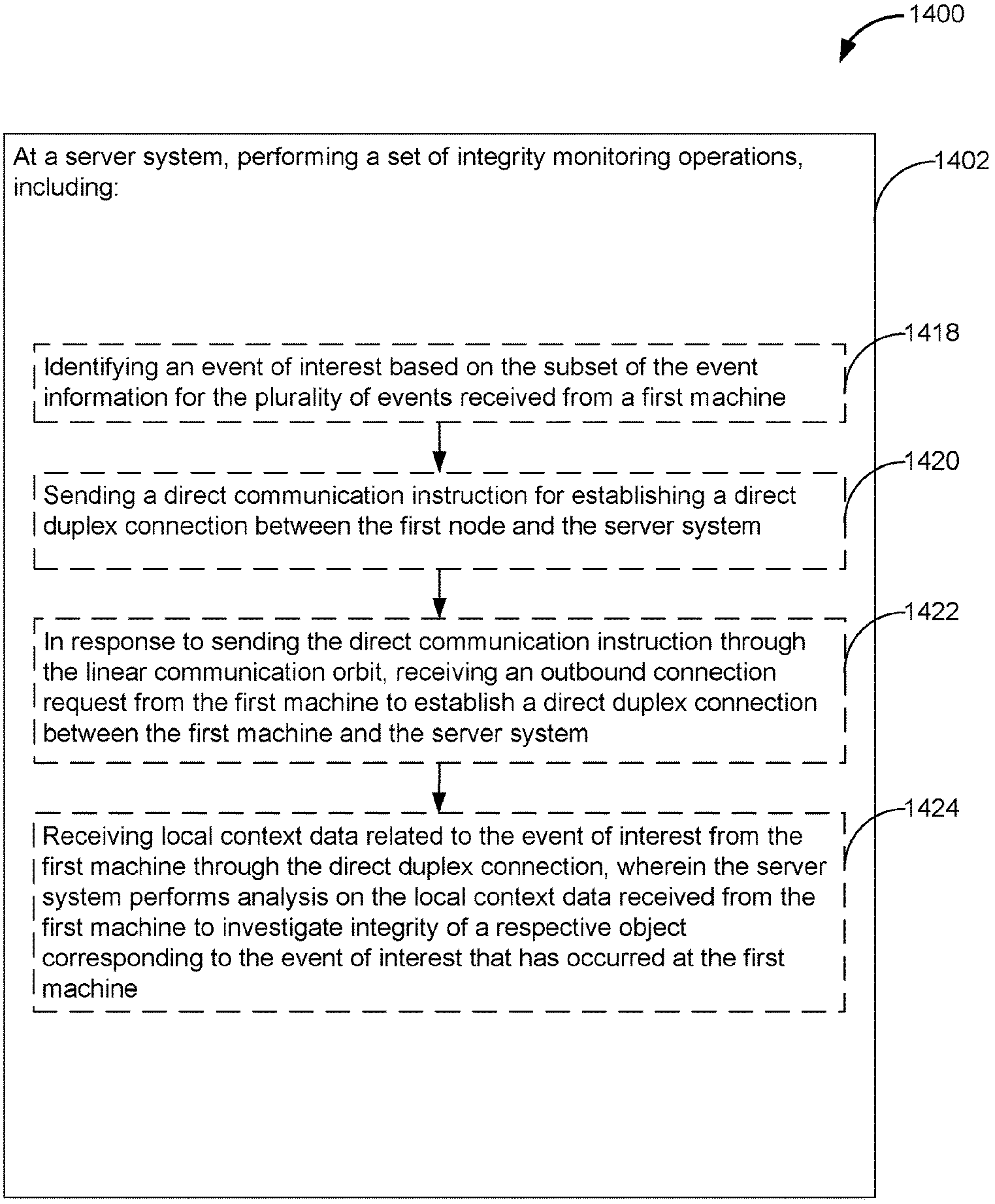

FIGS. 14A and 14B include a flow diagram representing another method 1400 implemented by a server system for monitoring integrity of a computer network in accordance with some embodiments. Method 1400 is optionally governed by instructions that are stored in a non-transitory computer readable storage medium and that are executed by one or more processors of a server system (e.g., including remote server 1004 and investigation server 1040). Each of the operations shown in FIGS. 14A and 14B may correspond to instructions stored in a computer memory or non-transitory computer readable storage medium (e.g., memory 804 of server 800 in FIG. 8 and memory 904 of server 900 in FIG. 9). The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in method 1400 may be combined and/or the order of some operations may be changed.

Method 1400 is performed by a server system coupled to a linear communication orbit formed by a plurality of machines located at a non-static collection of nodes of a computer network. Each machine of the plurality of machines has a respective machine identifier, and the plurality of machines have self-organized into an ordered sequence in accordance with a predefined order of the respective machine identifiers of the plurality of machines. The server system performs (1402) a set of integrity monitoring operations. Specifically, the server system sends (1404) a watch list through the linear communication orbit to two or more machines (e.g., machine 1010 in FIG. 11) of the plurality of machines in the linear communication orbit. The watch list propagates (1406) from node to node along the linear communication orbit until reaching each of the two or more machines, and the watch list identifies one or more objects for which events are to be monitored at the two or more machines. After sending the watch list, the server system sends (1408) an integrity reporting request through the linear communication orbit to the two or more machines. The integrity reporting request propagates (1410) from node to node along the linear communication orbit until reaching each of the two or more machines. In response to the integrity reporting request, the server system receives (1412) from each of the two or more machines a subset of event information for a plurality of events. The plurality of events are identified (1414) locally in real-time at the respective node, and the event information of the plurality of events is stored in the local database of the respective node. The subset of the event information corresponds (1416) to event information for at least some of the one or more objects identified by the received watch list.

In some embodiments, the server system identifies (1418) an event of interest based on the subset of the event information for the plurality of events received from a first machine, and sends (1420) a direct communication instruction for establishing a direct duplex connection between the first node and the server system. In response to sending the direct communication instruction through the linear communication orbit, the server system receives (1422) an outbound connection request from the first machine to establish a direct duplex connection between the first machine and the server system. Then, the server system receives (1424) local context data related to the event of interest from the first machine through the direct duplex connection. The server system performs analysis on the local context data received from the first machine to investigate integrity of a respective object corresponding to the event of interest that has occurred at the first machine, as discussed above.

In some embodiments, the server system is coupled to an administrator machine (e.g., machine 700 in FIG. 7 and machine 1020 in FIG. 10). The server system receives from the administrator machine an integrity monitoring instruction to deploy the watch list to the two or more machines at a first subset of nodes in the linear communication orbit. The integrity monitor instruction includes the watch list and identifiers of the first subset of nodes. In some embodiments, the administrator machine is configured to present a first user interface for receiving user inputs that define the watch list or select the first subset of nodes in the linear communication orbit. In some implementations, the administrator machine is also configured to present a second user interface for receiving a user request for event information for at least some of the one or more objects identified by the watch list. On the second user interface, the user is prompted to define an integrity reporting criterion (e.g., identifying a time window, one or more authorized or unauthorized users, and/or a list of authorized or unauthorized applications). Additionally, in some embodiments, after receiving the subset of the event information for the identified plurality of events, the server system provides the subset of the event information to the administrator machine. The administrator machine is configured to present a third user interface for reviewing the received subset of the event information and receiving user inputs that label respective events in the events for the one or more objects identified by the watch list with predefined labels.

In some embodiments, referring to FIG. 7, memory 704 or alternatively the non-transitory computer readable storage medium of memory 704 of an administrator machine stores a threat detection module 718 that further includes an integrity monitoring module (not shown in FIG. 7). The integrity module includes instructions for handling generation, receipt, processing, propagation, collecting and reporting of messages/commands/information configured to monitor integrity of a computer network (e.g., watch lists, integrity reporting requests, event information for objects identified in a watch list, direct communication instructions, outbound connection requests, and local context data). Other modules 720 and event data 722 are configured to store a subset of the messages/commands/information for monitoring integrity of the computer network. Specifically, the integrity monitoring module includes instructions for generating a plurality of user interfaces, and user inputs are received at the plurality of user interfaces for defining the watch list, selecting the first subset of nodes, requesting event information for the objects identified by the watch list, and labelling respective events in the events for the objects identified by the watch list with predefined labels.

It should be understood that the particular order in which the operations in FIGS. 14A and 14B have been described is merely an example and is not intended to indicate that the described order is the only order in which the operations could be performed. One of ordinary skill in the art would recognize various ways to monitor integrity for computational machines coupled at respective nodes of a linear communication orbit as described herein.

It is noted that some of the features or operations of method 1400 described above have been described in more detail with reference to FIGS. 10-13, and those descriptions are to be considered to be part of the description of method 1400, where applicable. In some embodiments, referring to FIGS. 8 and 9, message and command module 820 (of server 800) or 920 (of remote investigating server 900) further includes an integrity monitoring module (not shown in FIGS. 8 and 9) for implementing method 1400. The integrity module includes instructions for handling generation, receipt, processing, propagation, collecting and reporting of messages/commands/information configured to monitor integrity of a computer network (e.g., watch lists, integrity reporting requests, event information for objects identified in a watch list, direct communication instructions, outbound connection requests, and local context data). Collected data 824 (of server 800) or 924 (or remote investigating server 900) is typically a local database configured to store a subset of the information for monitoring integrity of the computer network.

The foregoing description has been provided with reference to specific embodiments. However, the illustrative discussions above are not intended to be exhaustive or to be limiting to the precise forms disclosed. Many modifications and variations are possible in view of the above teachings. The embodiments were chosen and described in order to best explain the principles disclosed and their practical applications, to thereby enable others to best utilize the disclosure and various embodiments with various modifications as are suited to the particular use contemplated.

It will be understood that, although the terms "first," "second," etc. may be used herein to describe various elements, these elements should not be limited by these terms. These terms are only used to distinguish one element from another. For example, a first widget could be termed a second widget, and, similarly, a second widget could be termed a first widget, without changing the meaning of the description, so long as all occurrences of the "first widget" are renamed consistently and all occurrences of the "second widget" are renamed consistently. The first widget and the second widget are both widgets, but they are not the same widget.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "upon a determination that" or "in response to determining" or "in accordance with a determination" or "upon detecting" or "in response to detecting" that the stated condition precedent is true, depending on the context.

What is claimed is:

1. A method of monitoring a network comprising a plurality of machines located at a non-static collection of nodes that form a linear communication orbit, the method comprising:

at a respective node in the linear communication orbit, wherein each machine of the plurality of machines has a respective machine identifier, and the plurality of machines have self-organized into an ordered sequence in accordance with a predefined order of the respective machine identifiers of the plurality of machines, performing a set of integrity monitoring operations, comprising:

receiving a watch list through the linear communication orbit, wherein the watch list is sent by a server system coupled to the linear communication orbit, and propagates from node to node along the linear communication orbit until reaching the respective node, and the watch list identifies one or more objects for which events are to be monitored;

identifying a plurality of events that occur locally at the respective node, including events for the one or more objects identified by the received watch list, in real-time while the plurality of events are occurring;

storing in a local database event information for the identified plurality of events at the respective node;

receiving an integrity reporting request through the linear communication orbit, wherein the integrity reporting request is sent by the server system, and propagates from node to node along the linear communication orbit until reaching the respective node;

in response to the integrity reporting request, identifying a subset of the event information for the identified plurality of events in the local database, the subset corresponding to event information for at least some of the one or more objects identified by the received watch list, and returning the identified subset of the event information to the server system through the linear communication orbit.

2. The method of claim 1, further comprising:

at the server system coupled to the linear communication orbit, sending the watch list through the linear communication orbit to two or more machines of the plurality of machines in the linear communication orbit, and performing the set of integrity monitoring operations at each of the two or more machines.

3. The method of claim 1, wherein the watch list defines one or more event types to be monitored locally at the respective node for each of the one or more objects identified in the watch list.

4. The method of claim 3, wherein for each respective object of the one or more objects, the one or more event types include at least one of creation, deletion, modification, renaming and access permission change of the respective object.

5. The method of claim 1, wherein the one or more objects identified by the watch list include one of a file and a directory.

6. The method of claim 1, wherein the server system is coupled to an administrator machine, further comprising:

at the server system, receiving from the administrator machine an integrity monitoring instruction to deploy the watch list to a first subset of nodes in the linear communication orbit, the integrity monitor instruction including the watch list and identifiers of the first subset of nodes including the respective node.

7. The method of claim 6, wherein receiving the integrity monitoring instruction further comprises:

receiving a user selection of a target operating system; and receiving a selection of the one or more objects identified by the watch list from a watch list template including a predefined list of files and directories to be monitored at the first subset of nodes in the linear communication orbit, wherein two or more machines are located at the first subset of nodes and configured to execute the target operating system.

8. The method of claim 6, wherein receiving the integrity monitoring instruction further comprises: receiving at the server system a user input to exclude a directory path or a directory path type from the watch list.

9. The method of claim 1, wherein storing in the local database event information for the identified plurality of events at the respective node further comprises:

creating a plurality of integrity warning tags to identify a subset of the events for the one or more objects identified by the received watch list, wherein each integrity warning tag indicates that a respective one of the subset of events has been identified for the one or more objects according to the watch list; and storing in the local database each of the plurality of integrity warning tags in association with the respective one of the subset of events.

10. The method of claim 9, wherein the integrity reporting request includes a command to return to the server system event information for any event that is stored in the local database with an integrity warning tag, and identifying and returning the subset of the event information further comprises:

in response to the integrity reporting request:

identifying in the local database the subset of the events for the one or more objects identified by the received watch list, the identified subset of the events being stored with the plurality of integrity warning tags; and returning to the server system event information for the identified subset of the events for the one or more objects identified by the received watch list.

11. The method of claim 1, wherein the integrity reporting request is received periodically from the server system according to a predetermined schedule.

12. The method of claim 1, wherein the integrity reporting request includes an encryption key for encrypting the identified subset of the event information at the respective node before uploading the identified subset of the event information to the server system, and the server system possesses a decryption key corresponding to the encryption key.

13. The method of claim 1, further comprising:

at the server system, after receiving the subset of the event information for the identified plurality of events, labeling respective events in the events for the one or more objects identified by the received watch list with predefined labels that correspond to predefined event evaluations.

14. The method of claim 1, wherein the integrity reporting request includes an integrity reporting criterion, and the subset of the event information for the identified plurality of events corresponds to event information in the local database that satisfies the integrity reporting criterion.

15. The method of claim 14, wherein the integrity reporting criterion defines a time window, and returning the identified subset of the event information to the server system includes:

in accordance with the integrity reporting criterion, returning event information in the local database for at least some events that occurred within the time window for the one or more objects identified by the received watch list.

16. The method of claim 14, wherein the integrity reporting criterion defines at least one of:

a time window within which one or more events of interest corresponding to the subset of the event information occurred;

one or more users who initiate the one or more events of interest corresponding to the subset of the event information; and a list of authorized applications that are permitted to make changes to the one or more objects identified by the watch list.

17. The method of claim 1, further comprising:

at the server system, after receiving the subset of the event information for the identified plurality of events, identifying one or more events of interest by filtering the subset of the event information for the identified plurality of events according to an integrity monitoring criterion.

18. The method of claim 17, wherein the integrity monitoring criterion defines at least one of:

a time window within which the one or more events of interest corresponding to the subset of the event information occurred;

one or more users who initiate the one or more events of interest corresponding to the subset of the event information; and a list of authorized applications that are permitted to make changes to the one or more objects identified by the watch list.

19. The method of claim 1, further comprising:

receiving from the server system a direct communication instruction for establishing a direct duplex connection between the respective node and the server system;

in response to receiving the direct communication instruction through the linear communication orbit, sending an outbound connection request to the server system to establish a direct duplex connection between the respective node and the server system; and uploading local context data related to an event of interest to the server system through the direct duplex connection, wherein the server system is configured to perform analysis on the local context data received from the respective node to investigate integrity of a respective object corresponding to the event of interest that has occurred at the respective node.

20. The method of claim 19, wherein the direct duplex connection is a secure websocket connection.

21. The method of claim 19, wherein the server system is separated from the network by a firewall.

22. The method of claim 1, wherein the subset of the event information for the identified plurality of events that is identified in the local database includes a first subset of the event information for the identified plurality of events, the method further comprising:

at the respective node, in response to the integrity reporting request:

receiving a second subset of the event information for a second plurality of events that are identified at a second node in the linear communication orbit, the second node being distinct from the respective node, the second subset corresponding to at least some of the one or more objects identified by the watch list received at the second node; and aggregating the first subset of the event information for the plurality of events identified at the respective node and the second subset of the event information for the second plurality of events identified at the second node, wherein the aggregated first and second subsets of event information are returned to the server system via the linear communication orbit.

23. A method of monitoring a network comprising a plurality of machines located at a non-static collection of nodes that form a linear communication orbit, the method comprising:

at a server system coupled to the linear communication orbit, wherein each machine of the plurality of machines has a respective machine identifier, and the plurality of machines have self-organized into an ordered sequence in accordance with a predefined order of the respective machine identifiers of the plurality of machines, performing a set of integrity monitoring operations, comprising:

sending a watch list through the linear communication orbit to two or more machines of the plurality of machines in the linear communication orbit, wherein the watch list propagates from node to node along the linear communication orbit until reaching each of the two or more machines, and the watch list identifies one or more objects for which events are to be monitored at the two or more machines;

sending an integrity reporting request through the linear communication orbit to the two or more machines, wherein the integrity reporting request propagates from node to node along the linear communication orbit until reaching each of the two or more machines;

in response to the integrity reporting request, receiving from each of the two or more machines a subset of event information for a plurality of events, wherein the plurality of events are identified locally in real-time at the two or more machines, and the event information for the plurality of events is stored in local databases of the two or more machines, the subset of the event information corresponding to event information for at least some of the one or more objects identified by the watch list.

24. The method of claim 23, further comprising:

identifying an event of interest based on the subset of the event information for the plurality of events received from a first machine of the two or more machines;

sending a direct communication instruction for establishing a direct duplex connection between the first machine and the server system;

in response to sending the direct communication instruction through the linear communication orbit, receiving an outbound connection request from the first machine to establish a direct duplex connection between the first machine and the server system; and receiving local context data related to the event of interest from the first machine through the direct duplex connection, wherein the server system is configured to perform analysis on the local context data received from the first machine through the direct duplex connection to investigate integrity of a respective object corresponding to the event of interest that has occurred at the first machine.

25. A server system for monitoring a network comprising a plurality of machines located at a non-static collection of nodes that form a linear communication orbit, the server configured to be coupled to the linear communication orbit, wherein each machine of the plurality of machines has a respective machine identifier, and the plurality of machines have self-organized into an ordered sequence in accordance with a predefined order of the respective machine identifiers of the plurality of machines; the server system comprising:

one or more processors; and memory storing one or more programs, the one or more programs including instructions for performing a set of integrity monitoring operations, including:

sending a watch list through the linear communication orbit to two or more machines of the plurality of machines in the linear communication orbit, wherein the watch list propagates from node to node along the linear communication orbit until reaching each of the two or more machines, and the watch list identifies one or more objects for which events are to be monitored at the two or more machines;

sending an integrity reporting request through the linear communication orbit to the two or more machines, wherein the integrity reporting request propagates from node to node along the linear communication orbit until reaching each of the two or more machines;

in response to the integrity reporting request, receiving from each of the two or more machines a subset of event information for a plurality of events, wherein the plurality of events are identified locally in real-time at the two or more machines, and the event information for the plurality of events is stored in local databases of the two or more machines, the subset of the event information corresponding to event information for at least some of the one or more objects identified by the watch list.

26. The server system of claim 25, wherein the one or more programs include instructions for:

identifying an event of interest based on the subset of the event information for the plurality of events received from a first machine of the two or more machines;

sending a direct communication instruction for establishing a direct duplex connection between the first machine and the server system;

in response to sending the direct communication instruction through the linear communication orbit, receiving an outbound connection request from the first machine to establish a direct duplex connection between the first machine and the server system; and receiving local context data related to the event of interest from the first machine through the direct duplex connection, wherein the server system is configured to perform analysis on the local context data received from the first machine through the direct duplex connection to investigate integrity of a respective object corresponding to the event of interest that has occurred at the first machine.

27. A non-transitory computer readable storage medium storing one or more programs configured for execution by a server system for monitoring a network comprising a plurality of machines located at a non-static collection of nodes that form a linear communication orbit;

wherein each machine of the plurality of machines has a respective machine identifier, and the plurality of machines have self-organized into an ordered sequence in accordance with a predefined order of the respective machine identifiers of the plurality of machines; the one or more programs comprising instructions for:

sending a watch list through the linear communication orbit to two or more machines of the plurality of machines in the linear communication orbit, wherein the watch list propagates from node to node along the linear communication orbit until reaching each of the two or more machines, and the watch list identifies one or more objects for which events are to be monitored at the two or more machines;

sending an integrity reporting request through the linear communication orbit to the two or more machines, wherein the integrity reporting request propagates from node to node along the linear communication orbit until reaching each of the two or more machines; and in response to the integrity reporting request, receiving from each of the two or more machines a subset of event information for a plurality of events, wherein the plurality of events are identified locally in real-time at the two or more machines, and the event information for the plurality of events is stored in local databases of the two or more machines, the subset of the event information corresponding to event information for at least some of the one or more objects identified by the watch list.

28. The non-transitory computer readable storage medium of claim 27, wherein the one or more programs include instructions for:

identifying an event of interest based on the subset of the event information for the plurality of events received from a first machine of the two or more machines;

sending a direct communication instruction for establishing a direct duplex connection between the first machine and the server system;

in response to sending the direct communication instruction through the linear communication orbit, receiving an outbound connection request from the first machine to establish a direct duplex connection between the first machine and the server system; and receiving local context data related to the event of interest from the first machine through the direct duplex connection, wherein the server system is configured to perform analysis on the local context data received from the first machine through the direct duplex connection to investigate integrity of a respective object corresponding to the event of interest that has occurred at the first machine.

29. A computational machine for monitoring a network comprising a plurality of machines located at a non-static collection of nodes that form a linear communication orbit, comprising:

one or more processors; and memory having instructions stored thereon, which when executed by the one or more processors cause the computational machine to perform a set of integrity monitoring operations including:

at a respective node in the linear communication orbit, wherein each machine of the plurality of machines has a respective machine identifier, and the plurality of machines have self-organized into an ordered sequence in accordance with a predefined order of the respective machine identifiers of the plurality of machines:

receiving a watch list through the linear communication orbit, wherein the watch list is sent by a server system coupled to the linear communication orbit, and propagates from node to node along the linear communication orbit until reaching the respective node, and the watch list identifies one or more objects for which events are to be monitored;

identifying a plurality of events that occur locally at the respective node, including events for the one or more objects identified by the received watch list, in real-time while the plurality of events are occurring;

storing in a local database event information for the identified plurality of events at the respective node;

receiving an integrity reporting request through the linear communication orbit, wherein the integrity reporting request is sent by the server system, and propagates from node to node along the linear communication orbit until reaching the respective node; and in response to the integrity reporting request, identifying a subset of the event information for the identified plurality of events in the local database, the subset corresponding to event information for at least some of the one or more objects identified by the received watch list, and returning the identified subset of the event information to the server system through the linear communication orbit.

30. The computational machine of claim 29, wherein the watch list defines one or more event types to be monitored locally at the respective node for each of the one or more objects identified in the watch list.

31. The computational machine of claim 30, wherein for each respective object of the one or more objects, the one or more event types include at least one of creation, deletion, modification, renaming and access permission change of the respective object.

32. The computational machine of claim 29, wherein the one or more objects identified by the watch list include one of a file and a directory.

33. The computational machine of claim 29, wherein storing in the local database event information for the identified plurality of events at the respective node further comprises:

creating a plurality of integrity warning tags to identify a subset of the events for the one or more objects identified by the received watch list, wherein each integrity warning tag indicates that a respective one of the subset of events has been identified for the one or more objects according to the watch list; and storing in the local database each of the plurality of integrity warning tags in association with the respective one of the subset of events.

34. The computational machine of claim 33, wherein the integrity reporting request includes a command to return to the server system event information for any event that is stored in the local database with an integrity warning tag, and identifying and returning the subset of the event information further comprises:

in response to the integrity reporting request:

identifying in the local database the subset of the events for the one or more objects identified by the received watch list, the identified subset of the events being stored with the plurality of integrity warning tags; and returning to the server system event information for the identified subset of the events for the one or more objects identified by the received watch list.

35. The computational machine of claim 33, wherein the integrity reporting request includes a command to return to the server system event information for any event that is stored in the local database with an integrity warning tag, and identifying and returning the subset of the event information further comprises:

in response to the integrity reporting request:

identifying in the local database the subset of the events for the one or more objects identified by the received watch list, the identified subset of the events being stored with the plurality of integrity warning tags; and returning to the server system event information for the identified subset of the events for the one or more objects identified by the received watch list.

36. The computational machine of claim 29, wherein the integrity reporting request is received periodically from the server system according to a predetermined schedule.

37. The computational machine of claim 29, wherein the integrity reporting request includes an encryption key for encrypting the identified subset of the event information at the respective node before uploading the identified subset of the event information to the server system, and the server system possesses a decryption key corresponding to the encryption key.

38. The computational machine of claim 29, wherein the integrity reporting request includes an integrity reporting criterion, and the subset of the event information for the identified plurality of events corresponds to event information in the local database that satisfies the integrity reporting criterion.

39. The computational machine of claim 38, wherein the integrity reporting criterion defines a time window, and returning the identified subset of the event information to the server system includes:

in accordance with the integrity reporting criterion, returning event information in the local database for at least some events that occurred within the time window for the one or more objects identified by the received watch list.

40. The computational machine of claim 38, wherein the integrity reporting criterion defines at least one of:

a time window within which one or more events of interest corresponding to the subset of the event information occurred;

one or more users who initiate the one or more events of interest corresponding to the subset of the event information; and a list of authorized applications that are permitted to make changes to the one or more objects identified by the watch list.

41. The computational machine of claim 29, wherein the set of integrity monitoring operations further includes:

receiving from the server system a direct communication instruction for establishing a direct duplex connection between the respective node and the server system;

in response to receiving the direct communication instruction through the linear communication orbit, sending an outbound connection request to the server system to establish a direct duplex connection between the respective node and the server system; and uploading local context data related to an event of interest to the server system through the direct duplex connection, wherein the server system is configured to perform analysis on the local context data received from the respective node to investigate integrity of a respective object corresponding to the event of interest that has occurred at the respective node.

42. The computational machine of claim 41, wherein the direct duplex connection is a secure websocket connection.

43. The computational machine of claim 41, wherein the server system is separated from the network by a firewall.

44. The computational machine of claim 29, wherein the subset of the event information for the identified plurality of events that is identified in the local database includes a first subset of the event information for the identified plurality of events, and the set of integrity monitoring operations further includes:

at the respective node, in response to the integrity reporting request:

receiving a second subset of the event information for a second plurality of events that are identified at a second node in the linear communication orbit, the second node being distinct from the respective node, the second subset corresponding to at least some of the one or more objects identified by the watch list received at the second node; and aggregating the first subset of the event information for the plurality of events identified at the respective node and the second subset of the event information for the second plurality of events identified at the second node, wherein the aggregated first and second subsets of event information are returned to the server system via the linear communication orbit.

45. A non-transitory computer readable storage medium storing one or more programs configured for execution by a computational machine for monitoring a network comprising a plurality of machines located at a non-static collection of nodes that form a linear communication orbit, the one or more programs comprising instructions for:

at a respective node in the linear communication orbit, wherein each machine of the plurality of machines has a respective machine identifier, and the plurality of machines have self-organized into an ordered sequence in accordance with a predefined order of the respective machine identifiers of the plurality of machines:

receiving a watch list through the linear communication orbit, wherein the watch list is sent by a server system coupled to the linear communication orbit, and propagates from node to node along the linear communication orbit until reaching the respective node, and the watch list identifies one or more objects for which events are to be monitored;

identifying a plurality of events that occur locally at the respective node, including events for the one or more objects identified by the received watch list, in real-time while the plurality of events are occurring;

storing in a local database event information for the identified plurality of events at the respective node;

receiving an integrity reporting request through the linear communication orbit, wherein the integrity reporting request is sent by the server system, and propagates from node to node along the linear communication orbit until reaching the respective node; and in response to the integrity reporting request, identifying a subset of the event information for the identified plurality of events in the local database, the subset corresponding to event information for at least some of the one or more objects identified by the received watch list, and returning the identified subset of the event information to the server system through the linear communication orbit.

46. The non-transitory computer readable medium of claim 45, wherein the watch list defines one or more event types to be monitored locally at the respective node for each of the one or more objects identified in the watch list.

47. The non-transitory computer readable medium of claim 46, wherein for each of the one or more objects, the one or more event types include at least one of creation, deletion, modification, renaming and access permission change of the respective object.

48. The non-transitory computer readable medium of claim 45, wherein the one or more objects identified by the watch list include one of a file and a directory.

49. The non-transitory computer readable medium of claim 45, wherein storing in the local database event information for the identified plurality of events at the respective node further comprises:

creating a plurality of integrity warning tags to identify a subset of the events for the one or more objects identified by the received watch list, wherein each integrity warning tag indicates that a respective one of the subset of events has been identified for the one or more objects according to the watch list; and storing in the local database each of the plurality of integrity warning tags in association with the respective one of the subset of events.

50. The non-transitory computer readable medium of claim 45, wherein the integrity reporting request is received periodically from the server system according to a predetermined schedule.

51. The non-transitory computer readable medium of claim 45, wherein the integrity reporting request includes an encryption key for encrypting the identified subset of the event information at the respective node before uploading the identified subset of the event information to the server system, and the server system possesses a decryption key corresponding to the encryption key.

52. The non-transitory computer readable medium of claim 45, wherein the integrity reporting request includes an integrity reporting criterion, and the subset of the event information for the identified plurality of events corresponds to event information in the local database that satisfies the integrity reporting criterion.

53. The non-transitory computer readable medium of claim 52, wherein the integrity reporting criterion defines a time window, and returning the identified subset of the event information to the server system includes:

in accordance with the integrity reporting criterion, returning event information in the local database for at least some events that occurred within the time window for the one or more objects identified by the received watch list.

54. The non-transitory computer readable medium of claim 52, wherein the integrity reporting criterion defines at least one of:

a time window within which one or more events of interest corresponding to the subset of the event information occurred;

one or more users who initiate the one or more events of interest corresponding to the subset of the event information; and a list of authorized applications that are permitted to make changes to the one or more objects identified by the watch list.

55. The non-transitory computer readable medium of claim 45, wherein the one or more programs include instructions for:

receiving from the server system a direct communication instruction for establishing a direct duplex connection between the respective node and the server system;

in response to receiving the direct communication instruction through the linear communication orbit, sending an outbound connection request to the server system to establish a direct duplex connection between the respective node and the server system; and uploading local context data related to an event of interest to the server system through the direct duplex connection, wherein the server system is configured to perform analysis on the local context data received from the respective node to investigate integrity of a respective object corresponding to the event of interest that has occurred at the respective node.

56. The non-transitory computer readable medium of claim 55, wherein the direct duplex connection is a secure websocket connection.

57. The non-transitory computer readable medium of claim 55, wherein the server system is separated from the network by a firewall.

58. The non-transitory computer readable medium of claim 45, wherein the subset of the event information for the identified plurality of events that is identified in the local database includes a first subset of the event information for the identified plurality of events, and the one or more programs include instructions for:

at the respective node, in response to the integrity reporting request:

receiving a second subset of the event information for a second plurality of events that are identified at a second node in the linear communication orbit, the second node being distinct from the respective node, the second subset corresponding to at least some of the one or more objects identified by the watch list received at the second node; and aggregating the first subset of the event information for the plurality of events identified at the respective node and the second subset of the event information for the second plurality of events identified at the second node, wherein the aggregated first and second subsets of event information are returned to the server system via the linear communication orbit.

* * * * *